US012571360B2

(12) United States Patent
Zatorski et al.

(10) Patent No.: US 12,571,360 B2
(45) Date of Patent: Mar. 10, 2026

(54) THREE-STREAM GAS TURBINE ENGINE WITH EMBEDDED ELECTRIC MACHINE

(71) Applicants:General Electric Company, Schenectady, NY (US); General Electric Deutschland Holding GmbH, Frankfurt (DE)

(72) Inventors: Darek Tomasz Zatorski, Fort Wright, KY (US); David Marion Ostdiek, Liberty Township, OH (US); Mohamed Osama, Garching (DE); William Joseph Solomon, Montgomery, OH (US)

(73) Assignee: General Electric Deutschland Holding GmbH, Ohio Frankfurt (DE)

( * ) Notice: Subject to any disclaimer, the term of this patent is extended or adjusted under 35 U.S.C. 154(b) by 410 days.

(21) Appl. No.: 17/378,026

(22) Filed: Jul. 16, 2021

(65) Prior Publication Data

US 2022/0333553 A1 Oct. 20, 2022

Related U.S. Application Data

(60) Provisional application No. 63/174,998, filed on Apr. 14, 2021.

(51) Int. Cl.
F02K 3/077 (2006.01)
F01D 15/10 (2006.01)
(Continued)

(52) U.S. Cl.
CPC .............. F02K 3/077 (2013.01); F01D 15/10 (2013.01); F02K 3/06 (2013.01); F02C 7/36 (2013.01);
(Continued)

(58) Field of Classification Search
CPC .................................. F02K 3/06; F02K 3/077
See application file for complete search history.

(56) References Cited

U.S. PATENT DOCUMENTS

| | | | |
|---|---|---|---|
| 2,999,630 A | 9/1961 | Warren et al. | |
| 4,010,608 A | 3/1977 | Simmons | |
| (Continued) | | | |

FOREIGN PATENT DOCUMENTS

| | | | |
|---|---|---|---|
| CN | 1204005 A | 1/1999 | |
| CN | 101657607 A | 2/2010 | |
| (Continued) | | | |

OTHER PUBLICATIONS

Motors, Generators & Controls—Student Workbook, Fourth Edition, Lab-Volt Systems, Inc. 2003, pp. 1-58. (Year: 2003).*

(Continued)

*Primary Examiner* — Lorne E Meade
(74) *Attorney, Agent, or Firm* — Dority & Manning, P.A.

(57) ABSTRACT

A three-stream gas turbine engine with an embedded electric machine and methods of operating the same are disclosed. In one aspect, a three-stream engine includes an electric machine operatively coupled with a shaft of the engine. The three-stream engine also includes a core engine and a primary fan and a mid-fan positioned upstream of the core engine. The primary fan and the mid-fan are operatively coupled with the shaft. During operation, the three-stream engine defines a tip speed ratio being defined by a tip speed of a rotor of the electric machine to a tip speed of a mid-fan blade of the mid-fan. The tip speed ratio is defined as being equal to or greater than 0.2 and less than or equal to 1.0.

30 Claims, 14 Drawing Sheets

(51) Int. Cl.
| | |
|---|---|
| *F02K 3/06* | (2006.01) |
| *F02C 7/36* | (2006.01) |
| *F02K 1/46* | (2006.01) |

(52) U.S. Cl.
CPC .......... *F02K 1/46* (2013.01); *F05D 2220/323* (2013.01); *F05D 2220/36* (2013.01); *F05D 2220/76* (2013.01); *F05D 2240/30* (2013.01); *F05D 2270/051* (2013.01)

(56) References Cited

U.S. PATENT DOCUMENTS

| | | | |
|---|---|---|---|
| 4,043,121 A | | 8/1977 | Thomas et al. |
| 4,446,696 A | * | 5/1984 | Sargisson ............... F02K 3/077 |
| | | | 60/226.3 |
| 4,486,146 A | | 12/1984 | Campion |
| 4,569,199 A | | 2/1986 | Klees et al. |
| 4,607,657 A | | 8/1986 | Hirschkron |
| 4,784,575 A | | 11/1988 | Nelson et al. |
| 4,860,537 A | | 8/1989 | Taylor |
| 4,892,269 A | | 1/1990 | Greco et al. |
| 4,907,946 A | | 3/1990 | Ciokajlo et al. |
| 4,916,894 A | | 4/1990 | Adamson et al. |
| 4,976,102 A | | 12/1990 | Taylor |
| 5,054,998 A | | 10/1991 | Davenport |
| 5,190,441 A | | 3/1993 | Murphy et al. |
| 5,197,855 A | | 3/1993 | Magliozzi et al. |
| 5,259,187 A | | 11/1993 | Dunbar et al. |
| 5,345,760 A | | 9/1994 | Giffin, III |
| 5,457,346 A | | 10/1995 | Blumberg et al. |
| 5,867,979 A | * | 2/1999 | Newton ................... F02C 3/113 |
| | | | 310/90.5 |
| 5,950,308 A | | 9/1999 | Koff et al. |
| 6,339,927 B1 | | 1/2002 | DiPietro, Jr. |
| 6,547,518 B1 | | 4/2003 | Czachor et al. |
| 6,763,654 B2 | | 7/2004 | Orlando et al. |
| 6,792,758 B2 | | 9/2004 | Dowman |
| 7,559,191 B2 | | 7/2009 | Parks |
| 7,762,766 B2 | | 7/2010 | Shteyman et al. |
| 8,276,392 B2 | | 10/2012 | van der Woude |
| 8,382,430 B2 | | 2/2013 | Parry et al. |
| 8,459,035 B2 | | 6/2013 | Smith et al. |
| 8,689,538 B2 | | 4/2014 | Sankrithi et al. |
| 8,762,766 B2 | | 6/2014 | Ferguson et al. |
| 8,876,465 B2 | | 11/2014 | Stretton |
| 8,943,796 B2 | | 2/2015 | McCaffrey |
| 8,967,967 B2 | | 3/2015 | Stretton et al. |
| 9,045,996 B2 | | 6/2015 | Anghel et al. |
| 9,096,312 B2 | | 8/2015 | Moxon |
| 9,097,134 B2 | | 8/2015 | Ferch et al. |
| 9,534,538 B1 | | 1/2017 | Cerny |
| 9,982,555 B2 | | 5/2018 | Thet et al. |
| 9,995,314 B2 | | 6/2018 | Miller et al. |
| 10,077,660 B2 | | 9/2018 | Hoefer et al. |
| 10,090,676 B2 | | 10/2018 | Knowles et al. |
| 10,126,062 B2 | | 11/2018 | Cerny et al. |
| 10,184,400 B2 | | 1/2019 | Cerny et al. |
| 10,202,865 B2 | | 2/2019 | Breeze-Stringfellow et al. |
| 10,252,810 B2 | * | 4/2019 | Niergarth ................... F02C 3/04 |
| 10,253,648 B2 | | 4/2019 | Bentley et al. |
| 10,260,419 B2 | | 4/2019 | Cerny et al. |
| 10,263,550 B2 | | 4/2019 | Thet et al. |
| 10,344,674 B2 | | 7/2019 | Cerny et al. |
| 10,364,750 B2 | | 7/2019 | Rambo |
| 10,392,120 B2 | * | 8/2019 | Niergarth ................... F02C 3/04 |
| 10,443,436 B2 | | 10/2019 | Miller et al. |
| 10,487,739 B2 | | 11/2019 | Miller et al. |
| 10,644,630 B2 | | 5/2020 | Smith et al. |
| 10,704,410 B2 | * | 7/2020 | Zatorski ............... B64C 11/001 |
| 2004/0197187 A1 | | 10/2004 | Usab et al. |
| 2004/0234372 A1 | | 11/2004 | Shahpar |
| 2009/0078819 A1 | | 3/2009 | Guering et al. |
| 2010/0014977 A1 | | 1/2010 | Shattuck |
| 2010/0111674 A1 | | 5/2010 | Sparks |
| 2010/0251726 A1 | | 10/2010 | Jones et al. |

| | | | |
|---|---|---|---|
| 2010/0329856 A1 | | 12/2010 | Hofer et al. |
| 2011/0150659 A1 | | 6/2011 | Micheli et al. |
| 2011/0192166 A1 | | 8/2011 | Mulcaire |
| 2012/0171018 A1 | * | 7/2012 | Hasel ........................ F02K 3/06 |
| | | | 415/220 |
| 2012/0177493 A1 | | 7/2012 | Fabre |
| 2013/0104522 A1 | | 5/2013 | Kupratis |
| 2014/0133982 A1 | | 5/2014 | Dejeu et al. |
| 2014/0345253 A1 | | 11/2014 | Dawson et al. |
| 2014/0345254 A1 | | 11/2014 | Dawson et al. |
| 2015/0003993 A1 | | 1/2015 | Kim et al. |
| 2015/0098813 A1 | | 4/2015 | Jarrett, Jr. |
| 2015/0284070 A1 | | 10/2015 | Breeze-Stringfellow et al. |
| 2015/0291276 A1 | * | 10/2015 | Zatorski .................. F02C 6/206 |
| | | | 415/68 |
| 2016/0010487 A1 | | 1/2016 | Breeze-Stringfellow et al. |
| 2016/0160647 A1 | | 6/2016 | Hofer et al. |
| 2016/0230658 A1 | | 8/2016 | Hanlon et al. |
| 2017/0051678 A1 | | 2/2017 | Becker, Jr. |
| 2017/0051680 A1 | | 2/2017 | Becker, Jr. et al. |
| 2017/0102006 A1 | | 4/2017 | Miller et al. |
| 2017/0114721 A1 | | 4/2017 | Miller et al. |
| 2017/0167382 A1 | | 6/2017 | Miller et al. |
| 2017/0184027 A1 | | 6/2017 | Moniz et al. |
| 2017/0198719 A1 | | 7/2017 | Cerny et al. |
| 2017/0297727 A1 | * | 10/2017 | Niergarth ............... B64D 27/18 |
| 2017/0297728 A1 | * | 10/2017 | Niergarth .................. F02C 7/36 |
| 2018/0065727 A1 | | 3/2018 | Gruber et al. |
| 2018/0118364 A1 | | 5/2018 | Golshany et al. |
| 2018/0215475 A1 | | 8/2018 | Hurt et al. |
| 2018/0283795 A1 | | 10/2018 | Cerny et al. |
| 2019/0136710 A1 | | 5/2019 | Breeze-Stringfellow et al. |
| 2019/0153952 A1 | | 5/2019 | Niergarth et al. |
| 2019/0153953 A1 | | 5/2019 | Niergarth et al. |
| 2019/0218971 A1 | | 7/2019 | Niergarth et al. |
| 2019/0249599 A1 | | 8/2019 | Sen et al. |
| 2019/0257247 A1 | | 8/2019 | Pal et al. |
| 2019/0360401 A1 | | 11/2019 | Rambo et al. |
| 2020/0095939 A1 | | 3/2020 | Epstein |
| 2021/0108573 A1 | | 4/2021 | Sibbach et al. |

FOREIGN PATENT DOCUMENTS

| | | | |
|---|---|---|---|
| EP | 0385913 A1 | 9/1990 |
| EP | 0887259 A2 | 12/1998 |
| EP | 1493900 A2 | 1/2005 |
| EP | 2540989 A2 | 1/2013 |
| EP | 2562082 A2 | 2/2013 |
| EP | 3093443 A1 | 11/2016 |
| GB | 2100799 A | 1/1983 |
| GB | 2196390 A | 4/1988 |
| GB | 2461811 A | 1/2010 |
| JP | H0370698 A | 3/1991 |
| JP | 2006123880 A | 5/2006 |
| JP | 2009508748 A | 3/2009 |
| JP | 2011527263 A | 10/2011 |
| KR | 101179277 B1 | 9/2012 |
| WO | WO2004/033295 A1 | 4/2004 |
| WO | WO2005/111413 A1 | 11/2005 |
| WO | WO2011/020458 A2 | 2/2011 |
| WO | WO2011/094477 A2 | 8/2011 |
| WO | WO2011/107320 A1 | 9/2011 |
| WO | WO2014/143248 A1 | 9/2014 |

OTHER PUBLICATIONS

Wendus, et al., "Follow-On Technology Requirement Study for Advanced Subsonic Transport", NASA/CR-2003-212467, Aug. 2003, pp. 1-58. (Year: 2003).*

Hall, C.A., and Crichton, D., "Engine Design Studies for a Silent Aircraft", Journal of Turbomachinery, vol. 129, Jul. 2007, pp. 479-487. (Year: 2007).*

Wilfert, Gunter, "Geared Fan", Aero-Engine Design: From State of the Art Turbofans Towards Innovative Architectures, von Karman Institute for Fluid Dynamics, Belgium, Mar. 3-7, 2008, pp. 1-26. (Year: 2008).*

(56) References Cited

OTHER PUBLICATIONS

Crigler, Application of Theodorsen's Theory to Propeller Design, NACA (National Advisory Committee for Aeronautics) Report 924, 1948, pp. 83-99.

Naveen et al., CFD Analysis of Low Pressure Turbine Blade Using Vortex Generator Jets, Proceedings of 7th International Conference on Intelligent Systems and Control (ISCO 2013) IEEE Explore, Coimbatore, Tamil Nadu, India, Jan. 4-5, 2013, pp. 541-544. https://iceexplore.ieee.org/document/6481213.

Smith Jr, Unducted Fan Aerodynamic Design, Journal of Turbomachinery, vol. 109, Jul. 1987, pp. 313-324.

Theodorsen, Theory of Propellers, Wartime Report, NACA (National Advisory Committee for Aeronautics), Aug. 1944, pp. 1-53.

Yamamoto et al., Numerical Calculation of Propfan/Swirl Recovery Vane Flow Field, AIAA-92-3771, AIAA//SAE/ASME/ASEE 28th Joint Propulsion Conference and Exhibit, Jul. 6-8, 1992, Nashville TN, pp. 1-9.

* cited by examiner

400

402

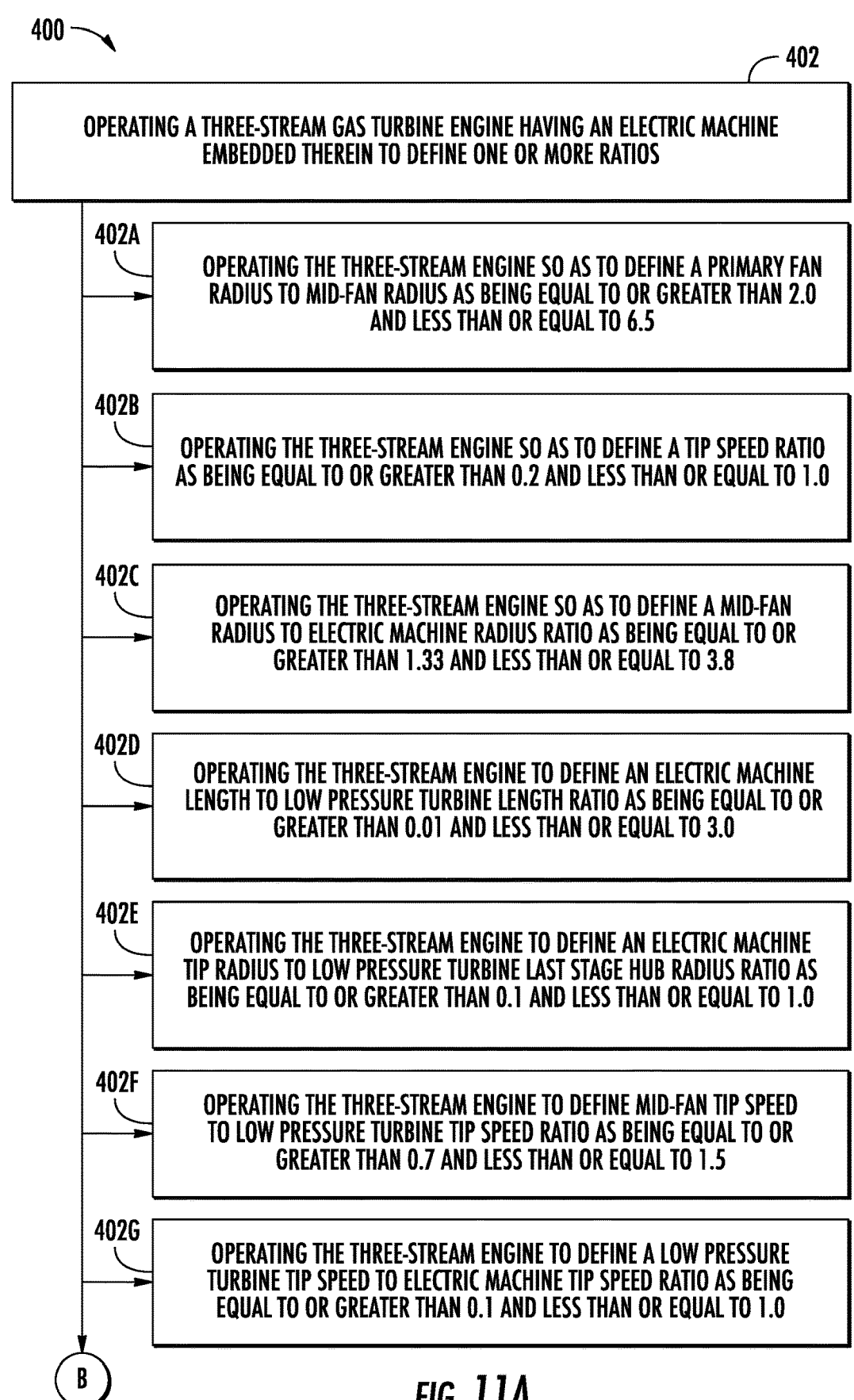

OPERATING A THREE-STREAM GAS TURBINE ENGINE HAVING AN ELECTRIC MACHINE EMBEDDED THEREIN TO DEFINE ONE OR MORE RATIOS

402A

OPERATING THE THREE-STREAM ENGINE SO AS TO DEFINE A PRIMARY FAN RADIUS TO MID-FAN RADIUS AS BEING EQUAL TO OR GREATER THAN 2.0 AND LESS THAN OR EQUAL TO 6.5

402B

OPERATING THE THREE-STREAM ENGINE SO AS TO DEFINE A TIP SPEED RATIO AS BEING EQUAL TO OR GREATER THAN 0.2 AND LESS THAN OR EQUAL TO 1.0

402C

OPERATING THE THREE-STREAM ENGINE SO AS TO DEFINE A MID-FAN RADIUS TO ELECTRIC MACHINE RADIUS RATIO AS BEING EQUAL TO OR GREATER THAN 1.33 AND LESS THAN OR EQUAL TO 3.8

402D

OPERATING THE THREE-STREAM ENGINE TO DEFINE AN ELECTRIC MACHINE LENGTH TO LOW PRESSURE TURBINE LENGTH RATIO AS BEING EQUAL TO OR GREATER THAN 0.01 AND LESS THAN OR EQUAL TO 3.0

402E

OPERATING THE THREE-STREAM ENGINE TO DEFINE AN ELECTRIC MACHINE TIP RADIUS TO LOW PRESSURE TURBINE LAST STAGE HUB RADIUS RATIO AS BEING EQUAL TO OR GREATER THAN 0.1 AND LESS THAN OR EQUAL TO 1.0

402F

OPERATING THE THREE-STREAM ENGINE TO DEFINE MID-FAN TIP SPEED TO LOW PRESSURE TURBINE TIP SPEED RATIO AS BEING EQUAL TO OR GREATER THAN 0.7 AND LESS THAN OR EQUAL TO 1.5

402G

OPERATING THE THREE-STREAM ENGINE TO DEFINE A LOW PRESSURE TURBINE TIP SPEED TO ELECTRIC MACHINE TIP SPEED RATIO AS BEING EQUAL TO OR GREATER THAN 0.1 AND LESS THAN OR EQUAL TO 1.0

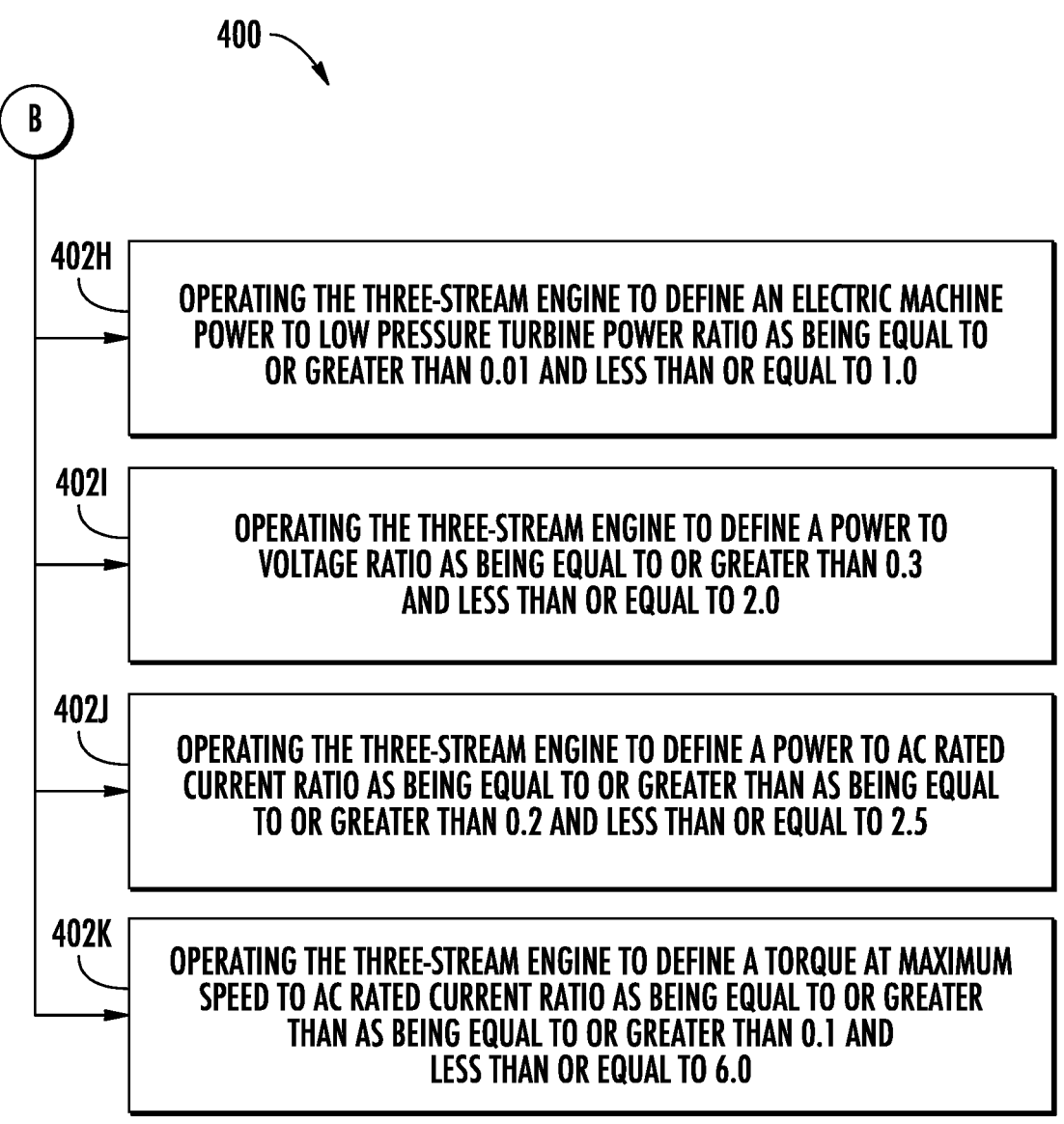
FIG. *11B*

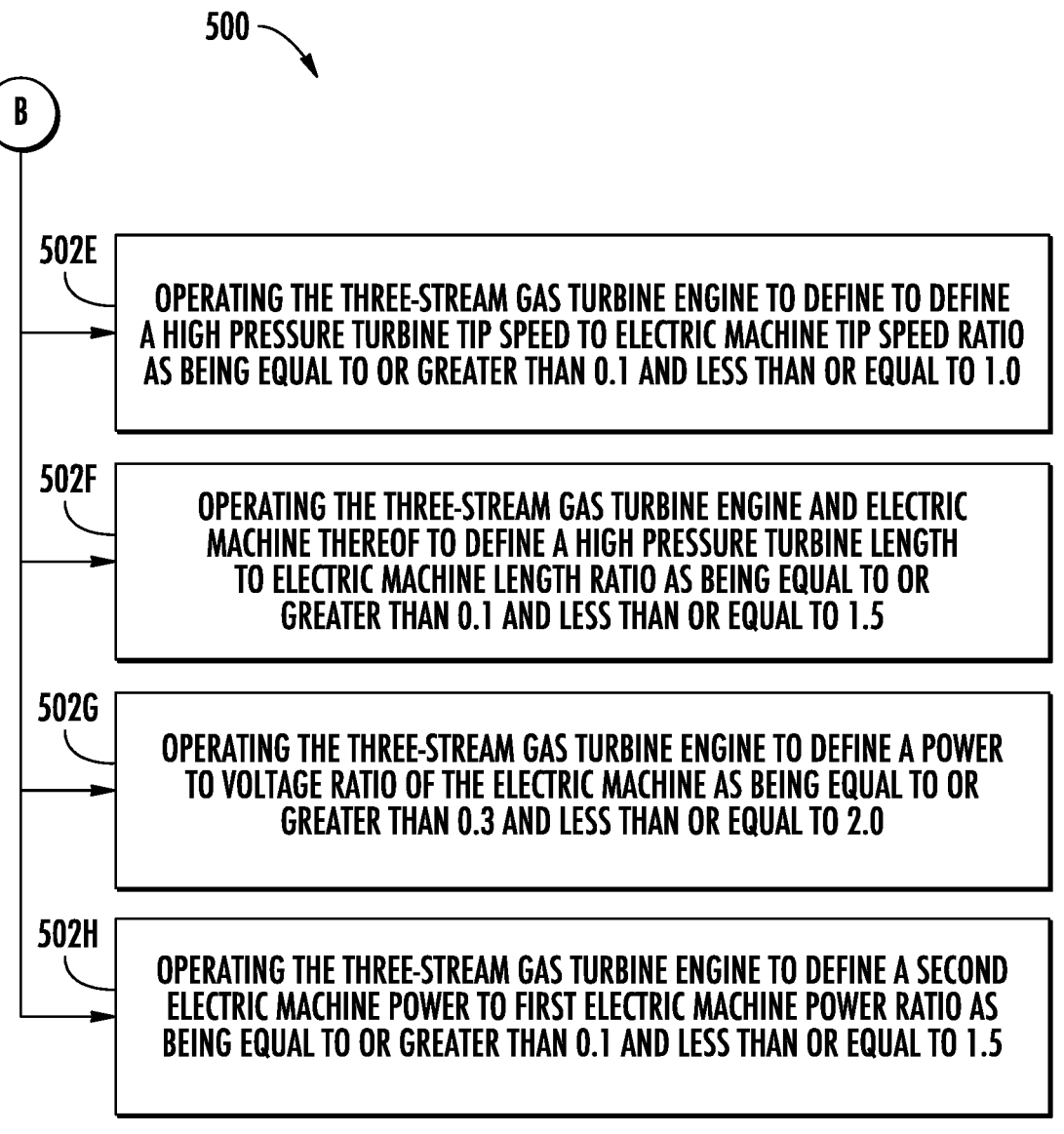

500

B

502E OPERATING THE THREE-STREAM GAS TURBINE ENGINE TO DEFINE TO DEFINE A HIGH PRESSURE TURBINE TIP SPEED TO ELECTRIC MACHINE TIP SPEED RATIO AS BEING EQUAL TO OR GREATER THAN 0.1 AND LESS THAN OR EQUAL TO 1.0

502F OPERATING THE THREE-STREAM GAS TURBINE ENGINE AND ELECTRIC MACHINE THEREOF TO DEFINE A HIGH PRESSURE TURBINE LENGTH TO ELECTRIC MACHINE LENGTH RATIO AS BEING EQUAL TO OR GREATER THAN 0.1 AND LESS THAN OR EQUAL TO 1.5

502G OPERATING THE THREE-STREAM GAS TURBINE ENGINE TO DEFINE A POWER TO VOLTAGE RATIO OF THE ELECTRIC MACHINE AS BEING EQUAL TO OR GREATER THAN 0.3 AND LESS THAN OR EQUAL TO 2.0

502H OPERATING THE THREE-STREAM GAS TURBINE ENGINE TO DEFINE A SECOND ELECTRIC MACHINE POWER TO FIRST ELECTRIC MACHINE POWER RATIO AS BEING EQUAL TO OR GREATER THAN 0.1 AND LESS THAN OR EQUAL TO 1.5

FIG. 12B

THREE-STREAM GAS TURBINE ENGINE WITH EMBEDDED ELECTRIC MACHINE

CROSS REFERENCE TO RELATED APPLICATIONS

The present application claims the benefit of U.S. Provisional Patent Application Ser. No. 63/174,998, filed on Apr. 14, 2021, entitled "THREE-STREAM GAS TURBINE ENGINE WITH EMBEDDED ELECTRIC MACHINE," which is incorporated herein by reference in its entirety.

FIELD

The present subject matter relates generally to gas turbine engines, and more particularly to three-stream gas turbine engines.

BACKGROUND

A gas turbine engine generally includes a fan and a core engine arranged in flow communication with one another. The core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Certain gas turbine engines further include an electric machine operatively coupled thereto so as to define a hybrid-electric gas turbine engine. Such electric machines can be used to generate electrical power. Typically, electrical power generated by the electric machine is utilized for operation of the aircraft and/or engine subsystems. Some electric machines may further be used to drive a rotating component of the engine. However, as electric machines increase in power generation and transmission capability, there is a need for methods of operating an engine including an electric machine so as to improve overall engine performance and operability.

Therefore, a gas turbine engine equipped with an electric machine that addresses one or more of the challenges noted above would be useful.

BRIEF DESCRIPTION

Aspects and advantages of the invention will be set forth in part in the following description, or may be obvious from the description, or may be learned through practice of the invention.

A three-stream engine and methods of operating the same are provided. In one example aspect, a three-stream engine is architecturally arranged so as to produce three distinct streams of propulsive thrust that collectively provide the net propulsive thrust of the engine. The three-stream engine also includes a spool and an electric machine mechanically coupled thereto. In this regard, the three-stream engine is configured as a hybrid-electric machine. The three-stream engine includes a primary fan and a mid-fan. The primary fan and the mid-fan may be coupled with the same spool as the electric machine or to another spool of the engine.

Notably, the three-stream gas turbine engine has certain advantageous architectural arrangements and/or defines certain beneficial operating relationships between components thereof. For instance, various tip speed ratios, radii ratios, length ratios, power to voltage ratios, and power to power ratios, among others, may be defined by the three-stream engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 11A and 11B provide a flow diagram for a method of operating a three-stream engine according to one example embodiment of the present disclosure; and FIGS. 12A and 12B provide a flow diagram for a method of operating a three-stream engine according to one example embodiment of the present disclosure.

DETAILED DESCRIPTION

Figure 1:
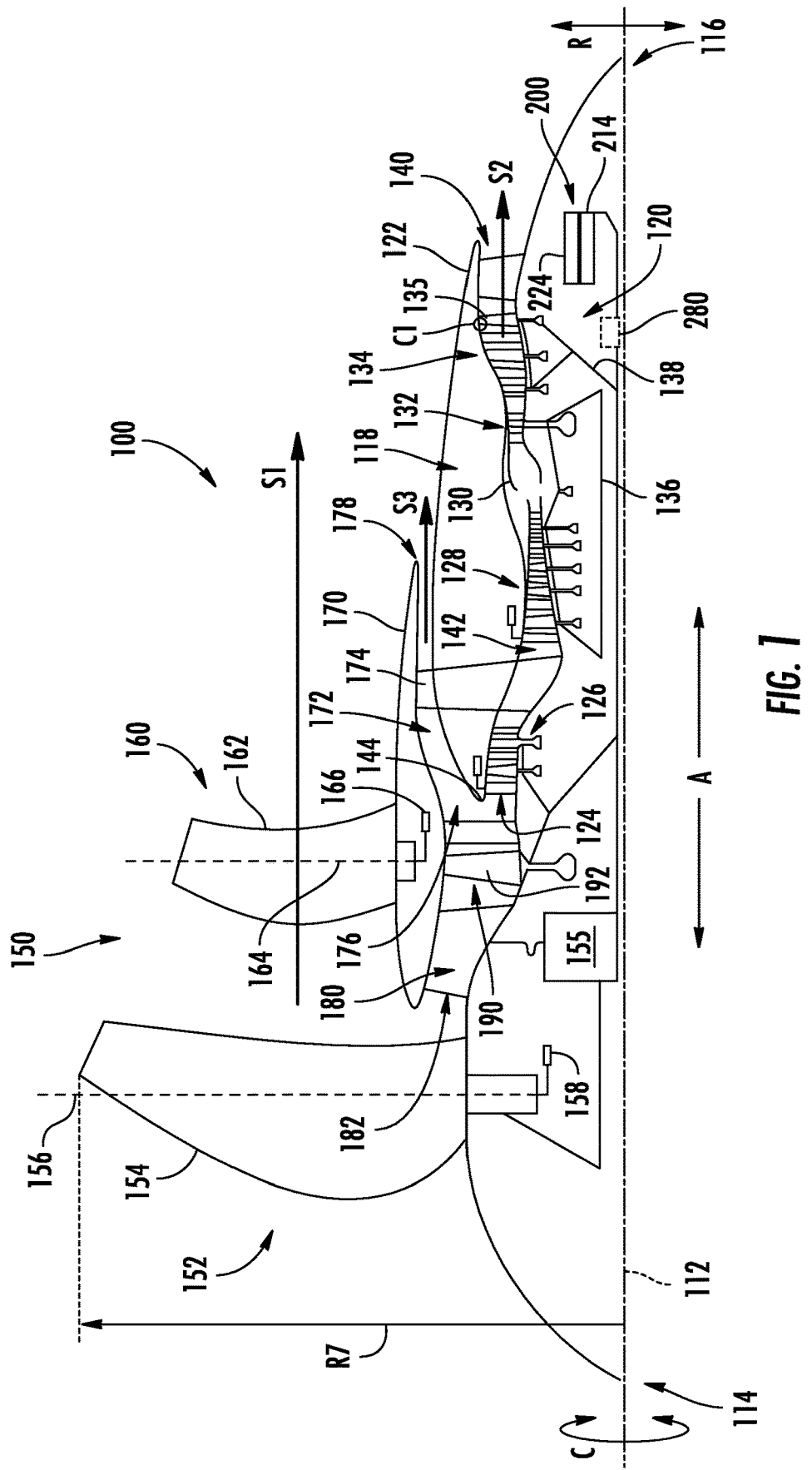
FIG. 1 provides a schematic cross-sectional view of a three-stream gas turbine engine according to various embodiments of the present disclosure.

Reference will now be made in detail to present embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of any claims and their equivalents.

The detailed description uses numerical and letter designations to refer to features in the drawings. Like or similar designations in the drawings and description have been used to refer to like or similar parts of the invention, and identical numerals indicate the same elements throughout the drawings. As used herein, the terms "first", "second", and "third" may be used interchangeably to distinguish one component from another and are not intended to signify location or relative importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 2, 5, 10, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Aspects of the present disclosure are directed to a three-stream gas turbine engine equipped with an embedded electric machine and methods of operating the same. The three-stream engines provided herein are architecturally arranged so as to produce three distinct streams of propulsive thrust that collectively provide the net propulsive thrust of the engine. Notably, the inventors of the present disclosure have recognized that certain architectural arrangements of the three-stream gas turbine engines having an embedded electric machine and/or certain operating relationships between components thereof can provide certain advantages over conventional turbofan engines, such as fuel burn benefits, among other advantages.

For instance, in one example aspect, a three-stream engine and methods of operating the same are disclosed. The three-stream engine includes an electric machine operatively coupled with a shaft or spool of the engine, such as a low pressure shaft. Particularly, the electric machine can include a rotor rotatable with the shaft and a stationary stator. The three-stream engine also includes a core engine and a fan section positioned upstream of the fan section. The fan section includes a primary fan and a mid-fan positioned downstream of the primary fan and upstream of the core engine. The primary fan and the mid-fan are operatively coupled with the shaft. In such embodiments, the architectural arrangement and operating relationships of the components of the three-stream engine can be such that, during operation, the three-stream engine defines a tip speed ratio. The tip speed ratio is defined by a tip speed of the rotor of the electric machine to a tip speed of a mid-fan blade of the mid-fan. In some implementations, for example, the tip speed ratio is defined as being equal to or greater than 0.2 and less than or equal to 1.0. In this regard, the electric machine and the mid-fan are architecturally arranged and operated so that the tip speed of the electric machine is equal to or less than the tip speed of the mid-fan. As will be explained herein, various other architectural and operating relationships can be defined by the three-stream engine in combination with the tip speed ratio.

Turning now to the drawings, FIG. 1 provides a schematic cross-sectional view of a gas turbine engine according to one example embodiment of the present disclosure. Particularly, FIG. 1 provides an aviation three-stream turbofan engine herein referred to as "three-stream engine 100". The three-stream engine 100 of FIG. 1 can be mounted to an aerial vehicle, such as a fixed-wing aircraft, and can produce thrust for propulsion of the aerial vehicle. The three-stream engine 100 is a "three-stream engine" in that its architecture provides three distinct streams of thrust-producing airflow during operation.

For reference, the three-stream engine 100 defines an axial direction A, a radial direction R, and a circumferential direction C. Moreover, the three-stream engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The three-stream engine 100 extends between a forward end 114 and an aft end 116, e.g., along the axial direction A.

The three-stream engine 100 includes a core engine 118 and a fan section 150 positioned upstream thereof. Generally, the core engine 118 includes, in serial flow order, a compressor section, a combustion section, a turbine section, and an exhaust section. Particularly, as shown in FIG. 1, the core engine 118 includes an engine core 120 and a core cowl 122 that annularly surrounds the engine core 120. The engine core 120 and core cowl 122 define an annular core inlet 124. The core cowl 122 further encloses and supports a booster or low pressure compressor 126 for pressurizing the air that enters the core engine 118 through core inlet 124. A high pressure, multi-stage, axial-flow compressor 128 receives pressurized air from the LP compressor 126 and further increases the pressure of the air. The pressurized air stream flows downstream to a combustor 130 where fuel is injected into the pressurized air stream and ignited to raise the temperature and energy level of the pressurized air.

The high energy combustion products flow from the combustor 130 downstream to a high pressure turbine 132. The high pressure turbine 132 drives the high pressure compressor 128 through a first shaft or high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126, components of the fan section 150, and an electric machine 200 through a second shaft or low pressure shaft 138. In this regard, the low pressure turbine 134 is drivingly coupled with the low pressure compressor 126, components of the fan section 150, and the electric machine 200. The LP shaft 138 is coaxial with the HP shaft 136 in this example embodiment. After driving each of the turbines 132, 134, the combustion products exit the core engine 118 through a core exhaust nozzle 140 to produce propulsive thrust. Accordingly, the core engine 118 defines a core flowpath or core duct 142 that extends between the core inlet 124 and the core exhaust nozzle 140. The core duct 142 is an annular duct positioned generally inward of the core cowl 122 along the radial direction R.

The fan section 150 includes a primary fan 152. For the depicted embodiment of FIG. 1, the primary fan 152 is an open rotor or unducted primary fan 152. However, in other embodiments, the primary fan 152 may be ducted, e.g., by a fan casing 157 (FIG. 5) or nacelle circumferentially surrounding the primary fan 152. As depicted, the primary fan 152 includes an array of fan blades 154 (only one shown in FIG. 1). The fan blades 154 are rotatable, e.g., about the longitudinal axis 112. As noted above, the primary fan 152 is drivingly coupled with the low pressure turbine 134 via the LP shaft 138. The primary fan 152 can be directly coupled with the LP shaft 138, e.g., in a direct-drive configuration. Optionally, as shown in FIG. 1, the primary fan 152 can be coupled with the LP shaft 138 via a speed reduction gearbox 155, e.g., in an indirect-drive or geared-drive configuration.

Moreover, the fan blades 154 can be arranged in equal spacing around the longitudinal axis 112. Each blade 154 has a root and a tip and a span defined therebetween. Each blade 154 defines a central blade axis 156. For this embodiment, each blade 154 of the primary fan 152 is rotatable about their respective central blades axes 156, e.g., in unison with one another. One or more actuators 158 can be controlled to pitch the blades 154 about their respective central blades axes 156. However, in other embodiments, each blade 154 may be fixed or unable to be pitched about its central blade axis 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or may be shrouded, e.g., by an annular shroud spaced outward from the tips of the fan guide vanes 162 along the radial direction R. Each fan guide vane 162 defines a central blade axis 164. For this embodiment, each fan guide vane 162 of the fan guide vane array 160 is rotatable about their respective central blades axes 164, e.g., in unison with one another. One or more actuators 166 can be controlled to pitch the fan guide vane 162 about their respective central blades axes 164. However, in other embodiments, each fan guide vane 162 may be fixed or unable to be pitched about its central blade axis 164. The fan guide vanes 162 are mounted to a fan cowl 170.

The fan cowl 170 annularly encases at least a portion of the core cowl 122 and is generally positioned outward of the core cowl 122 along the radial direction R. Particularly, a downstream section of the fan cowl 170 extends over a forward portion of the core cowl 122 to define a fan flowpath or fan duct 172. Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced struts 174 (only one shown in FIG. 1). The struts 174 may each be aerodynamically contoured to direct air flowing thereby. Other struts in addition to struts 174 may be used to connect and support the fan cowl 170 and/or core cowl 122.

The three-stream engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the primary fan 152 and the array of fan guide vanes 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a nose of a splitter 144 of the core cowl 122. The inlet duct 180 is wider than the core duct 142 along the radial direction R. The inlet duct 180 is also wider than the fan duct 172 along the radial direction R.

Figure 2:
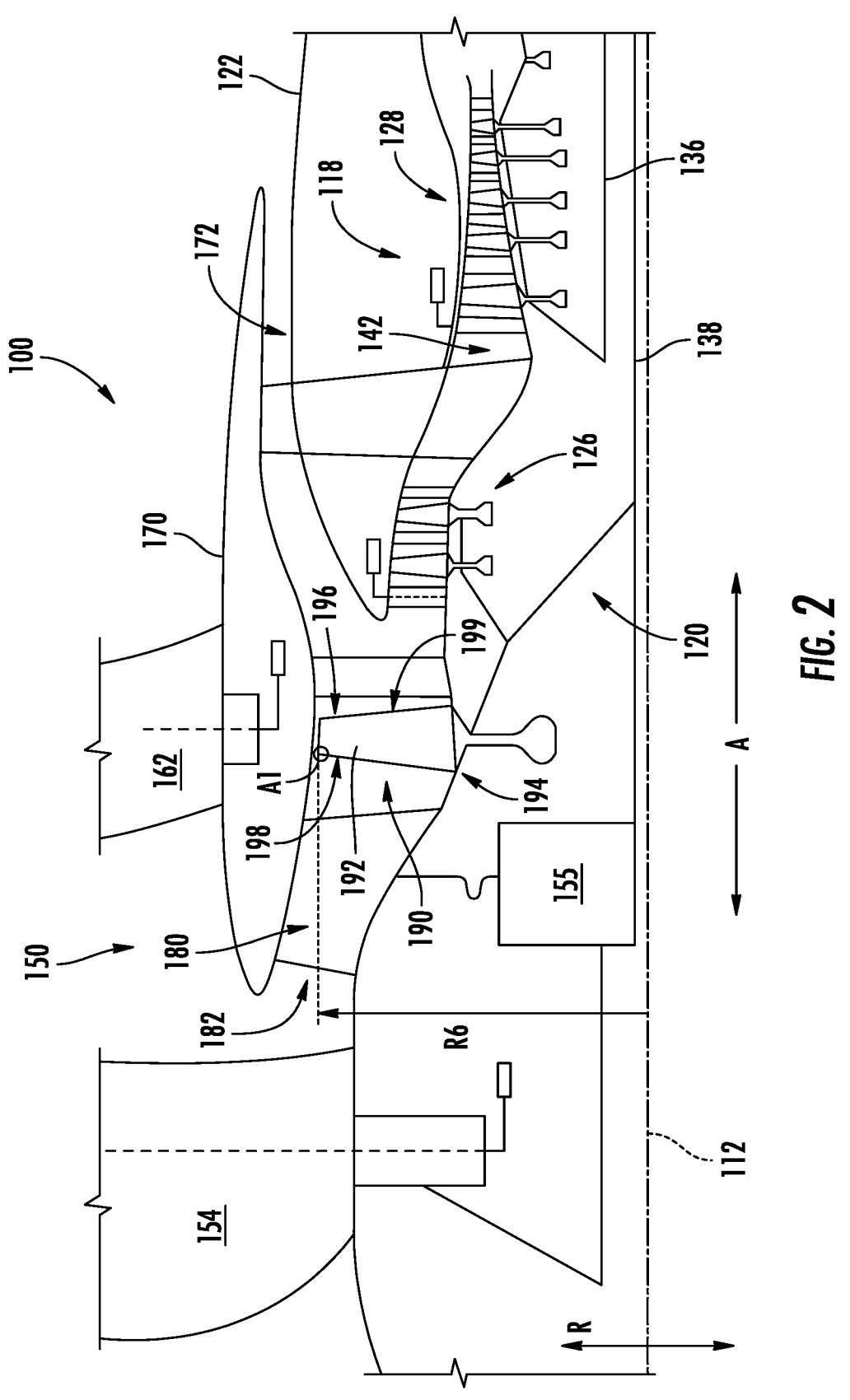
FIG. 2 provides a close-up, schematic cross-sectional view of a forward portion of the three-stream engine of FIG. 1.

Referring now to FIGS. 1 and 2, FIG. 2 provides a close-up, schematic cross-sectional view of a forward portion of the three-stream engine 100. As depicted, the fan section 150 also includes a mid-fan 190. The mid-fan 190 includes an array of mid-fan blades 192 (only one shown in FIG. 1). The mid-fan blades 192 are rotatable, e.g., about the longitudinal axis 112. The mid-fan 190 is drivingly coupled with the low pressure turbine 134 via the LP shaft 138. The mid-fan blades 192 can be arranged in equal circumferential spacing around the longitudinal axis 112. As shown best in FIG. 2, each mid-fan blade 192 has a root 194 and a tip 196 and a span defined therebetween. Moreover, each mid-fan blade 192 has a leading edge 198 and a trailing edge 199. The mid-fan blades 192 are annularly surrounded or ducted by the fan cowl 170. In this regard, the mid-fan 190 is positioned inward of the fan cowl 170 along the radial direction R. Moreover, for this example embodiment, the mid-fan 190 is positioned within the inlet duct 180 upstream of both the core duct 142 and the fan duct 172.

Accordingly, air flowing through the inlet duct 180 flows across the mid-fan blades 192 and is accelerated downstream thereof, particularly at the tips 196 of the mid-fan blades 192. At least a portion of the air accelerated by the mid-fan blades 192 flows into the fan duct 172 and is ultimately exhausted through the fan exhaust nozzle 178 to produce propulsive thrust. Also, at least a portion of the air accelerated by the mid-fan blades 192 flows into the core duct 142 and is ultimately exhausted through the core exhaust nozzle 140 to produce propulsive thrust. Generally, the mid-fan 190 is a compression device positioned downstream of the engine inlet 182. The mid-fan 190 is operable to accelerate air into the fan duct 172 or secondary bypass passage.

Embodiments of the engine, system, and methods provided herein generate an increased unducted rotor efficiency at and above a threshold power loading (i.e., power/area of rotor airfoil). In certain embodiments, the threshold power loading is 25 horsepower per ft$^2$ or greater at cruise altitude. In particular embodiments of the engine, structures and methods provided herein generate power loading between 25 horsepower/ft$^2$ and 100 horsepower/ft$^2$ at cruise altitude. Cruise altitude is generally an altitude at which an aircraft levels after climb and prior to descending to an approach flight phase. In various embodiments, the engine is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degree Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

As such, it will be appreciated that an engine of such a configuration is configured to generate between about 25,000 and 35,000 pounds of thrust during operation at a rated speed.

For the exemplary embodiment of FIG. 1, the primary fan 152 includes twelve (12) fan blades 154. From a loading standpoint, such a blade count may allow a span of each blade 154 to be reduced such that the overall diameter of the primary fan 152 may also be reduced (e.g., to about twelve feet in the exemplary embodiment). That said, in other embodiments, the primary fan 152 may have any suitable blade count and any suitable diameter. In certain suitable embodiments, the primary fan 152 includes at least eight (8) blades 154. In another suitable embodiment, the primary fan 152 may have at least twelve (12) blades 154. In yet another suitable embodiment, the primary fan 152 may have at least fifteen (15) blades 154. In yet another suitable embodiment, the primary fan 152 may have at least eighteen (18) blades 154. In one or more of these embodiments, the primary fan 152 includes twenty-six (26) or fewer blades 154, such as twenty (20) or fewer blades 154. Further, in certain exemplary embodiments, the primary fan 152 may define a diameter of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 16 feet.

In various embodiments, it will be appreciated that the three-stream engine 100 includes a ratio of a quantity of vanes 162 to a quantity of blades 154 that could be less than, equal to, or greater than 1:1. For example, in certain embodiments, the three-stream engine 100 may include a ratio of a quantity of vanes 162 to a quantity of blades 154 between 1:2 and 5:2. The ratio may be tuned based on a variety of factors including a size of the vanes 162 to ensure a desired amount of swirl is removed for an airflow from the primary fan 152.

It should be appreciated that various embodiments of the single unducted rotor engine depicted and described herein may allow for normal subsonic aircraft cruise altitude operation at or above Mach 0.5. In certain embodiments, the engine 100 allows for normal aircraft operation between Mach 0.55 and Mach 0.85 at cruise altitude. In certain embodiments, the engine 100 allows for fan tip speeds (i.e., the tip speeds of the rotor blades 154) at or less than 750 feet per second (fps). As will further be appreciated from the description herein, a loading of the rotor blades 154 of the primary fan 152 or rotor assembly may facilitate such flight speeds.

In addition, the three-stream engine 100 can be arranged to define a primary fan radius to mid-fan radius ratio. The primary fan radius to mid-fan radius ratio is defined as:

$$\text{Primary Fan Radius/Mid-Fan Radius} \qquad \text{(Ratio 1)}$$

The Primary Fan Radius is measured as a radial length or radius spanning along the radial direction R between the longitudinal axis 112 and a leading edge tip of one of the fan blades 154 of the primary fan 152. Particularly, as shown best in FIG. 1, the Primary Fan Radius is measured as Radius R7, which spans along the radial direction R between the longitudinal axis 112 and a leading edge tip of one of the primary fan blades 154. The Mid-Fan Radius is measured as a radial length or radius spanning along the radial direction R between the longitudinal axis 112 and a leading edge tip of one of the mid-fan blades 192 of the mid-fan 190. Particularly, as shown best in FIG. 2, the Mid-Fan Radius is measured as Radius R6, which spans along the radial direction R between the longitudinal axis 112 and a leading edge tip of one of the mid-fan blades 192.

In some embodiments, the three-stream engine 100 defines the primary fan radius to mid-fan radius ratio as being equal to or greater than 2.0 and less than or equal to 6.5. Particularly, in some embodiments, the three-stream engine 100 defines the primary fan radius to mid-fan radius ratio as being at least about 2.0. In other embodiments, the three-stream engine 100 defines the primary fan radius to mid-fan radius ratio as being at least about 2.5. In yet other embodiments, the three-stream engine 100 defines the primary fan radius to mid-fan radius ratio as being at least about 3.0. For instance, in FIG. 1, the primary fan radius to mid-fan radius ratio is slightly greater than 3.0. In some further embodiments, the three-stream engine 100 defines the primary fan radius to mid-fan radius ratio as being at least about 4.0. In yet other embodiments, the three-stream engine 100 defines the primary fan radius to mid-fan radius ratio as being at least about 6.0. In some other embodiments, the three-stream engine 100 defines the primary fan radius to mid-fan radius ratio as being about 6.5. For the embodiments having the stated lower bounds of the primary fan radius to mid-fan radius ratio mentioned in this paragraph, unless stated otherwise, the upper bound of these noted ratios may be up to 6.5. The inventors of the present disclosure have recognized that three-stream engines having a primary fan and mid-fan arranged according to the noted ranges/ratios advantageously balance aerodynamic performance and engine efficiency with mechanical constraints of the primary fan and mid-fan.

With reference to FIG. 1, operation of the three-stream engine 100 may be summarized in the following exemplary manner. During operation, an initial or incoming airflow passes through the fan blades 154 of the primary fan 152 and splits into a first airflow and a second airflow. The first airflow bypasses the engine inlet 182 and flows generally along the axial direction A outward of the fan cowl 170 along the radial direction R. The first airflow accelerated by the primary fan blades 154 passes through the fan guide vanes 162 and continues downstream thereafter to produce a primary propulsion stream or first thrust stream S1. The vast majority of the net thrust produced by the three-stream engine 100 is produced by the first thrust stream S1. The second airflow enters the inlet duct 180 through annular engine inlet 182.

The second airflow flowing downstream through the inlet duct 180 flows through the mid-fan blades 192 of the mid-fan 190 and is consequently compressed. The second airflow flowing downstream of the mid-fan 190 is split by the splitter 144 located at the forward end of the core cowl 122. Particularly, a portion of the second airflow flowing downstream of the mid-fan 190 flows into the core duct 142 through the core inlet 124. The portion of the second airflow that flows into the core duct 142 is progressively compressed by the LP compressor 126 and HP compressor 128 and is ultimately discharged into the combustion section. The discharged pressurized air stream flows downstream to the combustor 130 where fuel is introduced to generate combustion gases or products.

More particularly, the combustor 130 defines an annular combustion chamber that is generally coaxial with the longitudinal centerline axis 112. The combustor 130 receives an annular stream of pressurized air from the HP compressor 128 via a pressure compressor discharge outlet. A portion of this compressor discharge air flows into a mixer (not shown). Fuel is injected by a fuel nozzle to mix with the air thereby forming a fuel-air mixture that is provided to the combustion chamber for combustion. Ignition of the fuel-air mixture is accomplished by one or more suitable igniters, and the resulting combustion gases flow along the axial direction A toward and into an annular, first stage turbine nozzle of the HP turbine 132. The first stage nozzle is defined by an annular flow channel that includes a plurality of radially-extending, circumferentially-spaced nozzle vanes that turn the gases so that they flow angularly and impinge upon the first stage turbine blades of the HP turbine 132. The combustion products exit the HP turbine 132 and flow through the LP turbine 134 and exit the core duct 142 through the core exhaust nozzle 140 to produce a core air stream or second thrust stream S2. For this embodiment, as noted above, the HP turbine 132 drives the HP compressor 128 via the HP shaft 136 and the LP turbine 134 drives the LP compressor 126, the primary fan 152, the mid-fan 190, and the electric machine 200 via the LP shaft 138.

The other portion of the second airflow flowing downstream of the mid-fan 190 is split by the splitter 144 into the fan duct 172. The air enters the fan duct 172 through the fan duct inlet 176. The air flows generally along the axial direction A through the fan duct 172 and is ultimately exhausted from the fan duct 172 through the fan exhaust nozzle 178 to produce a third thrust stream S3.

A "third stream" or third thrust stream S3 as used herein means a secondary air stream capable of increasing fluid energy to produce a minority of total propulsion system thrust. In some embodiments, a pressure ratio of the third stream is higher than that of the primary propulsion stream (e.g., a bypass or propeller driven propulsion stream). The thrust may be produced through a dedicated nozzle or through mixing of the secondary air stream with the primary propulsion stream or a core air stream, e.g., into a common nozzle. In certain exemplary embodiments, an operating temperature of the secondary air stream is less than a maximum compressor discharge temperature for the engine. The operating temperature of the third stream may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments, these operating temperatures may facilitate heat transfer to or from the third stream and a separate fluid stream. Further, in certain exemplary embodiments, the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions. Furthermore in certain exemplary embodiments, aspects of the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

Figure 5:
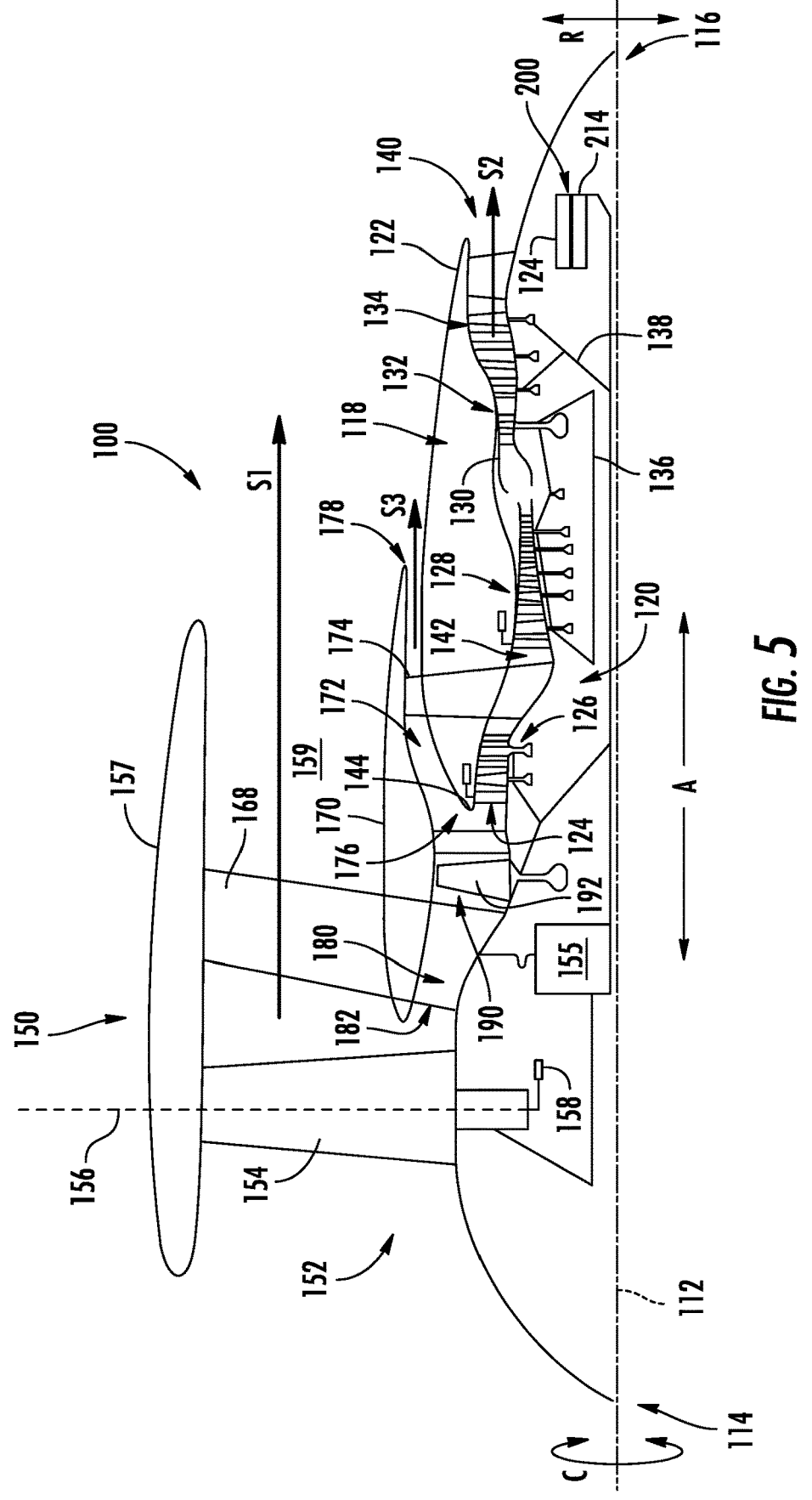
FIG. 5 provides a schematic cross-sectional view of a three-stream gas turbine engine having a ducted primary fan according to various embodiments of the present disclosure.

Although three-stream engine 100 has been described and illustrated in FIG. 1 as representing an example three-stream gas turbine engine operable to produce first thrust stream S1, second thrust stream S2, and third thrust stream S3, it will be appreciated that the inventive aspects of the present disclosure may apply to three-stream gas turbine engines having other configurations. For instance, in other example embodiments, the primary fan 152 can be ducted by fan casing 157 or outer nacelle, e.g., as shown in FIG. 5. As shown in FIG. 5, a bypass passage 159 may be defined between the fan casing 157 and the fan cowl 170. The first thrust stream S1 may flow through the bypass passage 159. One or more circumferentially-spaced outlet guide vanes 168 (only one shown in FIG. 5) can extend between and connect the fan casing 157, the fan cowl 170, and the engine core 120 to provide structural support for these components.

Further, for the depicted embodiment of FIG. 1 (as well as the embodiment of FIG. 5), the three-stream engine 100 includes an electric machine operably coupled with a rotating component thereof. In this regard, the three-stream engine 100 is an aeronautical hybrid-electric propulsion machine. Particularly, as shown in FIG. 1, the three-stream engine 100 includes electric machine 200 operatively coupled with the LP shaft 138. The electric machine 200 can be directly mechanically connected to the LP shaft 138, or alternatively, the electric machine 200 can be mechanically coupled with the LP shaft 138 indirectly, e.g., by way of a gearbox 280. Further, although the electric machine 200 is operatively coupled with the LP shaft 138 at an aft end of the LP shaft 138, the electric machine 200 can be coupled with the LP shaft 138 at any suitable location or can be coupled to other rotating components of the three-stream engine 100, such as the HP shaft 136.

In some embodiments, the electric machine 200 can be an electric motor operable to drive or motor the LP shaft 138, e.g., during an engine burst. In other embodiments, the electric machine 200 can be an electric generator operable to convert mechanical energy into electrical energy. In this way, electrical power generated by the electric machine 200 can be directed to various engine and/or aircraft systems. In some embodiments, the electric machine 200 can be a motor/generator with dual functionality. The electric machine 200 will be further described below with respect to FIG. 3.

Figure 3:
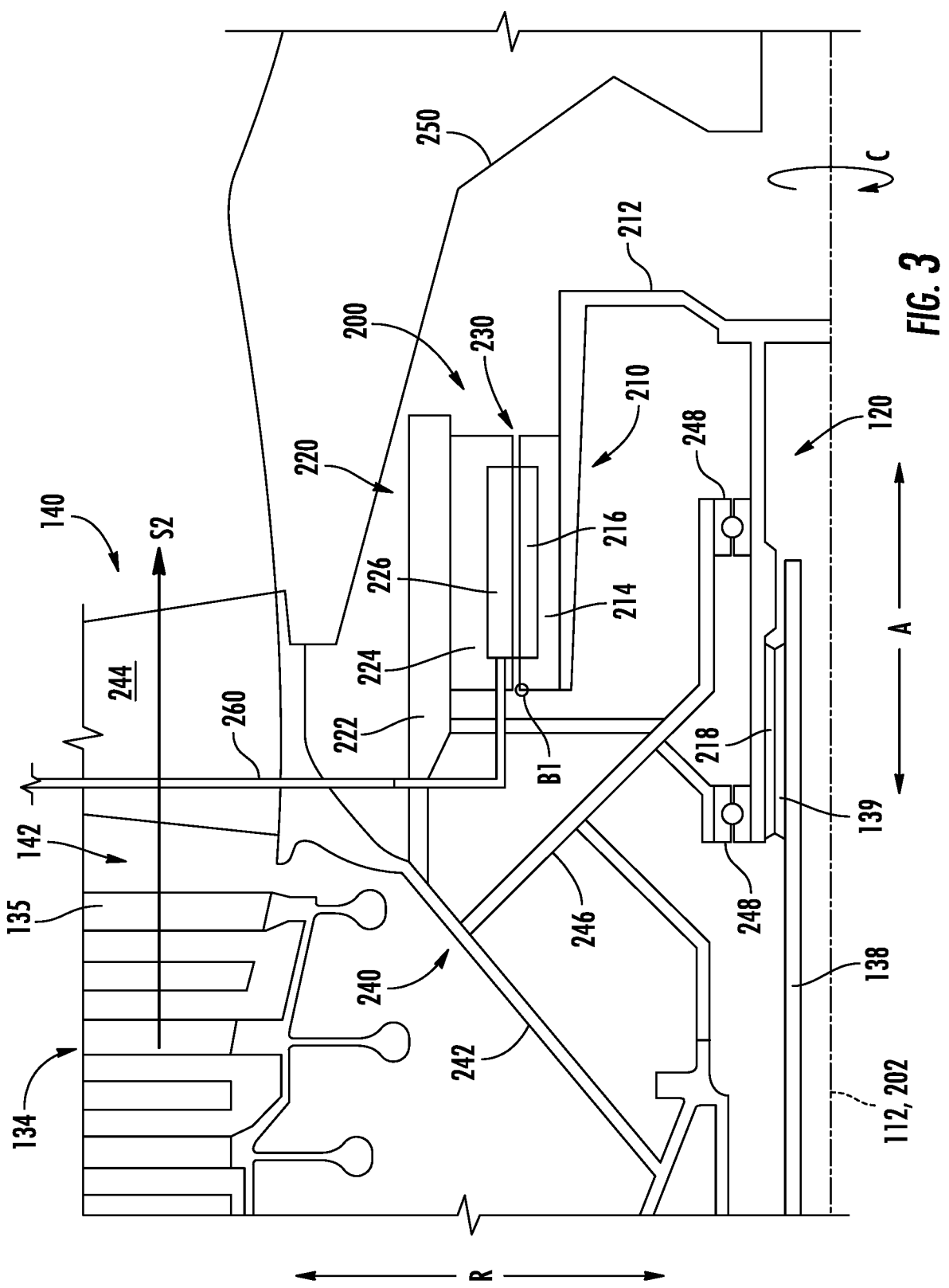
FIG. 3 provides a schematic, cross-sectional view of an electric machine embedded in the three-stream gas turbine engine of FIG. 1.
Figure 6:
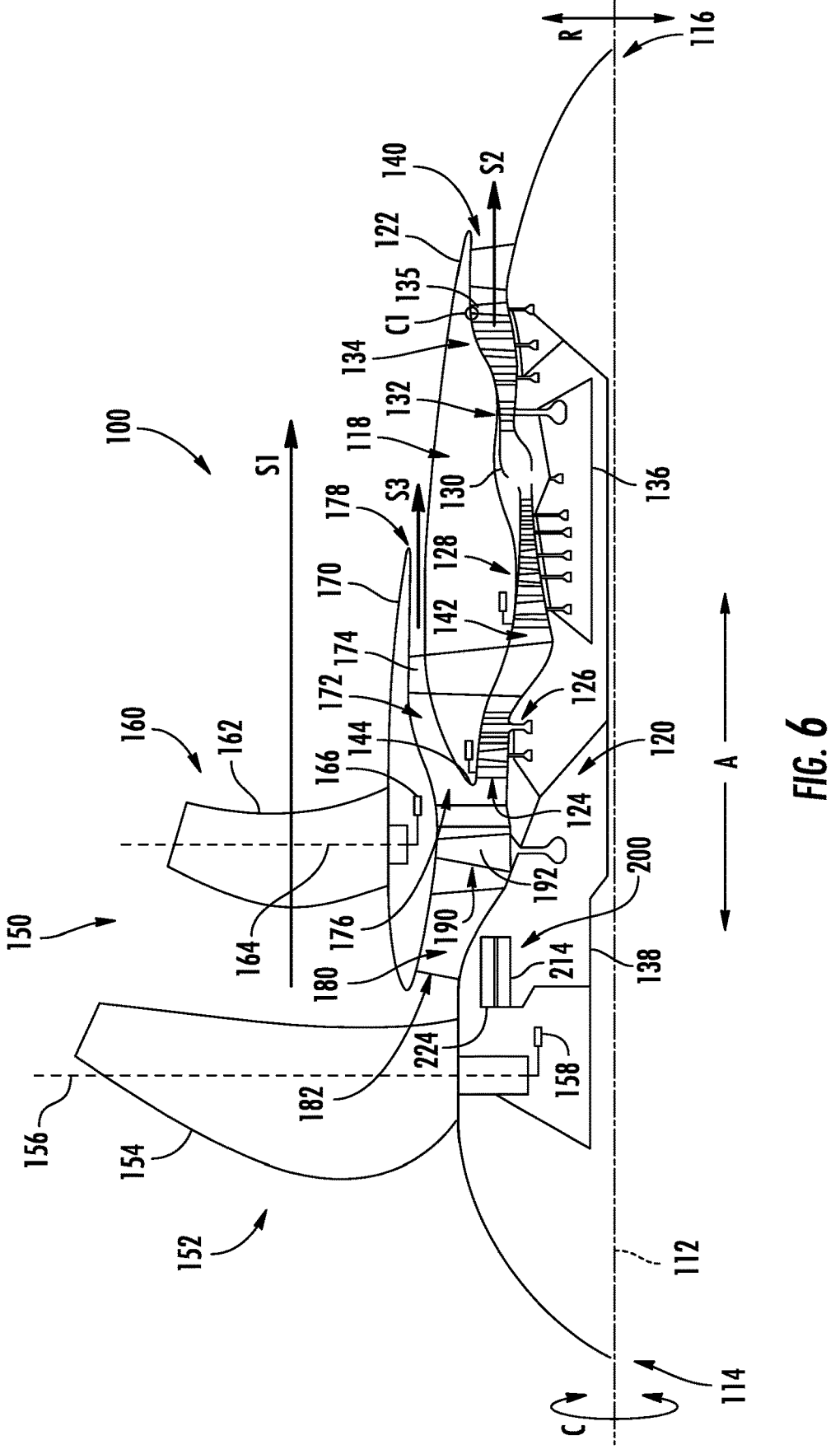
FIG. 6 provides a schematic cross-sectional view of a three-stream gas turbine engine having an embedded electric machine positioned forward of a mid-fan according to various embodiments of the present disclosure.

With reference now to FIGS. 1 and 3, FIG. 3 provides a close-up schematic view of the electric machine 200 embedded within the three-stream engine 100. As shown, the electric machine 200 is embedded within the three-stream engine 100 proximate its aft end 116. Particularly, the electric machine 200 is positioned aft of the mid-fan 190 and at least partially overlapping with or aft of the LP turbine 134 along the axial direction A. Moreover, for this embodiment, the electric machine 200 is positioned inward of the core duct 142 along the radial direction R. The electric machine 200 is operatively coupled with the LP shaft 138, as noted above. It will be appreciated that in other exemplary embodiments the electric machine 200 may be positioned at other suitable locations within the three-stream engine 100. For instance, in some embodiments, the electric machine 200 can be coupled with the LP shaft 138 and positioned forward of the mid-fan 190 along the axial direction, e.g., as shown in FIG. 6.

Referring to FIG. 3, the electric machine 200 includes a rotor assembly 210 and a stator assembly 220. The electric machine 200 also defines a centerline 202, which is aligned with or coaxial with the longitudinal axis 112 of the three-stream engine 100 in this example embodiment. The rotor assembly 210 includes a rotor connection member 212 and a rotor 214. The stator assembly 220 similarly includes stator connection member 222 and a stator 224. The rotor 214 of the rotor assembly 210 and the stator 224 of the stator assembly 220 together define an air gap 230 therebetween. Moreover, for this embodiment, the rotor 214 includes a plurality of magnets 216, such as a plurality of permanent magnets, and the stator 224 includes a plurality of windings or coils 226. As such, the electric machine 200 may be referred to as a permanent magnet electric machine. However, in other exemplary embodiments, the electric machine 200 may be configured in any suitable manner. For example, the electric machine 200 may be configured as an electro-magnetic electric machine, including a plurality of electro-magnets and active circuitry, as an induction type electric machine, a switched reluctance type electric machine, a synchronous AC electric machine, an asynchronous electric machine, or as any other suitable electric generator/motor.

For this embodiment, the rotor assembly 210 of the electric machine 200 is coupled with or attached to the LP shaft 138. In this manner, the rotor assembly 210 is rotatable with the LP shaft 138. The attachment of the rotor assembly 210 to the LP shaft 138 will be described in more detail below. The stator assembly 220 is coupled with or attached to a structural support member 242 of the turbine section. More specifically, the stator connection member 222 extends from the structural support member 242 to the stator 224 to support the stator 224. The structural support member 242 is configured as part of an aft frame assembly 240. The aft frame assembly 240 further includes an aft frame strut 244 extending through the core duct 142 of the core engine 118. The aft frame strut 244 provides structural support for the three-stream engine 100. The structural support member 242 extends from an inner end of the aft frame strut 244 along the radial direction R.

The three-stream engine 100 further includes a cavity wall 250 surrounding at least a portion of the electric machine 200. More specifically, the cavity wall 250 substantially completely surrounds the electric machine 200, extending from a location proximate a forward end of the electric machine 200 to a location aft of the electric machine 200 along the axial direction A. The cavity wall 250 may function as, e.g., a cooling air cavity wall, a sump for cooling fluid, a protective cover for the electric machine 200, etc. For example, in certain embodiments, the three-stream engine 100 may further include a second cavity wall (not shown) to form a buffer cavity surrounding the electric machine 200 and thermally protect the electric machine 200.

During certain operations of the three-stream engine 100, the LP shaft 138 rotates the rotor assembly 210 of the electric machine 200, allowing the electric machine 200 to generate electrical power. Thus, the electric machine 200 is operable in a generator mode. In some embodiments, in addition or alternatively to being operable in a generator mode, the electric machine 200 is operable in a drive mode during certain operations of the three-stream engine 100. In a drive mode, the rotor assembly 210 of the electric machine

200 drives the LP shaft 138. The electric machine 200 is electrically connected to an electric power bus 260. The electric power bus 260 is electrically connected to the electric machine 200 at a location inward of the core duct 142 along the radial direction R. The electric power bus 260 may extend through the core duct 142 (e.g., through the aft frame strut 244) and electrically connect the electric machine 200 to one or more electrical loads (accessory systems, electric/hybrid-electric propulsion devices, etc.), electrical sources (other electric machines, electric energy storage units, etc.), or both. Electrical power can be provided to the electric machine 200 via the electric power bus 260, e.g., when the electric machine 200 is operating in a drive mode, and electrical power generated by the electric machine 200 can be carried or transmitted to electrical systems via the electric power bus 260, e.g., when the electric machine 200 is operating in a generator mode.

As noted above, the rotor assembly 210 is coupled to the LP shaft 138 in this embodiment. As depicted, the rotor connection member 212 extends between the LP shaft 138 and the rotor 214 for connecting the rotor 214 to the LP shaft 138. For the embodiment shown, the rotor connection member 212 is connected to the LP shaft 138 through a splined connection. More particularly, the rotor connection member 212 includes a connection portion having a plurality of teeth 218 extending generally along the axial direction A, and similarly, the LP shaft 138 includes a connection portion having a plurality of teeth 139 extending generally along the axial direction A. The plurality of teeth 218 of the rotor connection member 212 are configured to engage with the plurality of teeth 139 of the LP shaft 138, fixing the two components to one another. In alternative embodiments, the rotor connection member 212 may be coupled to the LP shaft 138 in any other suitable manner. One or more bearings 248 coupled with an extension support member 246 of the aft frame assembly 240 may support the rotor connection member 212 relative to the LP shaft 138.

Although the electric machine 200 has been described and illustrated in FIG. 3 as having a particular configuration, it will be appreciated that the inventive aspects of the present disclosure may apply to electric machines having alternative configurations. For instance, the stator assembly 220 and/or rotor assembly 210 may have different configurations or may be arranged in a different manner than illustrated in FIG. 3. As one example, in some embodiments, the electric machine 200 may have a tapered configuration in which the rotor 214 and the stator 224 may extend lengthwise along the axial direction A at an angle with respect to the longitudinal axis 112, e.g., so that they are not oriented parallel with the longitudinal axis 112.

Notably, the inventors of the present disclosure discovered, during the course developing the aforementioned embodiments, certain operating and geometric relationships between various components of three-stream gas turbine engines having an embedded electric machine that provide certain advantages over conventional turbofan engines. Additionally, the inventors discovered, during the course of conceiving various embodiments of turbomachines (including those illustrated and described above), certain relationships, which if adopted for a turbomachine can simplify the selection, integration or development process for other subsystems residing within the overall architecture, in addition to providing the noted advantages inherent in the selection of one or more these relationships for an engine. As one example, a three-stream engine having an embedded electric machine, such as disclosed in FIGS. 1, 2, and 3 as well as in other noted embodiments provided herein, may include components operating or arranged geometrically in advantageous relationships, as explained in greater detail below. Ultimately, adoption of a three-stream engine having an embedded electric machine as disclosed herein can provide significant fuel burn advantages over conventional turbofans, among other benefits, which also takes into account the operational, integration, and sizing constraints for a turbomachine adopting such an architecture. Additionally, the disclosure informs the skilled artisan of the impact that such an architecture has on an overall propulsive system, how related systems may be selected as suitable or not suitable, where subsystems can be located and what the operational, environmental, etc. requirements may be, based on the relationships defined herein.

With reference now to FIGS. 1, 2, and 3, as noted, the electric machine 200 and the mid-fan 190 are operatively coupled with the LP shaft 138. In this regard, the electric machine 200 and the mid-fan 190 are both tied to the LP shaft 138 and can operate at a tip speed ratio with respect to one another. The tip speed ratio can be constant, particularly during high efficiency operations and excluding situations where the electric machine 200 is decoupled from the LP shaft 138, e.g., by way of a clutch (not shown). The tip speed ratio is defined by a tip speed of the rotor 214 of the electric machine 200 to a tip speed of one of the mid-fan blades 192 of the mid-fan 190. Stated another way, the tip speed ratio may be defined as:

EM Tip Speed/Mid-Fan Tip Speed (Ratio 2)

Figure 4:
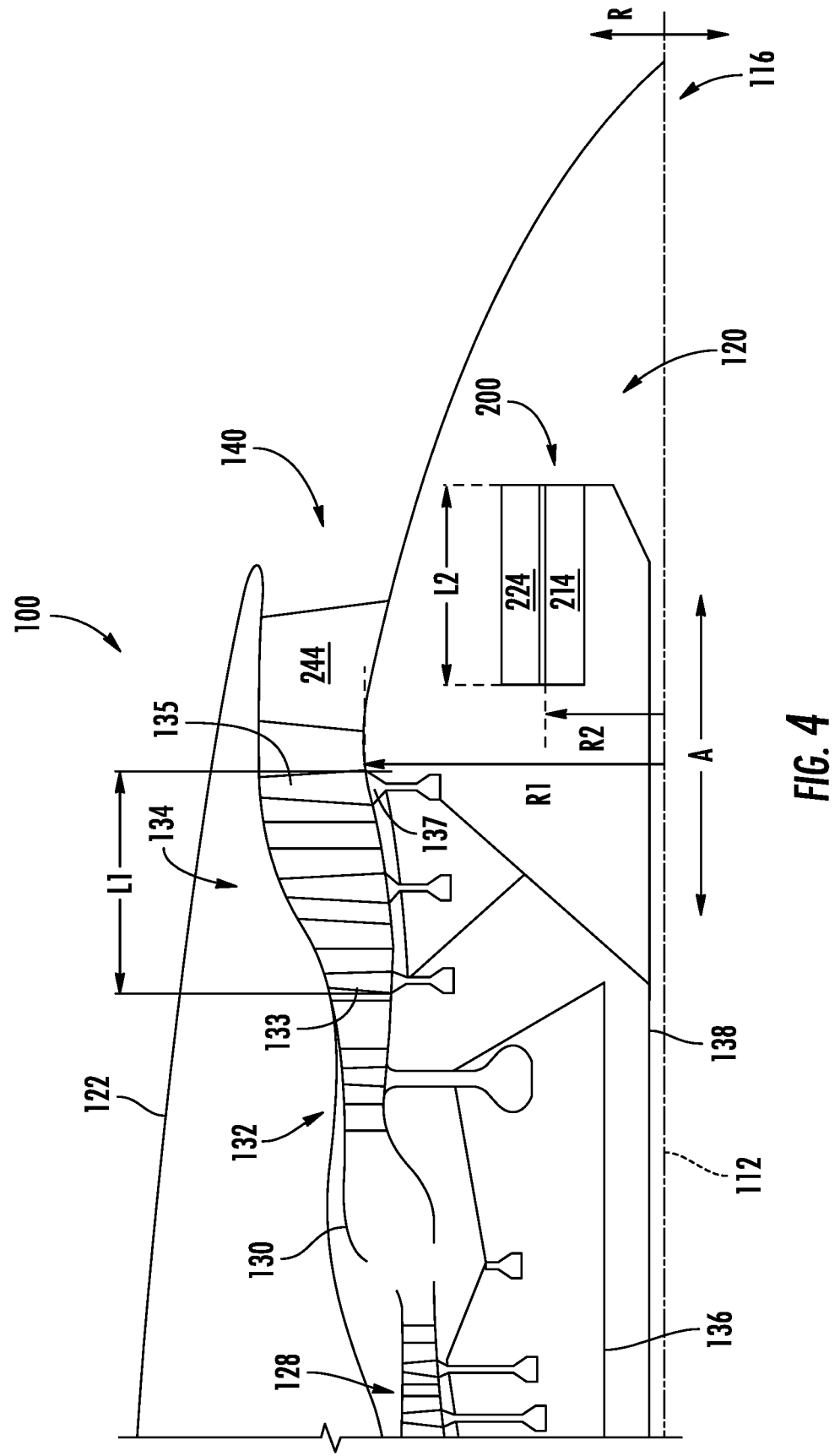
FIG. 4 provides a schematic, cross-sectional view of an aft portion of the three-stream gas turbine engine of FIG. 1.

The EM Tip Speed is measured at an outermost point of the rotor 214 of the electric machine 200, e.g., at a location B1 depicted in FIG. 3. The outermost point of the rotor 214 is defined as the outermost point of the rotor 214 along the radial direction R with respect to the longitudinal axis 112. The Mid-Fan Tip Speed is measured at a leading edge tip of one of the mid-fan blades 192, e.g., at a location A1 depicted in FIG. 2. The tip speeds can be measured in any suitable units of speed, such as meters per second. The same unit of speed is to be used for both the EM Tip Speed and the Mid-Fan Tip Speed when determining the tip speed ratio. In some embodiments, when the three-stream engine 100 is operated, the rotor 214 of the electric machine 200 has a rotor tip speed being equal to or greater than 50 meters per second and less than or equal to 200 meters per second. In yet other embodiments, when the three-stream engine 100 is operated, the rotor 214 of the electric machine 200 has a rotor tip speed being equal to or greater than 140 meters per second and less than or equal to 190 meters per second. Such a rotor tip speed range is particularly suited for electric machines operated and arranged as shown in FIGS. 1, 3, and 4, e.g., in a "tail cone" or aft position. Such a rotor tip speed range is also particularly suited for electric machines operated and arranged as shown in FIGS. 1, 3, and 4 except that the electric machine has an outer rotor configuration instead of the inner rotor configuration shown in FIGS. 1, 3, and 4. However, as noted, the rotor 214 of the electric machine 200 may have a rotor tip speed being equal to or greater than 50 meters per second and less than or equal to 200 meters per second.

In some embodiments, the three-stream engine 100 is operated so as to define the tip speed ratio as being equal to or greater than 0.2 and less than or equal to 1.0. In this regard, the speed of the tip of the rotor 214 of the electric machine 200 is less than or equal to the leading edge tip speed of one of the mid-fan blades 192 of the mid-fan 190. The range for the tip speed ratio captures the architectural and operating relationship between the mid-fan 190 and the electric machine 200 of the three-stream engine 100, both of which are coupled to the LP shaft 138. The electric machine tip speed defines the mechanical and operating constraints associated with the electric machine 200 while the mid-fan tip speed defines the mechanical and operating constraints associated with the mid-fan 190. The inventors of the present disclosure have recognized that three-stream engines operated so as to define the tip speed ratio within one or more of the noted ranges have certain architectural and operating advantages. For instance, operating a three-stream engine within the noted ranges for the tip speed ratio can prevent unacceptable penalties on the power density of the electric machine 200, can prevent too much tip speed on the mid-fan 190, and can prevent the mechanical capabilities of electrical components of the electric machine 200 from exceeding their limits, among other benefits.

Referring still to FIGS. 1 through 3 and also to FIG. 4, in some embodiments, the three-stream engine 100 can be arranged to define a mid-fan radius to electric machine radius ratio. The mid-fan radius to electric machine radius ratio is defined as:

Mid-Fan Radius/EM Tip Radius (Ratio 3)

The mid-fan radius to electric machine radius ratio can be a fixed ratio as these two radii can be fixed. The Mid-Fan Radius is measured as a radial length or radius spanning along the radial direction R between the longitudinal axis 112 and a leading edge tip of one of the mid-fan blades 192 of the mid-fan 190. Particularly, as shown best in FIG. 2, the Mid-Fan Radius is measured as Radius R6, which spans along the radial direction R between the longitudinal axis 112 and a leading edge tip of one of the mid-fan blades 192. As shown best in FIG. 4, the EM Tip Radius is measured as a Radius R2 spanning along the radial direction R between the longitudinal axis 112 and an outermost point of the rotor 214 of the electric machine 200.

In some embodiments, the three-stream engine 100 defines the mid-fan radius to electric machine radius ratio as being equal to or greater than 1.33 and less than or equal to 3.8. In some further embodiments, the three-stream engine 100 defines the mid-fan radius to electric machine radius ratio as being equal to or greater than 2.5 and less than or equal to 3.3. In yet other embodiments, the three-stream engine 100 defines the mid-fan radius to electric machine radius ratio as being equal to or greater than 2.9 and less than or equal to 3.2. The ranges for the mid-fan radius to electric machine radius ratio capture the architectural and operating relationship between the electric machine 200 and the mid-fan 190 of the three-stream engine 100, both of which are coupled to the LP shaft 138 in such example embodiments.

Particularly, the inventors of the present disclosure have recognized that three-stream engines having an electric machine and mid-fan arranged according to the noted ranges advantageously balance aerodynamic performance and mechanical constraints of the mid-fan with electric machine performance, mechanical capabilities of electrical components of the electric machine, physical space required for the electric machine, and thermal management of the electric machine. For instance, in accordance with the noted ranges for the mid-fan radius to electric machine radius ratio, the mid-fan may be positioned far enough from the longitudinal axis so that a satisfactory thrust contribution is produced by the third stream and so that acceptable efficiency is achieved, and further, the mid-fan is positioned close enough to the longitudinal axis so that shock losses from supersonic tip speeds do not unduly affect performance and so that the weight of the mid-fan is acceptable. The noted ranges allow for the mid-fan to be arranged to achieve these advantages whilst preventing unacceptable penalties on the power density of the electric machine as well as preventing the mechanical capabilities of electrical components of the electric machine from exceeding their limits.

Referring still to FIGS. 1 through 4, in some embodiments, the three-stream engine 100 can be arranged to define an electric machine length to low pressure turbine length ratio. The electric machine length to low pressure turbine length ratio is defined by an axial length of the electric machine 200 to an axial length of the LP turbine 134. Stated another way, the electric machine length to low pressure turbine length ratio may be defined as:

$$\text{EM Length/LPT Length} \qquad \qquad \text{(Ratio 4)}$$

The electric machine length to low pressure turbine length ratio can be a fixed ratio as the axial length of the electric machine 200 and the axial length of the LP turbine 134 are fixed. The EM Length is measured as the axial length of the electric machine 200. Particularly, as illustrated in FIG. 4, the axial length of the electric machine 200 is defined as a length L2 spanning along the axial direction A between a leading edge of the rotor 214 and a trailing edge of the rotor 214 of the electric machine 200. The LPT Length is measured as the axial length of the LP turbine 134. More specifically, as shown best in FIG. 4, the axial length of the LP turbine 134 is defined as a length L1 spanning along the axial direction A between a leading edge of a hub of one of the first stage turbine blades 133 of the LP turbine 134 to a trailing edge of a hub of one of the last stage turbine blades 135 of the LP turbine 134. The same unit of length is to be used for both the EM Length and the LPT Length when determining the electric machine length to low pressure turbine length ratio.

In some embodiments, the electric machine 200 and the LP turbine 134 of the three-stream engine 100 define the electric machine length to low pressure turbine length ratio as being equal to or greater than 0.01 and less than or equal to 3.0. In other embodiments, the electric machine length to low pressure turbine length ratio is equal to or greater than 0.01 and less than or equal to 0.5, equal to or greater than 0.3 and less than or equal to 1.0, or greater than 1.0 and less than or equal to 3.0, or greater than 2.0 and less than or equal to 3.0. The ranges for the electric machine length to low pressure turbine length ratio capture the architectural and operating relationship between the electric machine 200 and the LP turbine 134 of the three-stream engine 100, both of which are coupled to the LP shaft 138 in such example embodiments. More specifically, the inventors of the present disclosure have recognized that three-stream engines having an electric machine and LP turbine arranged according to the noted range advantageously balance weight and loading or efficiency considerations of the LP turbine with the space, size, and performance requirements of the electric machine.

Referring still to FIGS. 1 through 4, in some embodiments, the three-stream engine 100 can be arranged to define an electric machine tip radius to low pressure turbine last stage hub radius ratio. The electric machine tip radius to low pressure turbine last stage hub radius ratio may be defined as:

$$\text{EM Tip Radius/LPT Last Stage Blade Hub Radius} \qquad \text{(Ratio 5)}$$

The electric machine tip radius to low pressure turbine last stage hub radius ratio can be a fixed ratio as these two radii can be fixed. The EM Tip Radius is measured as a Radius R2 spanning along the radial direction R between the longitudinal axis 112 and an outermost point of the rotor 214 of the electric machine 200. The LPT Last Stage Blade Hub Radius is measured as a radial length or radius spanning along the radial direction R between the longitudinal axis 112 and an outermost point of a hub of one of the last stage turbine blades 135 of the LP turbine 134. Particularly, as shown best in FIG. 4, the LPT Last Stage Blade Hub Radius is measured as Radius R1, which spans along the radial direction R between the longitudinal axis 112 and an outermost point taken at the trailing edge of a hub 137 of one of the last stage turbine blades 135 of the LP turbine 134. The outermost point taken at the trailing edge of the hub 137 is the outermost point of the hub 137 with respect to the longitudinal axis 112 along the radial direction R.

In some embodiments, the LP turbine 134 and the electric machine 200 of the three-stream engine 100 define the electric machine tip radius to low pressure turbine last stage hub radius ratio as being equal to or greater than 0.1 and less than or equal to 1.0, or equal to or greater than 0.1 and less than or equal to 0.5, or equal to or greater than 0.4 and less than or equal to 1.0, or equal to or greater than 0.7 and less than or equal to 1.0. The ranges for the electric machine tip radius to low pressure turbine last stage hub radius ratio capture the architectural and operating relationship between the electric machine 200 and the LP turbine 134 of the three-stream engine 100, both of which are coupled to the LP shaft 138.

The inventors of the present disclosure have recognized that three-stream engines having an electric machine and LP turbine arranged according to the noted range advantageously balances the geometry constraints and operating performance and efficiency of the LP turbine and electric machine, and also accounts for thermal constraints associated with the electric machine, particularly for three-stream engines having an embedded electric machine positioned as shown best in FIGS. 1, 3, and 4. Specifically, the inventors have recognized that architectures with the noted range result in two optimizations. In accordance with the noted range of the electric machine tip radius to low pressure turbine last stage hub radius ratio, the LP turbine is positioned far enough from the longitudinal axis to provide satisfactory turbine efficiency as well as physical space for the electric machine while not being positioned too far from the longitudinal axis to make installation and packaging of the engine unworkable. Further, in accordance with the noted range of the electric machine tip radius to low pressure turbine last stage hub radius ratio, the electric machine is positioned far enough from the longitudinal axis to provide satisfactory electric machine performance whilst also accounting for the thermal constraints associated with the electric machine.

In addition, as noted previously, the mid-fan 190 and the LP turbine 134 are operatively coupled with the LP shaft 138. In this regard, the mid-fan 190 and the LP turbine 134 are both tied to the LP shaft 138 and can operate so as to define a mid-fan tip speed to low pressure turbine tip speed ratio. The mid-fan tip speed to low pressure turbine tip speed ratio can be constant, particularly during high efficiency operations of the three-stream engine 100. The mid-fan tip speed to low pressure turbine tip speed ratio is defined by a tip speed of one of the mid-fan blades 192 of the mid-fan 190 to a tip speed of a last stage turbine blade 135 (see FIGS. 1 and 3) of the LP turbine 134. Stated another way, the mid-fan tip speed to low pressure turbine tip speed ratio may be defined as:

$$\text{Mid-Fan Tip Speed/LPT Tip Speed} \qquad \text{(Ratio 6)}$$

As noted above, the Mid-Fan Tip Speed is measured at a leading edge tip of one of the mid-fan blades 192, e.g., at a location A1 depicted in FIG. 2. The LPT Tip Speed is measured at a leading edge tip of one of the last stage turbine blades 135 of the LP turbine 134, e.g., at a location C1 depicted in FIG. 1.

In some embodiments, the three-stream engine 100 is operated so as to define the mid-fan tip speed to low pressure turbine tip speed ratio as being equal to or greater than 0.7 and less than or equal to 1.5. In yet other embodiments, the three-stream engine 100 is operated so as to define the mid-fan tip speed to low pressure turbine tip speed ratio as being equal to or greater than 0.8 and less than or equal to 1.2. In some further embodiments, the three-stream engine 100 is operated so as to define the mid-fan tip speed to low pressure turbine tip speed ratio as being equal to or greater than 0.9 and less than or equal to 1.1. Such measurements can be taken at a red line speed of the three-stream engine 100 or at any other speed.

The inventors of the present disclosure have recognized that three-stream engines operated so as to define the mid-fan tip speed to low pressure turbine tip speed ratio within one or more of the noted ranges have certain architectural and operating advantages. Particularly, operating a three-stream engine within the noted ranges for the mid-fan tip speed to low pressure turbine tip speed ratio can ensure that the radius of the mid-fan (i.e., a radial length or radius spanning along the radial direction R between the longitudinal axis and a leading edge tip of one of the mid-fan blades of the mid-fan) is optimized relative to the low pressure turbine architecture. For instance, when the mid-fan radius is too large, the tip speed of the mid-fan may drive unacceptable aerodynamic losses. Moreover, mechanical stresses on the mid-fan may become excessive. In contrast, when the mid-fan radius is too small, the average velocity in the low pressure turbine blade passage may become too high, which may drive increased aerodynamic losses. Alternatively, the hub radii of the mid-fan blades may need to be reduced to pass the required flow. Consequently, this may increase the engine length due to duct slope limitations and other packaging constraints. The inventors of the present disclosure have taken these considerations into account in developing the noted ranges for the mid-fan tip speed to low pressure turbine tip speed ratio.

Further, as noted above, the electric machine 200 and the LP turbine 134 are operatively coupled with the LP shaft 138. In this regard, the electric machine 200 and the LP turbine 134 are both tied to the LP shaft 138 and can operate so as to define a low pressure turbine tip speed to electric machine tip speed ratio. The low pressure turbine tip speed to electric machine tip speed ratio can be constant, particularly during high efficiency operations and excluding situations where the electric machine 200 is decoupled from the LP shaft 138. The low pressure turbine tip speed to electric machine tip speed ratio is defined by a tip speed taken at a leading edge of a last stage turbine blade 135 (see FIGS. 1 and 3) of the LP turbine 134 to a tip speed of the rotor 214 of the electric machine 200. Stated another way low pressure turbine tip speed to electric machine tip speed ratio may be defined as:

$$\text{LPT Tip Speed/EM Tip Speed} \qquad \text{(Ratio 7)}$$

The LPT Tip Speed is measured at a leading edge tip of one of the last stage turbine blades 135 of the LP turbine 134, e.g., at a location C1 depicted in FIG. 1. The EM Tip Speed is measured at an outermost point of the rotor 214 of the electric machine 200, e.g., at a location B1 depicted in FIG.

3. As noted previously the outermost point of the rotor 214 is defined as the outermost point of the rotor 214 along the radial direction R with respect to the longitudinal axis 112.

In some embodiments, the three-stream engine 100 is operated so as to define the low pressure turbine tip speed to electric machine tip speed ratio as being equal to or greater than 0.1 and less than or equal to 1.0, equal to or greater than 0.1 and less than or equal to 0.3, or equal to or greater than 0.5 and less than or equal to 0.9. Such measurements can be taken at a red line speed of the three-stream engine 100 or at any other speed, notwithstanding situations where the electric machine 200 is decoupled from the LP shaft 138. The inventors of the present disclosure have recognized that three-stream engines operated so as to define the low pressure turbine tip speed to electric machine tip speed ratio within one or more of the noted ranges have certain architectural and operating advantages. For instance, operating a three-stream engine within the noted ranges for the low pressure turbine tip speed to electric machine tip speed ratio can prevent unacceptable penalties on the power density of the electric machine, can prevent too much tip speed on the low pressure turbine, can prevent the mechanical capabilities of electrical components of the electric machine 200 from exceeding their limits, among other benefits.

Referring to FIGS. 1 through 4, in some embodiments, the three-stream engine 100 and the electric machine 200 embedded therein are operated so as to define an electric machine power to low pressure turbine power ratio. The unit of measure for the power output by the electric machine is to be kW and the unit of measure for the power output by the low pressure turbine is to be horsepower hp when determining the electric machine power to low pressure turbine power ratio, or stated another way, kW/hp.

$$\text{EM Power/LPT Power} \qquad \text{(Ratio 8)}$$

In some embodiments, the LP turbine 134 and the electric machine 200 of the three-stream engine 100 define the electric machine power to low pressure turbine power ratio as being equal to or greater than 0.01 and less than or equal to 1.0. In some embodiments, the LP turbine 134 and the electric machine 200 of the three-stream engine 100 can define the electric machine power to low pressure turbine power ratio as being equal to or greater than 0.01 and less than or equal to 1.0 at flight idle, equal to or greater than 0.01 and less than or equal to 0.2 at flight idle, equal to or greater than 0.1 and less than or equal to 0.45 at flight idle, or equal to or greater than 0.45 and less than or equal to 1.0 at flight idle. Flight idle, as used herein, refers to an engine speed in flight at a given altitude with a throttle set to a minimum, or idle, position. The engine speed may increase with an increase in altitude based on, e.g., ambient air conditions. The inventors of the present disclosure have recognized that three-stream engines having an electric machine and LP turbine arranged and operated according to the noted ranges advantageously balance the geometric and physical space constraints, thermal needs, efficiency, and performance of the electric machine and low pressure turbine.

With reference still to FIGS. 1 through 4, in some embodiments, the three-stream engine 100, and more particularly, the electric machine 200 embedded therein is operated so as to define a power to voltage ratio. The power to voltage ratio can be constant, particularly during high efficiency operations and excluding situations where the electric machine 200 is decoupled from the LP shaft 138. The power to voltage ratio is defined by an electrical power output by the electric machine 200 in kilowatts to a voltage level of the electric machine 200 in volts of direct current. Stated another way, the power to voltage ratio may be defined as:

$$\text{EM Power/EM Voltage} \qquad \text{(Ratio 9)}$$

As noted, the EM Power is measured as the electrical power output by the electric machine 200 in kilowatts. In some embodiments, the electrical power output by the electric machine 200 ranges from 100 kilowatts to 3 megawatts (100 kW-3 MW). Further, the EM Voltage is measured as the voltage level of the electric machine 200 in volts of direct current Vdc. In some embodiments, the voltage level of the electric machine 200 ranges from 270 Vdc to 3 kVdc. Accordingly, the unit of measure for power is to be kW and the unit of measure for voltage is to be Vdc when determining the power to voltage ratio, or stated another way, kW/Vdc. Such measurements can be taken at a red line speed of the three-stream engine 100 or at any other speed, notwithstanding situations where the electric machine 200 is decoupled from the LP shaft 138.

In some embodiments, the electric machine 200 of the three-stream engine 100 is operated so as to define the power to voltage ratio as being equal to or greater than 0.3 and less than or equal to 2.0. In yet other embodiments, the electric machine 200 of the three-stream engine 100 is operated so as to define the power to voltage ratio as being equal to or greater than 0.35 and less than or equal to 0.5, or equal to or greater than 0.4 and 0.5. The noted ranges for the power to voltage ratio capture the operating relationship between the electrical power associated with the electric machine and the voltage associated with the electric machine.

The inventors of the present disclosure have recognized that three-stream engines having an electric machine arranged as shown and described and operated according to the noted ranges advantageously balances the physical space required for the electric machine, the physical space needed between electrically conducting components of the electric machine, and partial discharge considerations with electric current levels and consequently increased weight of cables and busbars associated with the electric machine and/or power systems of the aircraft. Generally, for higher values of the ratio, more physical space is available and the electric machine is less susceptible to undesirable partial discharge while higher electric current levels and thus weight associated with cables and busbars are expected. The lower the value of the ratio, lower electric current levels and thus weight associated with cables and busbars are to be expected while there is less physical space available and the electric machine is more susceptible to undesirable partial discharge. The power to voltage ratio being equal to or greater than 0.35 and less than or equal to 0.5 is particularly suited for electric machines operated and arranged as shown in FIGS. 1, 3, and 4, e.g., in a "tail cone" or aft position. However, as noted, the power to voltage ratio may be equal to or greater than 0.3 and less than or equal to 2.0.

With reference still to FIGS. 1 through 4, in some embodiments, the three-stream engine 100, and more particularly, the electric machine 200 embedded therein is operated so as to define a power to AC rated current ratio. The power to AC rated current ratio can be constant, particularly during high efficiency operations and excluding situations where the electric machine 200 is decoupled from the LP shaft 138. The power to AC rated current ratio is defined by an electrical power associated with the electric machine 200 in kilowatts (e.g., electrical power output by the electric machine 200) to an AC rated current of the electric machine in ampere root mean square (arms). Stated another way, the power to AC rated current ratio may be defined as:

$$\text{EM Power/EM AC Rated Current} \qquad \text{(Ratio 10)}$$

As noted, the EM Power is measured as the electrical power output by the electric machine 200 in kilowatts. In some embodiments, the electrical power output by the electric machine 200 ranges from 100 kilowatts to 3 megawatts (100 kW-3 MW). Further, the EM AC Rated Current is measured as the AC rated current associated with an AC side of the electric machine 200 in ampere root mean square (arms). Accordingly, the unit of measure for power is to be kW and the unit of measure for voltage is to be arms when determining the power to AC rated current ratio, or stated another way, kW/arms. Such measurements can be taken at a red line speed of the three-stream engine 100 or at any other speed, notwithstanding situations where the electric machine 200 is decoupled from the LP shaft 138.

In some embodiments, the electric machine 200 of the three-stream engine 100 is operated so as to define the power to AC rated current ratio as being equal to or greater than as being equal to or greater than 0.2 and less than or equal to 2.5. In yet other embodiments, the electric machine 200 of the three-stream engine 100 is operated so as to define the power to AC rated current ratio as being equal to or greater than as being equal to or greater than 0.6 and less than or equal to 2.0, or equal to or greater than 0.2 and less than or equal to 1.2, equal to or greater than 1.8 and less than or equal to 2.5, or equal to or greater than 1.2 and less than or equal to 1.8. The noted ranges for the power to AC rated current ratio capture the operating relationship between the electrical power associated with the electric machine and the AC rated current associated with the electric machine.

The inventors of the present disclosure have recognized that three-stream engines having an electric machine arranged as shown and described and operated according to the noted ranges advantageously balances the physical space required for the electric machine, the physical space needed between electrically conducting components of the electric machine, and partial discharge considerations with electric current levels and consequently increased weight of cables and busbars associated with the electric machine and/or power systems of the aircraft. Generally, for lower values of the power to AC rated current ratio, more physical space is available and the electric machine is less susceptible to undesirable partial discharge while higher electric current levels and thus weight associated with cables and busbars are expected. The higher values of the power to AC rated current ratio, lower electric current levels and thus weight associated with cables and busbars are to be expected while there is less physical space available and the electric machine is more susceptible to undesirable partial discharge. The power to AC rated current ratio being equal to or greater than 0.6 and less than or equal to 2.0 is particularly suited for electric machines operated and arranged as shown in FIGS. 1, 3, and 4, e.g., in a "tail cone" or aft position. However, as noted, the power to AC rated current ratio may be equal to or greater than 0.2 and less than or equal to 2.5.

Referring still to FIGS. 1 through 4, in some embodiments, the three-stream engine 100, and more particularly, the electric machine 200 embedded therein is operated so as to define a torque at maximum speed to AC rated current ratio. The torque at maximum speed to AC rated current ratio is defined by a torque associated with a rotor of the electric machine at maximum speed of the electric machine in newton meters to an AC rated current of the electric machine in ampere root mean square. Stated another way, the torque at maximum speed to AC rated current ratio may be defined as:

$$\text{EM Torque at Max Speed/EM AC Rated Current} \qquad \text{(Ratio 11)}$$

In some embodiments, the electric machine 200 of the three-stream engine 100 is operated so as to define the torque at maximum speed to AC rated current ratio as being equal to or greater than as being equal to or greater than 0.1 and less than or equal to 6.0. In yet other embodiments, the electric machine 200 of the three-stream engine 100 is operated so as to define the power to AC rated current ratio as being equal to or greater than as being equal to or greater than 0.6 and less than or equal to 1.0. The range for the torque at maximum speed to AC rated current ratio captures the operating relationship between the torque associated with a rotor of the electric machine and the AC rated current associated with the electric machine.

The inventors of the present disclosure have recognized that three-stream engines having an electric machine arranged as shown and described and operated according to the noted ranges advantageously balance the torque associated with the rotor of the electric machine with the electric current at the AC side of the electric machine. The torque at maximum speed to AC rated current ratio being equal to or greater than 0.6 and less than or equal to 1.0 is particularly suited for electric machines operated and arranged as shown in FIGS. 1, 3, and 4, e.g., in a "tail cone" or aft position. However, as noted, the torque at maximum speed to AC rated current ratio may be equal to or greater than 0.1 and less than or equal to 6.0.

In some embodiments, the three-stream engine 100 of FIGS. 1 through 4 and/or the three-stream engine of FIG. 5 and/or FIG. 6 may define a combination of the ratios noted above. For instance, the three-stream engine 100 of FIGS. 1 through 4 may be arranged and operated to define any suitable combination of Ratio 1, Ratio 2, Ratio 3, Ratio 4, Ratio 5, Ratio 6, Ratio 7, Ratio 8, Ratio 9, Ratio 10, and Ratio 11. Embodiments of the three-stream engine may be arranged and operated to define a single one of the above-noted ratios or some combination thereof.

Various examples are provided below. For each example embodiment, the three-stream engine may include a primary fan and a mid-fan. Each example three-stream engine may be arranged to define a primary fan radius to mid-fan radius ratio as being equal to or greater than 2.0 and less than or equal to 6.5. In some example embodiments, for example, the three-stream engine may be arranged to define the primary fan radius to mid-fan radius ratio as being as being at least about 3.0 and less than 4.0.

EXAMPLE 1: A three-stream engine having a micro-hybridization configuration has a low pressure shaft, a primary fan operatively coupled with the shaft, e.g., via a gearbox and connecting fan rotor, a mid-fan positioned downstream of the primary fan and directly operatively coupled with the low pressure shaft, the mid-fan having mid-fan blades. The third stream further includes a low pressure turbine. The three-stream engine also includes an electric machine operatively coupled with the low pressure shaft. The electric machine is operable to output 350 kW at flight idle. The electric machine has a rotor rotatable with the low pressure shaft. The three-stream engine is arranged to define an electric machine length to low pressure turbine length ratio. The electric machine length to low pressure turbine length ratio is defined by an axial length of the electric machine to an axial length of the LP turbine. The electric machine length is a length spanning along an axial direction defined by the three-stream engine between a leading edge of the rotor and a trailing edge of the rotor of the electric machine. The low pressure turbine length is a length spanning along the axial direction between a leading edge of a hub of one of the first stage turbine blades of the low pressure turbine to a trailing edge of a hub of one of the last stage turbine blades of the low pressure turbine. The three-stream engine defines the electric machine length to low pressure turbine length ratio as 0.32.

EXAMPLE 2: A three-stream engine being a part of a distributed propulsion system has a low pressure shaft, a primary fan operatively coupled with the shaft, e.g., via a gearbox and connecting fan rotor, a mid-fan positioned downstream of the primary fan and directly operatively coupled with the low pressure shaft, the mid-fan having mid-fan blades. The third stream further includes a low pressure turbine. The three-stream engine also includes an electric machine operatively coupled with the low pressure shaft. The electric machine is operable to output 3 MW. The electric machine has a rotor rotatable with the low pressure shaft. The three-stream engine is arranged to define an electric machine length to low pressure turbine length ratio. The electric machine length to low pressure turbine length ratio is defined by an axial length of the electric machine to an axial length of the LP turbine. The electric machine length is a length spanning along an axial direction defined by the three-stream engine between a leading edge of the rotor and a trailing edge of the rotor of the electric machine. The low pressure turbine length is a length spanning along the axial direction between a leading edge of a hub of one of the first stage turbine blades of the low pressure turbine to a trailing edge of a hub of one of the last stage turbine blades of the low pressure turbine. The three-stream engine defines the electric machine length to low pressure turbine length ratio as 3.0.

EXAMPLE 3: A three-stream engine having a micro-hybridization configuration has a low pressure shaft, a primary fan operatively coupled with the shaft, e.g., via a gearbox and connecting fan rotor, a mid-fan positioned downstream of the primary fan and directly operatively coupled with the low pressure shaft, the mid-fan having mid-fan blades. The third stream further includes a low pressure turbine. The three-stream engine also includes an electric machine operatively coupled with the low pressure shaft. The electric machine is operable to output 350 kW at flight idle. The electric machine has a rotor rotatable with the low pressure shaft. The three-stream engine is arranged to define an electric machine tip radius to low pressure turbine last stage hub radius ratio. The electric machine tip radius spans along a radial direction R defined by the three-stream engine between a longitudinal axis of the engine and an outermost point of the rotor of the electric machine. The low pressure turbine last stage hub radius spans along the radial direction R between the longitudinal axis of the engine and an outermost point of a hub of one of the last stage turbine blades of the low pressure turbine. The three-stream engine defines the electric machine tip radius to low pressure turbine last stage hub radius ratio as 0.48.

EXAMPLE 4: A three-stream engine being a part of a distributed propulsion system has a low pressure shaft, a primary fan operatively coupled with the shaft, e.g., via a gearbox and connecting fan rotor, a mid-fan positioned downstream of the primary fan and directly operatively coupled with the low pressure shaft, the mid-fan having mid-fan blades. The third stream further includes a low pressure turbine. The three-stream engine also includes an electric machine operatively coupled with the low pressure shaft. The electric machine is operable to output 3 MW. The electric machine has a rotor rotatable with the low pressure shaft. The three-stream engine is arranged to define an electric machine tip radius to low pressure turbine last stage hub radius ratio. The electric machine tip radius spans along a radial direction R defined by the three-stream engine between a longitudinal axis of the engine and an outermost point of the rotor of the electric machine. The low pressure turbine last stage hub radius spans along the radial direction R between the longitudinal axis of the engine and an outermost point of a hub of one of the last stage turbine blades of the low pressure turbine. The three-stream engine defines the electric machine tip radius to low pressure turbine last stage hub radius ratio as being less than or equal to 0.48.

EXAMPLE 5: A three-stream engine having a micro-hybridization configuration has a low pressure shaft, a primary fan operatively coupled with the shaft, e.g., via a gearbox and connecting fan rotor, a mid-fan positioned downstream of the primary fan and directly operatively coupled with the low pressure shaft, the mid-fan having mid-fan blades. The third stream further includes a low pressure turbine. The three-stream engine also includes an electric machine operatively coupled with the low pressure shaft. The electric machine has a rotor rotatable with the low pressure shaft. The three-stream engine is arranged to define an electric machine power to low pressure turbine power ratio. The unit of measure for the power output by the electric machine is measured in kilowatts (kW) and the unit of measure for the power output by the low pressure turbine is measured in horsepower (hp). The three-stream engine, when operated at 37,000 feet, defines the electric machine power to low pressure turbine power ratio as 0.62.

EXAMPLE 6: A three-stream engine having a micro-hybridization configuration has a low pressure shaft, a primary fan operatively coupled with the shaft, e.g., via a gearbox and connecting fan rotor, a mid-fan positioned downstream of the primary fan and directly operatively coupled with the low pressure shaft, the mid-fan having mid-fan blades. The third stream further includes a low pressure turbine. The three-stream engine also includes an electric machine operatively coupled with the low pressure shaft. The electric machine has a rotor rotatable with the low pressure shaft. The three-stream engine is arranged to define an electric machine power to low pressure turbine power ratio. The unit of measure for the power output by the electric machine is measured in kilowatts (kW) and the unit of measure for the power output by the low pressure turbine is measured in horsepower (hp). The three-stream engine, when operated at 14,000 feet, defines the electric machine power to low pressure turbine power ratio as 0.41.

EXAMPLE 7: A three-stream engine being a part of a distributed propulsion system has a low pressure shaft, a primary fan operatively coupled with the shaft, e.g., via a gearbox and connecting fan rotor, a mid-fan positioned downstream of the primary fan and directly operatively coupled with the low pressure shaft, the mid-fan having mid-fan blades. The third stream further includes a low pressure turbine. The three-stream engine also includes an electric machine operatively coupled with the low pressure shaft. The electric machine has a rotor rotatable with the low pressure shaft. The electric machine is operable to output between 3 MW and 15 MW, including the endpoints. The three-stream engine is arranged to define an electric machine power to low pressure turbine power ratio. The unit of measure for the power output by the electric machine is measured in kilowatts (kW) and the unit of measure for the power output by the low pressure turbine is measured in horsepower (hp). The three-stream engine, when operated, defines the electric machine power to low pressure turbine power ratio as 0.2.

EXAMPLE 8: A three-stream engine has a low pressure shaft, a primary fan operatively coupled with the shaft, e.g., via a gearbox and connecting fan rotor, a mid-fan positioned downstream of the primary fan and directly operatively coupled with the low pressure shaft, the mid-fan having mid-fan blades. The third stream further includes a low pressure turbine. The three-stream engine also includes an electric machine operatively coupled with the low pressure shaft. The electric machine has a rotor rotatable with the low pressure shaft. The three-stream engine is arranged to define a mid-fan tip speed to low pressure turbine tip speed ratio as being about equal to 1.0.

EXAMPLE 9: A three-stream engine has a low pressure shaft, a primary fan operatively coupled with the shaft, e.g., via a gearbox and connecting fan rotor, a mid-fan positioned downstream of the primary fan and directly operatively coupled with the low pressure shaft, the mid-fan having mid-fan blades. The third stream further includes a low pressure turbine. The three-stream engine also includes an electric machine operatively coupled with the low pressure shaft. The electric machine has a rotor rotatable with the low pressure shaft. The three-stream engine is arranged and operated so as to define a low pressure turbine tip speed to electric machine tip speed ratio as being equal to or greater than 0.1 and less than or equal to 1.0. Such measurements can be taken at a red line speed of the three-stream engine 100 or at any other speed, notwithstanding situations where the electric machine 200 is decoupled from the low pressure shaft.

Figure 7:
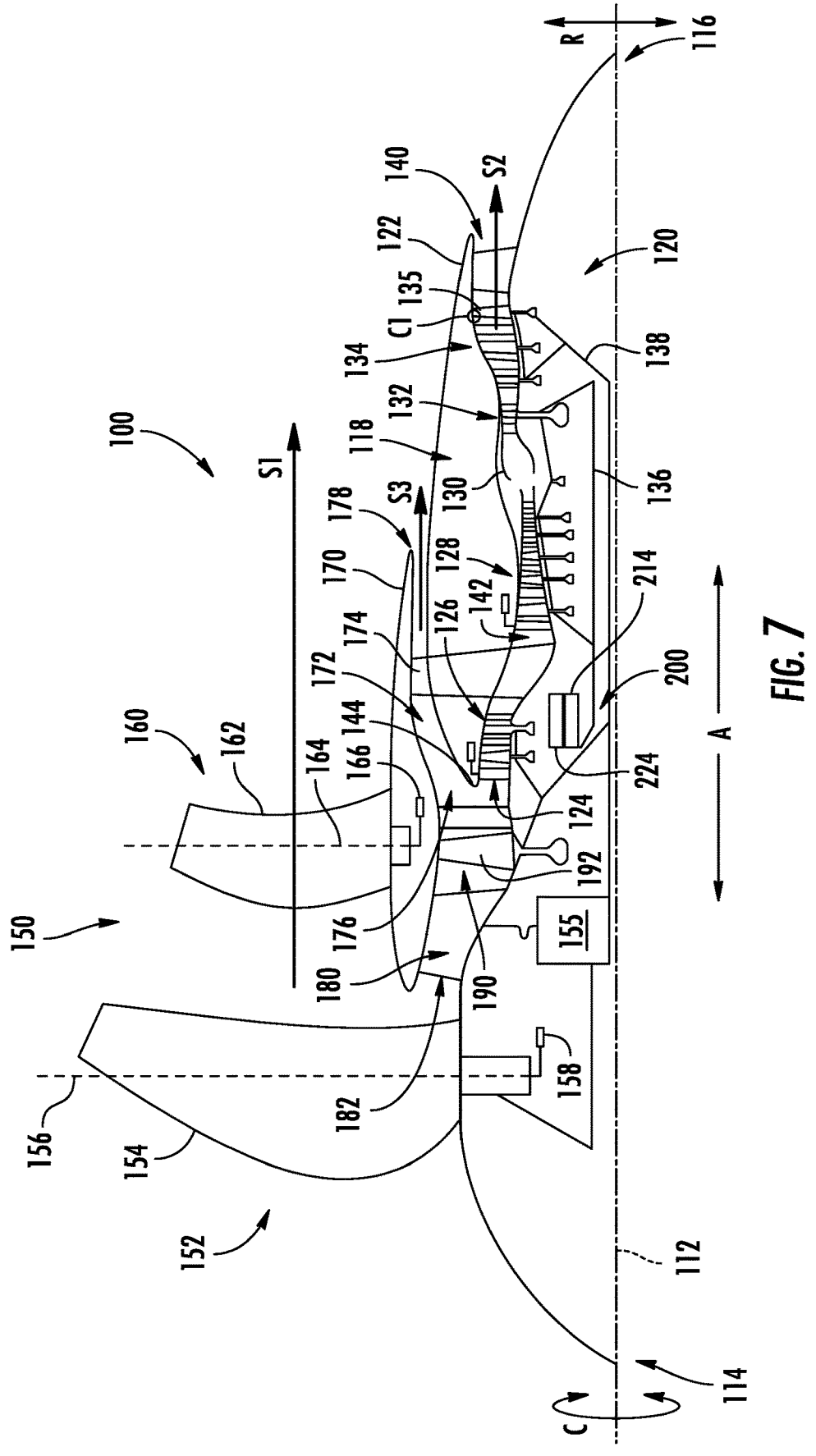
FIG. 7 provides a schematic cross-sectional view of a three-stream gas turbine engine according to various embodiments of the present disclosure.
Figure 8:
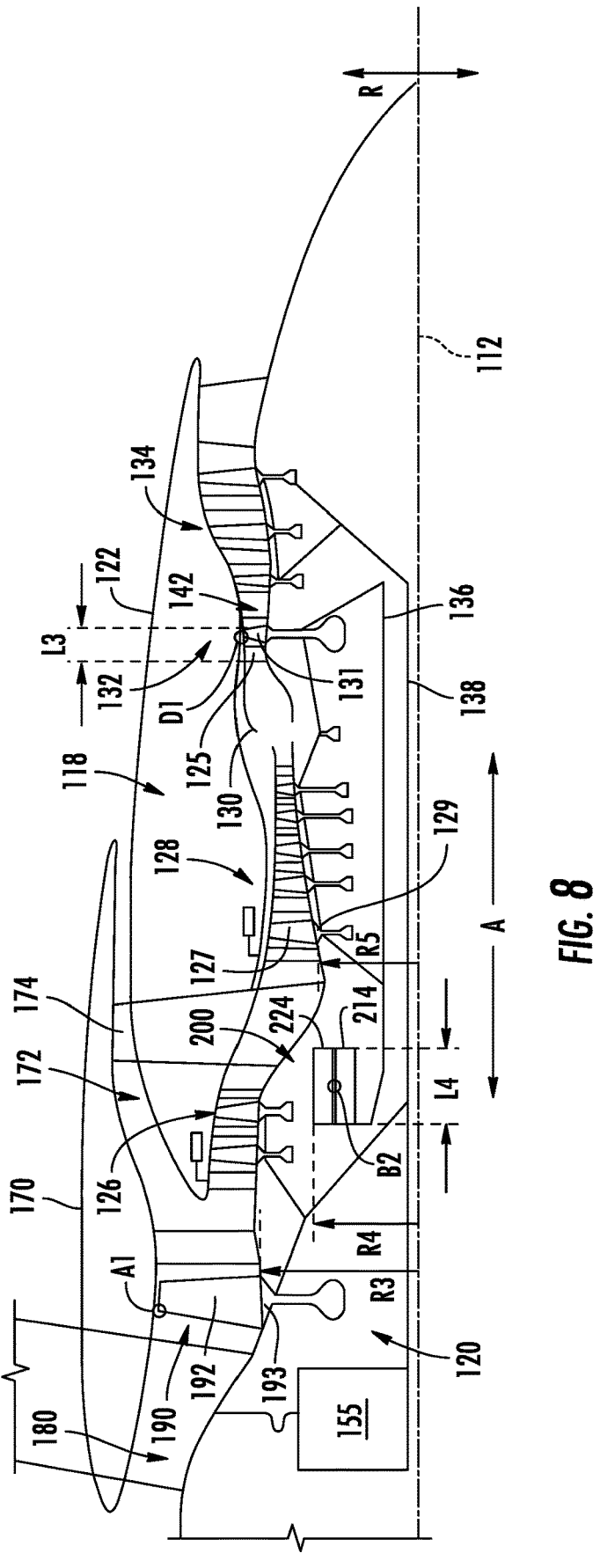
FIG. 8 provides a close-up, schematic cross-sectional view of the three-stream gas turbine engine of FIG. 7.

Referring now to FIGS. 7 and 8, FIG. 7 provides a schematic cross-sectional view of another exemplary three-stream engine 100 according to various embodiments of the present disclosure. FIG. 8 provides a close-up, schematic cross-sectional view of the three-stream gas turbine engine 100 of FIG. 7. The three-stream engine 100 of FIGS. 7 and 8 is configured in a similar manner to the three-stream engine 100 of FIGS. 1 through 4 except as provided below.

Figure 9:
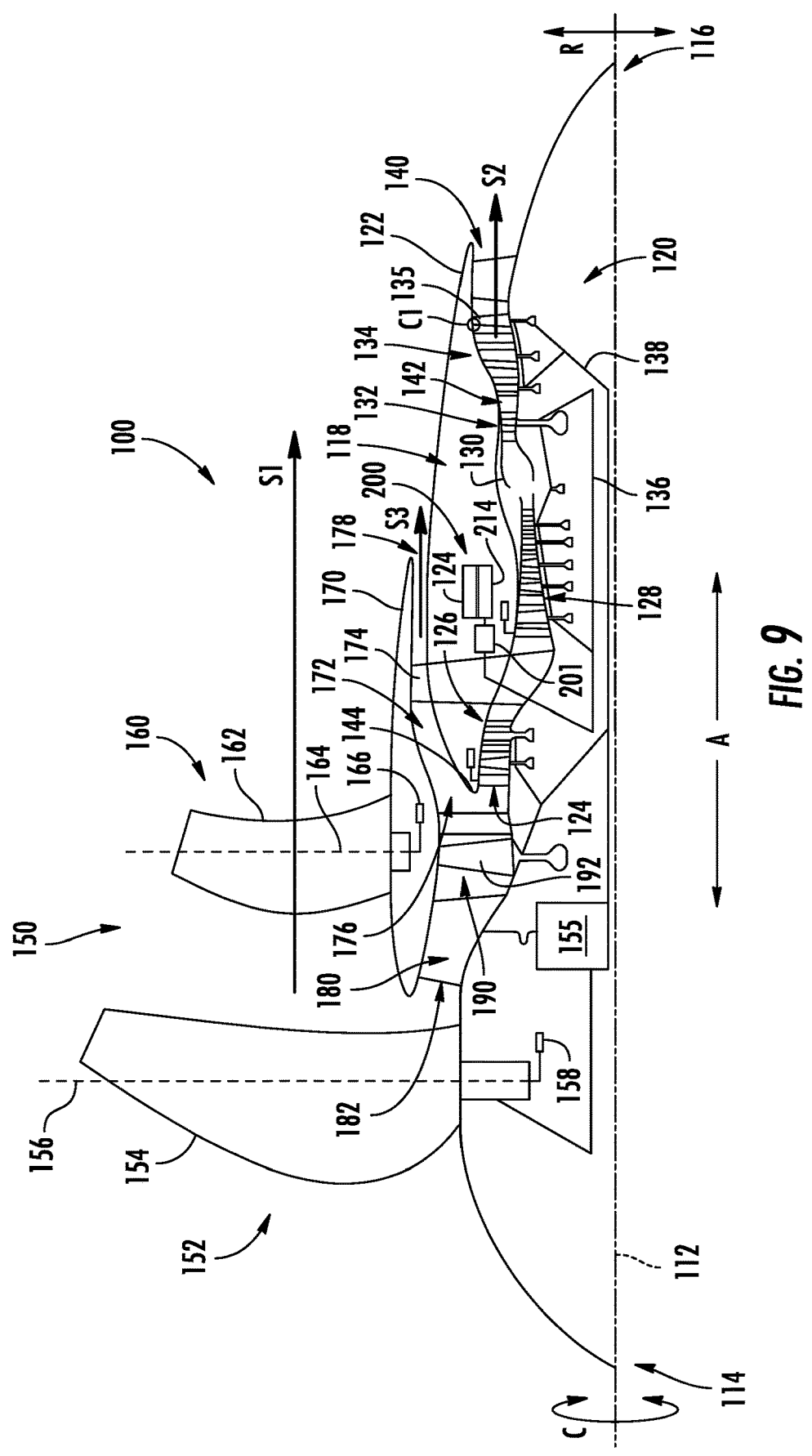
FIG. 9 provides a schematic cross-sectional view of a three-stream gas turbine engine according to yet other various embodiments of the present disclosure.

As depicted, for this embodiment, the electric machine 200 is operatively coupled with the HP shaft 136. Particularly, for this embodiment, the rotor 214 of the electric machine 200 is directly mechanically coupled with the HP shaft 136. The electric machine 200 is positioned forward of the HP compressor 128 but aft of the mid-fan 190 along the axial direction A. Moreover, the electric machine 200 is positioned inward of the core duct 142 along the radial direction R. The rotor 214 is rotatably about its centerline, which is coaxial with the longitudinal axis 112 in this example embodiment, relative to the stator 224. In this manner, as will be appreciated, the electric machine 200 can generate electrical power, e.g., when operated in a generator mode, or may drive the HP shaft 136, e.g., when operated in a drive mode. In other example embodiments, the electric machine 200 of the three-stream engine 100 of FIGS. 7 and 8 can be positioned in other suitable locations. For instance, in some embodiments, the electric machine 200 can be positioned within the core cowl 122 as depicted in FIG. 9. For the embodiment of FIG. 9, the electric machine 200 is indirectly mechanically coupled with the HP shaft 136 via a gearbox 201.

Notably, the inventors of the present disclosure have recognized or otherwise discovered that there are certain operating and geometric relationships between various components of a three-stream gas turbine engine having an embedded electric machine coupled with a high pressure shaft or spool that provide certain advantages over conventional turbofan engines. As one example, a three-stream engine having an electric machine operatively coupled with an HP shaft of the engine, such as disclosed in FIG. 7 as well as in other noted embodiments provided herein, may include components operating or arranged geometrically in advantageous relationships that ultimately provide significant fuel burn advantages over conventional turbofans, among other benefits.

As shown in FIGS. 7 and 8, the mid-fan 190 is operatively coupled with the LP shaft 138 and the HP turbine 132 is operatively coupled with the HP shaft 136. In this regard, the three-stream engine 100 can operate at a mid-fan tip speed to high pressure turbine tip speed ratio. The mid-fan tip speed to high pressure turbine tip speed ratio can be constant. The mid-fan tip speed to high pressure turbine tip speed ratio is defined by a tip speed of one of the mid-fan blades 192 of the mid-fan 190 to a tip speed of one of the last stage turbine blades 131 of the HP turbine 132. Stated another way, the mid-fan tip speed to high pressure turbine tip speed ratio may be defined as:

Mid-Fan Tip Speed/HPT Tip Speed          (Ratio 12)

The Mid-Fan Tip Speed is measured at a leading edge tip of one of the mid-fan blades 192, e.g., at a location A1 depicted in FIG. 8. The HPT Tip Speed is measured at a leading edge tip of one of the last stage turbine blades 131 of the HP turbine 132, e.g., at a location D1 depicted in FIG. 8. For the depicted embodiment of FIG. 8, the last stage turbine blades 131 of the HP turbine 132 is also the first stage as there is only one stage of high pressure turbine blades in this example embodiment.

In some embodiments, the three-stream engine 100 is operated so as to define the mid-fan tip speed to high pressure turbine tip speed ratio as being equal to or greater than 0.7 and less than or equal to 1.5. In yet other embodiments, the three-stream engine 100 is operated so as to define the mid-fan tip speed to high pressure turbine tip speed ratio as being equal to or greater than 0.8 and less than or equal to 1.2. In some further embodiments, the three-stream engine 100 is operated so as to define the mid-fan tip speed to high pressure turbine tip speed ratio as being equal to or greater than 0.9 and less than or equal to 1.1, or about 1.0. Such measurements can be taken at a red line speed of the three-stream engine 100 or at any other speed.

The inventors of the present disclosure have recognized that three-stream engines operated so as to define the mid-fan tip speed to high pressure turbine tip speed ratio within one or more of the noted ranges have certain architectural and operating advantages. Particularly, operating a three-stream engine within the noted ranges for the mid-fan tip speed to high pressure turbine tip speed ratio can ensure that the radius of the mid-fan (i.e., a radial length or radius spanning along the radial direction R between the longitudinal axis and a leading edge tip of one of the mid-fan blades of the mid-fan) is optimized relative to the high pressure turbine architecture. For instance, when the mid-fan radius is too large, the tip speed of the mid-fan may drive unacceptable aerodynamic losses. Moreover, mechanical stresses on the mid-fan may become excessive. In contrast, when the mid-fan radius is too small, the average velocity in the high pressure turbine blade passage may become too high, which may drive increased aerodynamic losses. The inventors of the present disclosure have taken these considerations into account in developing the noted ranges for the mid-fan tip speed to high pressure turbine tip speed ratio.

Referring to FIGS. 7 and 8, in some embodiments, the three-stream engine 100 can be arranged to define a mid-fan hub radius to electric machine radius ratio. The mid-fan hub radius to electric machine radius ratio may be defined as:

Mid-Fan Blade Hub Radius/EM Radius          (Ratio 13)

The mid-fan hub radius to electric machine radius ratio can be a fixed ratio as these two radii can be fixed. The Mid-Fan Blade Hub Radius is measured as a radial length or radius spanning along the radial direction R between the longitudinal axis 112 and an outermost point of a hub of one of the mid-fan blades 192 of the mid-fan 190. Particularly, as shown best in FIGS. 6 and 8, the Mid-Fan Blade Hub Radius is measured as Radius R3, which spans along the radial direction R between the longitudinal axis 112 and an outermost point taken at the trailing edge of a hub 193 of one of the mid-fan blades 192 of the mid-fan 190. The outermost point taken at the trailing edge of the hub 193 is the outermost point of the hub 193 with respect to the longitudinal axis 112 along the radial direction R.

The EM Radius is measured as a Radius R4 spanning along the radial direction R between the longitudinal axis 112 and an outermost point of the rotor 214 or the stator 224 depending on which one is positioned outward of the other along the radial direction R. For instance, when the rotor 214 is positioned outward of the stator 224 along the radial direction R (i.e., when the electric machine 200 has an outer-rotor configuration), the outermost point is taken as the outermost point of the rotor 214. In contrast, when the stator 224 is positioned outward of the rotor 214 along the radial direction R, (i.e., when the electric machine 200 has an inner-rotor configuration as shown in FIG. 6), the outermost point is taken as the outermost point of the stator 224.

In some embodiments, the mid-fan 190 and the electric machine 200 of the three-stream engine 100 define the mid-fan hub radius to electric machine radius ratio as being equal to or greater than 0.1 and less than or equal to 1.0, equal to or greater than 0.1 and less than or equal to 0.4, equal to or greater than 0.4 and less than or equal to 0.8, or equal to or greater than 0.6 and less than or equal to 1.0. In this manner, the outermost point taken at the trailing edge of the hub 193 is positioned even with or outward of the outermost point of the rotor 214 or stator 224 of the electric machine 200 along the radial direction R (depending on which one is positioned outward of the other along the radial direction R). The inventors of the present disclosure have recognized that three-stream engines having an electric machine and mid-fan arranged according to the noted ranges advantageously balance the geometry constraints and operating performance and efficiency of the mid-fan and electric machine, and also accounts for thermal constraints associated with the electric machine, particularly for three-stream engines having an embedded electric machine positioned as shown best in FIGS. 7 and 8.

Further, in some embodiments, the three-stream engine 100 can be arranged to define a high pressure compressor blade hub radius to electric machine tip radius ratio. The high pressure compressor hub radius to electric machine radius ratio may be defined as:

HPC Blade Hub Radius/EM Radius          (Ratio 14)

The high pressure compressor hub radius to electric machine radius ratio can be a fixed ratio as these two radii can be fixed. As shown best in FIG. 8, the HPC Blade Hub Radius is measured as a radial length or Radius R5 spanning along the radial direction R between the longitudinal axis 112 and an outermost point taken at a leading edge of a hub 129 of one of the first stage blades 127 of the HP compressor 128. The EM Radius is measured as a Radius R4 spanning along the radial direction R between the longitudinal axis 112 and an outermost point of the rotor 214 or the stator 224 depending on which one is positioned outward of the other along the radial direction R.

In some embodiments, the high pressure compressor 128 and the electric machine 200 of the three-stream engine 100 define the high pressure compressor hub radius to electric machine radius ratio as being equal to or greater than 0.1 and less than or equal to 1.0, equal to or greater than 0.1 and less than or equal to 0.25, equal to or greater than 0.25 and less than or equal to 0.5, or equal to or greater than 0.5 and less than or equal to 1.0. In this manner, the outermost point taken at a leading edge of a hub 129 of one of the first stage blades 127 of the HP compressor 128 is positioned even with or outward of the outermost point of the rotor 214 or stator 224 of the electric machine 200 along the radial direction R (depending on which one is positioned outward of the other along the radial direction R).

The inventors of the present disclosure have recognized that three-stream engines having an electric machine coupled with the HP shaft and high pressure compressor arranged according to the noted ranges advantageously balance the geometry constraints and operating performance and efficiency of the HP compressor and electric machine, and also account for thermal constraints associated with the electric machine, particularly for three-stream engines having an embedded electric machine positioned as shown best in FIGS. 7 and 8.

With reference still to FIGS. 7 and 8, as noted for this embodiment, the HP turbine 132 is operatively coupled with the HP shaft 136 and the electric machine 200 is operatively coupled with the HP shaft 136 as well. In this regard, the three-stream engine 100 can operate at a high pressure turbine tip speed to electric machine tip speed ratio. The high pressure turbine tip speed to electric machine tip speed ratio can be constant, except when the electric machine 200 is decoupled from the HP shaft 136, e.g., by way of a clutch (not shown). The high pressure turbine tip speed to electric machine tip speed ratio is defined by a tip speed of one of the last stage turbine blades 131 of the HP turbine 132 to a tip speed of the rotor 214 of the electric machine 200. Stated another way, the high pressure turbine tip speed to electric machine tip speed ratio may be defined as:

$$HPT\ Tip\ Speed/EM\ Tip\ Speed \qquad \text{(Ratio 15)}$$

The HPT Tip Speed is measured at a leading edge tip of one of the last stage turbine blades 131 of the HP turbine 132, e.g., at a location D1 depicted in FIG. 8. The EM Tip Speed is measured at an outermost point of the rotor 214 of the electric machine 200, e.g., at a location B2 depicted in FIG. 8. As noted previously the outermost point of the rotor 214 is defined as the outermost point of the rotor 214 along the radial direction R with respect to the longitudinal axis 112.

In some embodiments, the three-stream engine 100 is operated so as to define the high pressure turbine tip speed to electric machine tip speed ratio as being equal to or greater than 0.1 and less than or equal to 1.0, equal to or greater than 0.1 and less than or equal to 0.3, equal to or greater than 0.3 and less than or equal to 0.6, equal to or greater than 0.4 and less than or equal to 1.0. Such measurements can be taken at a red line speed of the three-stream engine 100 or at any other speed. The inventors of the present disclosure have recognized that three-stream engines operated so as to define the high pressure turbine tip speed to electric machine tip speed ratio within one or more of the noted ranges have certain architectural and operating advantages. For instance, operating a three-stream engine within the noted ranges for the high pressure turbine tip speed to electric machine tip speed ratio can prevent unacceptable penalties on the power density of the electric machine, can prevent too much tip speed on the high pressure turbine and high pressure compressor, and can prevent the mechanical capabilities of electrical components of the electric machine from exceeding their limits, among other benefits.

In some embodiments, the three-stream engine 100 depicted in FIGS. 7 and 8 can be arranged to define a high pressure turbine length to electric machine length ratio. The high pressure turbine length to electric machine length ratio is defined by an axial length of the HP turbine 132 to an axial length of the electric machine 200. Stated another way, the high pressure turbine length to electric machine length ratio may be defined as:

$$HPT\ Length/EM\ Length \qquad \text{(Ratio 16)}$$

The high pressure turbine length to electric machine length ratio can be a fixed ratio as the axial length of the HP turbine 132 and the axial length of the electric machine 200 are fixed. The HPT Length is measured as the axial length of the HP turbine 132. As shown best in FIG. 8, the axial length of the HP turbine 132 is defined as a length L3 spanning along the axial direction A between a leading edge of one of the first stage turbine nozzles 125 of the HP turbine 132 to a trailing edge of one of the last stage turbine blades 131 of the HP turbine 132. The EM Length is measured as the axial length of the electric machine 200. As illustrated in FIG. 8, the axial length of the electric machine 200 is defined as a length L4 spanning along the axial direction A between a leading edge of the rotor 214 of the electric machine 200 and a trailing edge of the rotor 214 of the electric machine 200.

In some embodiments, the HP turbine 132 and the electric machine 200 of the three-stream engine 100 define the high pressure turbine length to electric machine length ratio as being equal to or greater than 0.1 and less than or equal to 1.5, equal to or greater than 0.1 and less than or equal to 0.5, equal to or greater than 0.5 and less than or equal to 0.85, or equal to or greater than 0.85 and less than or equal to 1.5. The ranges for the high pressure turbine length to electric machine length ratio capture the architectural and operating relationship between the electric machine and the high pressure turbine of the three-stream engine, both of which are coupled to the high pressure shaft in such example embodiments. More specifically, the inventors of the present disclosure have recognized that three-stream engines having an electric machine and high pressure turbine arranged according to the noted ranges advantageously balance weight and loading or efficiency considerations of the high pressure turbine with the performance requirements of the electric machine.

With reference still to FIGS. 7 and 8, in some embodiments, the three-stream engine 100, and more particularly, the electric machine 200 embedded therein is operated so as to define a power to voltage ratio, wherein the electric machine 200 is operatively coupled with the HP shaft 136. The power to voltage ratio can be constant, particularly during high efficiency operations and excluding situations where the electric machine 200 is decoupled from the HP shaft 136. The power to voltage ratio is defined by an electrical power output by the electric machine 200 in kilowatts to a voltage level of the electric machine 200 in volts of direct current. Stated another way, the power to voltage ratio may be defined as:

$$\text{EM Power/EM Voltage} \qquad \text{(Ratio 17)}$$

As noted, the EM Power is measured as the electrical power output by the electric machine 200 in kilowatts. In some embodiments, the electrical power output by the electric machine 200 ranges from 100 kilowatts to 1 megawatts (100 kW-1 MW). Further, the EM Voltage is measured as the voltage level of the electric machine 200 in volts of direct current Vdc. In some embodiments, the voltage level of the electric machine 200 ranges from 270 Vdc to 3 kVdc.

In some embodiments, the electric machine 200 of the three-stream engine 100 is operated so as to define the power to voltage ratio as being equal to or greater than 0.3 and less than or equal to 2.0, equal to or greater than 0.3 and less than or equal to 1.1, equal to or greater than 0.3 and less than or equal to 0.6, or equal to or greater than 0.6 and less than or equal to 1.1, or equal to or greater than 1.0 and less than or equal to 2.0. Such measurements can be taken at a red line speed of the three-stream engine 100 or at any other speed, notwithstanding situations where the electric machine 200 is decoupled from the LP shaft 138.

The inventors of the present disclosure have recognized that three-stream engines having an electric machine arranged as shown and described and operated according to the noted ranges advantageously balance the physical space required for the electric machine, the physical space needed between electrically conducting components of the electric machine, and partial discharge considerations with electric current levels and consequently increased weight of cables and busbars associated with the electric machine and/or power systems of the aircraft.

In some embodiments, the three-stream engine 100 of FIGS. 7 and 8 and/or the three-stream engine of FIG. 9 may define a combination of the ratios noted above. For instance, the three-stream engine 100 of FIGS. 7 and 8 may be arranged and operated to define any suitable combination of Ratio 1, Ratio 12, Ratio 13, Ratio 14, Ratio 15, Ratio 16, and Ratio 17. Embodiments of the three-stream engine may be arranged and operated to define a single one of the above-noted ratios or some combination thereof.

Various examples are provided below. For each example embodiment, the three-stream engine may include a primary fan and a mid-fan. Each example three-stream engine may be arranged to define a primary fan radius to mid-fan radius ratio as being equal to or greater than 2.0 and less than or equal to 6.5. In some example embodiments, for example, the three-stream engine may be arranged to define the primary fan radius to mid-fan radius ratio as being as being at least about 3.0 and less than 4.0.

EXAMPLE 10: A three-stream engine has a low pressure shaft, a primary fan operatively coupled with the shaft, e.g., via a gearbox and connecting fan rotor, a mid-fan positioned downstream of the primary fan and directly operatively coupled with the low pressure shaft, the mid-fan having mid-fan blades. The third stream further includes a high pressure turbine operatively coupled with a high pressure shaft. The three-stream engine also includes an electric machine operatively coupled with the high pressure shaft. The electric machine has a rotor rotatable with the high pressure shaft. The three-stream engine is arranged to define a mid-fan tip speed to high pressure turbine tip speed ratio. The mid-fan tip speed is measured at a leading edge tip of one of the mid-fan blades. The high pressure tip speed is measured at a leading edge tip of one of the last stage turbine blades of the HP turbine. The three-stream engine defines the mid-fan tip speed to high pressure turbine tip speed ratio as 1.0.

EXAMPLE 11: A three-stream engine has a low pressure shaft, a primary fan operatively coupled with the low pressure shaft, e.g., via a gearbox and connecting fan rotor, a mid-fan positioned downstream of the primary fan and directly operatively coupled with the low pressure shaft, the mid-fan having mid-fan blades. The third stream further includes a high pressure turbine operatively coupled with a high pressure shaft. The three-stream engine also includes an electric machine operatively coupled with the high pressure shaft. The electric machine has a rotor rotatable with the high pressure shaft. The three-stream engine is arranged to define a high pressure turbine tip speed to electric machine tip speed ratio. The high pressure turbine tip speed is measured at a leading edge tip of one of the last stage turbine blades of the high pressure turbine and the electric machine tip speed is measured at an outermost point of the rotor of the electric machine. The three-stream engine defines the high pressure turbine tip speed to electric machine tip speed ratio as 0.4.

EXAMPLE 12: A three-stream engine has a low pressure shaft, a primary fan operatively coupled with the low pressure shaft, e.g., via a gearbox and connecting fan rotor, a mid-fan positioned downstream of the primary fan and directly operatively coupled with the low pressure shaft, the mid-fan having mid-fan blades. The third stream further includes a high pressure turbine operatively coupled with a high pressure shaft. The three-stream engine also includes an electric machine operatively coupled with the high pressure shaft. The electric machine has a rotor rotatable with the high pressure shaft. The three-stream engine is arranged to define a high pressure turbine length to electric machine length ratio. The high pressure turbine length is measured as the axial length of the high pressure turbine, i.e., a length spanning along the axial direction between a leading edge of one of the first stage turbine nozzles of the high pressure turbine to a trailing edge of one of the last stage turbine blades of the high pressure turbine. The electric machine length is measured as the axial length of the electric machine. The three-stream engine defines the high pressure turbine length to electric machine length ratio as 1.3.

Figure 10:
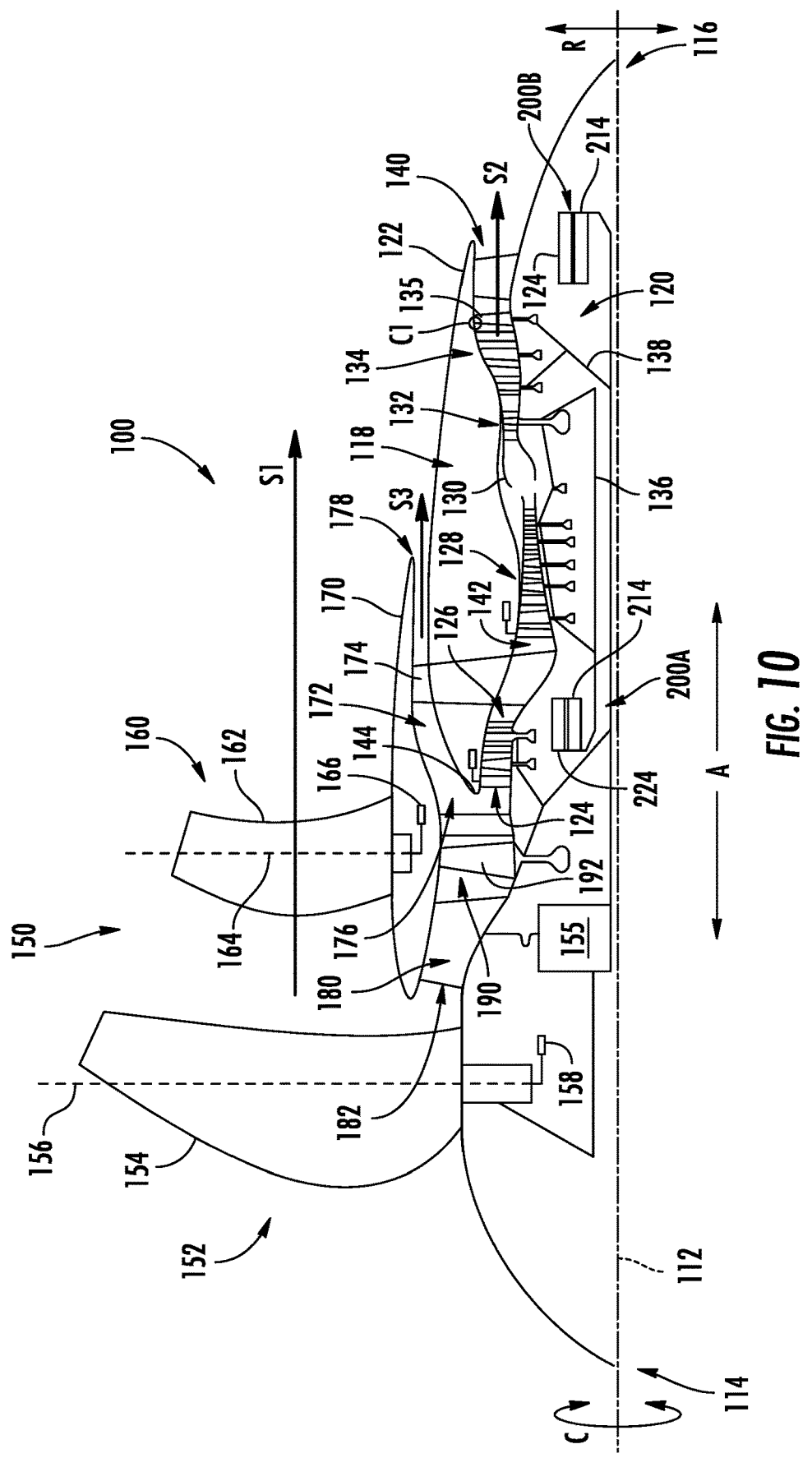
FIG. 10 provides a schematic cross-sectional view of a three-stream gas turbine engine according to various embodiments of the present disclosure.

With reference now to FIG. 10, FIG. 10 provides a schematic cross-sectional view of a three-stream gas turbine engine 100 according to various embodiments of the present disclosure. The three-stream engine 100 of FIG. 10 is configured in a similar manner to the three-stream engine 100 of FIGS. 1 through 4 and FIGS. 7 and 8 except as provided below.

For this embodiment, the three-stream gas turbine engine 100 includes a first electric machine 200A operatively coupled with a first shaft or HP shaft 136 and a second electric machine 200B operatively coupled with a second shaft or LP shaft 138. The electric machines 200A, 200B can be mechanically connected to their respective shafts 136, 138 directly or indirectly, e.g., by way of a gearbox. The first electric machine 200A is positioned in the same location as the electric machine 200 of FIGS. 7 and 8 and the second electric machine 200B is positioned in the same location as the electric machine 200 of FIGS. 1 through 4 in this example embodiment. However, in other embodiments, the electric machines 200A, 200B may be positioned in other suitable locations. In some embodiments, the three-stream engine 100 of FIG. 10 may define one or more of the ratios noted herein.

Notably, the inventors of the present disclosure have recognized that there are certain operating relationships between various components of a three-stream gas turbine engine having a first embedded electric machine operatively coupled with a high pressure shaft or spool and a second embedded electric machine operatively coupled with a low pressure shaft or spool that provide certain advantages over conventional turbofan engines.

For instance, with reference to FIG. 10, the three-stream engine 100 can operate so as to define a second electric machine power to first electric machine power ratio. The second electric machine power to first electric machine power ratio can be constant, particularly during high efficiency operations of the three-stream engine 100 and excluding situations where the first electric machine 200A is decoupled from the HP shaft 136 and/or the second electric machine 200B is decoupled form the LP shaft 138. The second electric machine power to first electric machine power ratio is defined by an electrical power output by the second electric machine in kilowatts to an electrical power output by the first electric machine in kilowatts. Stated another way, the second electric machine power to first electric machine power ratio may be defined as:

$$\text{Second EM Power/First EM Power} \qquad \text{(Ratio 18)}$$

In some embodiments, the three-stream engine 100 is operated so as to define the second electric machine power to first electric machine power ratio as being equal to or greater than 0.1 and less than or equal to 1.5. In yet other embodiments, the three-stream engine 100 is operated so as to define the second electric machine power to first electric machine power ratio as being equal to or greater than 0.5 and less than or equal to 1.2, equal to or greater than 0.5 and less than or equal to 0.75, equal to or greater than 0.75 and less than or equal to 1.2. In some further embodiments, the three-stream engine 100 is operated so as to define the second electric machine power to first electric machine power ratio as being equal to or greater than 0.6 and less than or equal to 0.9. Such measurements can be taken at a red line speed of the three-stream engine 100 or at any other speed. In some implementations, the electrical power output of the second electric machine ranges from 100 kilowatts to 3 megawatts and the electrical power output of the first electric machine ranges from 100 kilowatts to 1 megawatt.

The inventors of the present disclosure have recognized that three-stream engines having a second electric machine and a first electric machine arranged and operated according to the noted ranges advantageously balances the geometric and physical space constraints, thermal needs, efficiency, and performance of the first and second electric machines.

In some embodiments, the three-stream engine 100 of FIG. 10 may define a combination of the ratios noted above. For instance, the three-stream engine 100 of FIG. 10 may be arranged and operated to define any suitable combination of Ratio 1 to Ratio 18. Embodiments of the three-stream engine may be arranged and operated to define a single one of the above-noted ratios or some combination thereof.

EXAMPLE 13: A three-stream engine has a low pressure shaft, a primary fan operatively coupled with the low pressure shaft, e.g., via a gearbox and connecting fan rotor, a mid-fan positioned downstream of the primary fan and directly operatively coupled with the low pressure shaft, the mid-fan having mid-fan blades. The three-stream engine further includes a first electric machine mechanically coupled with the low pressure shaft. The third stream also includes a high pressure shaft and a second electric machine mechanically coupled thereto. The three-stream engine is arranged to define a second electric machine power to first electric machine power ratio. The three-stream engine defines the second electric machine power to first electric machine power ratio as 0.7.

FIGS. 11A and 11B provides a flow diagram for a method (400) of operating a three-stream engine according to one example embodiment of the present disclosure. For instance, method (400) can be used to operate the three-stream gas turbine engine of FIGS. 1 through 4, FIG. 5, FIG. 6, or any other three-stream engine having an embedded electric machine operatively coupled with a shaft of the engine, such as a low pressure shaft. It will be appreciated that method (400) is discussed herein to describe exemplary aspects of the present subject matter and is not intended to be limiting.

At (402), the method (400) includes operating a three-stream gas turbine engine having an electric machine embedded therein to define one or more ratios, such as the ratios set forth in (402A) through (402K).

In some implementations, the three-stream engine defines a radial direction and has an inlet duct, a core duct in flow communication with the inlet duct, and a fan duct in flow communication with the inlet duct and positioned outward of the core duct along the radial direction. In such implementations, the mid-fan can be positioned within the inlet duct upstream of the core duct and the fan duct. Further, in some implementations, the three-stream engine has a fan positioned upstream of the mid-fan and operatively coupled with the shaft (e.g., an LP shaft). In some implementations, the fan is unducted, e.g., as shown in FIG. 1. In other implementations, the fan is ducted, e.g., by an outer nacelle or fan casing as shown in FIG. 5. In addition, in such implementations, the mid-fan is positioned between the fan and a low pressure compressor along an axial direction defined by the three-stream engine. Further, in such implementations, a root of a mid-fan blade is positioned inward of a root of a fan blade of the fan along the radial direction.

Furthermore, in some implementations, the three-stream engine has an engine core and the electric machine is positioned within the engine core. In this regard, the electric machine is embedded within the three-stream engine. For instance, in some implementations, the electric machine can be positioned inward of the core duct along the radial direction. Moreover, in some implementations, the electric machine is coupled to the shaft (e.g., an LP shaft) aft of the mid-fan, e.g., as shown in FIG. 1. In yet other implementations, the electric machine is coupled to the shaft (e.g., an LP shaft) forward of the mid-fan. Further, in some implementations, the electric machine is directly connected to the shaft. In some alternative implementations, the electric machine is indirectly coupled with the shaft, e.g., by way of a gearbox.

At (402A), the method (400) includes operating the three-stream gas turbine engine to define a primary fan radius to mid-fan radius as being equal to or greater than 2.0 and less than or equal to 6.5. In such implementations, the three-stream gas turbine engine has a primary fan having a plurality of fan blades. The primary fan radius to mid-fan radius ratio is defined by a radius spanning between a longitudinal axis defined by the three-stream gas turbine engine and a leading edge tip of one of the fan blades to a radius spanning between the longitudinal axis and a leading edge tip of one of the mid-fan blades. In some other implementations, the three-stream engine defines the primary fan radius to mid-fan radius ratio as being at least about 2.0. In other implementations, the three-stream engine defines the primary fan radius to mid-fan radius ratio as being at least about 2.5. In yet other implementations, the three-stream engine defines the primary fan radius to mid-fan radius ratio as being at least about 3.0. In some further implementations, the three-stream engine defines the primary fan radius to mid-fan radius ratio as being at least about 4.0. In yet other implementations, the three-stream engine defines the primary fan radius to mid-fan radius ratio as being at least about 6.0. In some other implementations, the three-stream engine defines the primary fan radius to mid-fan radius ratio as being about 6.5.

At (402B), in addition or alternatively to operating the three-stream gas turbine engine at (402A), the method (400) includes operating the three-stream gas turbine engine to define a tip speed ratio as being equal to or greater than 0.2 and less than or equal to 1.0, the tip speed ratio being defined by a tip speed of a rotor of the electric machine to a tip speed of a mid-fan blade of a mid-fan. In such implementations, the electric machine and the mid-fan are both operatively coupled with a shaft of the three-stream gas turbine engine. The electric machine and the mid-fan can both be operatively coupled with a low pressure shaft of the three-stream gas turbine engine, for example.

At (402C), in addition or alternatively to operating the three-stream gas turbine engine at (402A) and/or at (402B), the method (400) includes operating the three-stream gas turbine engine to define a mid-fan radius to electric machine radius ratio as being equal to or greater than 1.33 and less than or equal to 3.8. In some further implementations, the three-stream engine 100 defines the mid-fan radius to electric machine radius ratio as being equal to or greater than 2.5 and less than or equal to 3.3. In yet other implementations, the three-stream engine 100 defines the mid-fan radius to electric machine radius ratio as being equal to or greater than 2.9 and less than or equal to 3.2.

At (402D), in addition or alternatively to operating the three-stream gas turbine engine at (402A) and/or at (402B) and/or at (402C), the method (400) includes operating the three-stream gas turbine engine to define an electric machine length to low pressure turbine length ratio as being equal to or greater than 0.01 and less than or equal to 3.0. The range for the electric machine length to low pressure turbine length ratio captures the architectural and operating relationship between the electric machine and the low pressure turbine. The electric machine length is a length spanning between a leading edge and a trailing edge of the rotor of the electric machine along the axial direction. The length of the low pressure turbine is a length spanning between a leading edge of a hub of one of the first stage turbine blades of the low pressure turbine to a trailing edge of a hub of one of the last stage turbine blades of the LP turbine.

At (402E), in addition or alternatively to operating the three-stream gas turbine engine at (402A) and/or at (402B) and/or at (402C) and/or at (402D), the method (400) includes operating the three-stream gas turbine engine to define the electric machine tip radius to low pressure turbine last stage hub radius ratio as being equal to or greater than 0.1 and less than or equal to 1.0. The electric machine tip radius is a length or radius spanning between the longitudinal axis and an outermost point of the rotor of the electric machine. The low pressure turbine last stage hub radius is a length or radius spanning between a longitudinal axis defined by the three-stream engine and an outermost point taken at a trailing edge of a hub of a last stage turbine blade of a low pressure turbine operatively coupled with the shaft.

At (402F), in addition or alternatively to operating the three-stream gas turbine engine at (402A) and/or at (402B) and/or at (402C) and/or at (402D) and/or at (402E), the method (400) includes operating the three-stream gas turbine engine to define a mid-fan tip speed to low pressure turbine tip speed ratio as being equal to or greater than 0.7 and less than or equal to 1.5. In such implementations, the mid-fan tip speed to low pressure turbine tip speed ratio is defined by a tip speed of a mid-fan blade of a mid-fan to a tip speed of a last stage turbine blade of a low pressure turbine. In some further implementations, the three-stream gas turbine engine is operated so as to define the mid-fan tip speed to low pressure turbine tip speed ratio as being equal to or greater than 0.8 and less than or equal to 1.2.

At (402G), in addition or alternatively to operating the three-stream gas turbine engine at (402A) and/or at (402B) and/or at (402C) and/or at (402D) and/or (402E) and/or at (402F), the method (400) includes operating the three-stream gas turbine engine to define a low pressure turbine tip speed to electric machine tip speed ratio as being equal to or greater than 0.1 and less than or equal to 1.0.

At (402H), in addition or alternatively to operating the three-stream gas turbine engine at (402A) and/or at (402B) and/or at (402C) and/or at (402D) and/or at (402E) and/or at (402F) and/or at (402G), the method (400) includes operating the three-stream gas turbine engine to define an electric machine power to low pressure turbine power ratio as being equal to or greater than 0.01 and less than or equal to 1.0. The unit of measure for the power output by the electric machine is to be kW and the unit of measure for the power output by the low pressure turbine is to be horsepower hp when determining the electric machine power to low pressure turbine power ratio.

At (402I), in addition or alternatively to operating the three-stream gas turbine engine at (402A) and/or at (402B) and/or at (402C) and/or at (402D) and/or at (402E) and/or at (402F) and/or at (402G) and/or at (402H), the method (400) includes operating the three-stream gas turbine engine so that the electric machine defines a power to voltage ratio as being equal to or greater than 0.3 and less than or equal to 2.0. In yet other implementations, operating the three-stream gas turbine engine so that the electric machine defines the power to voltage ratio as being equal to or greater than 0.35 and less than or equal to 0.5. The range for the power to voltage ratio captures the operating relationship between the electrical power associated with the electric machine and the voltage associated with the electric machine. In such implementations, the power to voltage ratio is defined by an electrical power output by the electric machine in kilowatts to a voltage level of the electric machine in volts of direct current. Further, in some implementations, the electrical power output of the electric machine ranges from 100 kilowatts to 3 megawatts. Further, in some implementations, the voltage level of the electric machine ranges between 270 volts of direct current and 3,000 volts of direct current.

At (402I), in addition or alternatively to operating the three-stream gas turbine engine at (402A) and/or at (402B) and/or at (402C) and/or at (402D) and/or at (402E) and/or at (402F) and/or at (402G) and/or at (402H) and/or at (402I), the method (400) includes operating the three-stream gas turbine engine so that the electric machine defines a power to AC rated current ratio as being equal to or greater than as being equal to or greater than 0.2 and less than or equal to 2.5. In yet other implementations, the electric machine of the three-stream engine is operated so as to define the power to AC rated current ratio as being equal to or greater than as being equal to or greater than 0.6 and less than or equal to 2.0. The range for the power to AC rated current ratio captures the operating relationship between the electrical power associated with the electric machine and the AC rated current associated with the electric machine.

At (402K), in addition or alternatively to operating the three-stream gas turbine engine at (402A) and/or at (402B) and/or at (402C) and/or at (402D) and/or at (402E) and/or at (402F) and/or at (402G) and/or at (402H) and/or at (402I) and/or at (402J), the method (400) includes operating the three-stream gas turbine engine so that the electric machine defines a torque at maximum speed to AC rated current ratio as being equal to or greater than as being equal to or greater than 0.1 and less than or equal to 6.0. In yet other implementations, the electric machine of the three-stream engine is operated so as to define the power to AC rated current ratio as being equal to or greater than as being equal to or greater than 0.6 and less than or equal to 1.0. The range for the torque at maximum speed to AC rated current ratio captures the operating relationship between the torque associated with a rotor of the electric machine and the AC rated current associated with the electric machine.

Figure 12A:
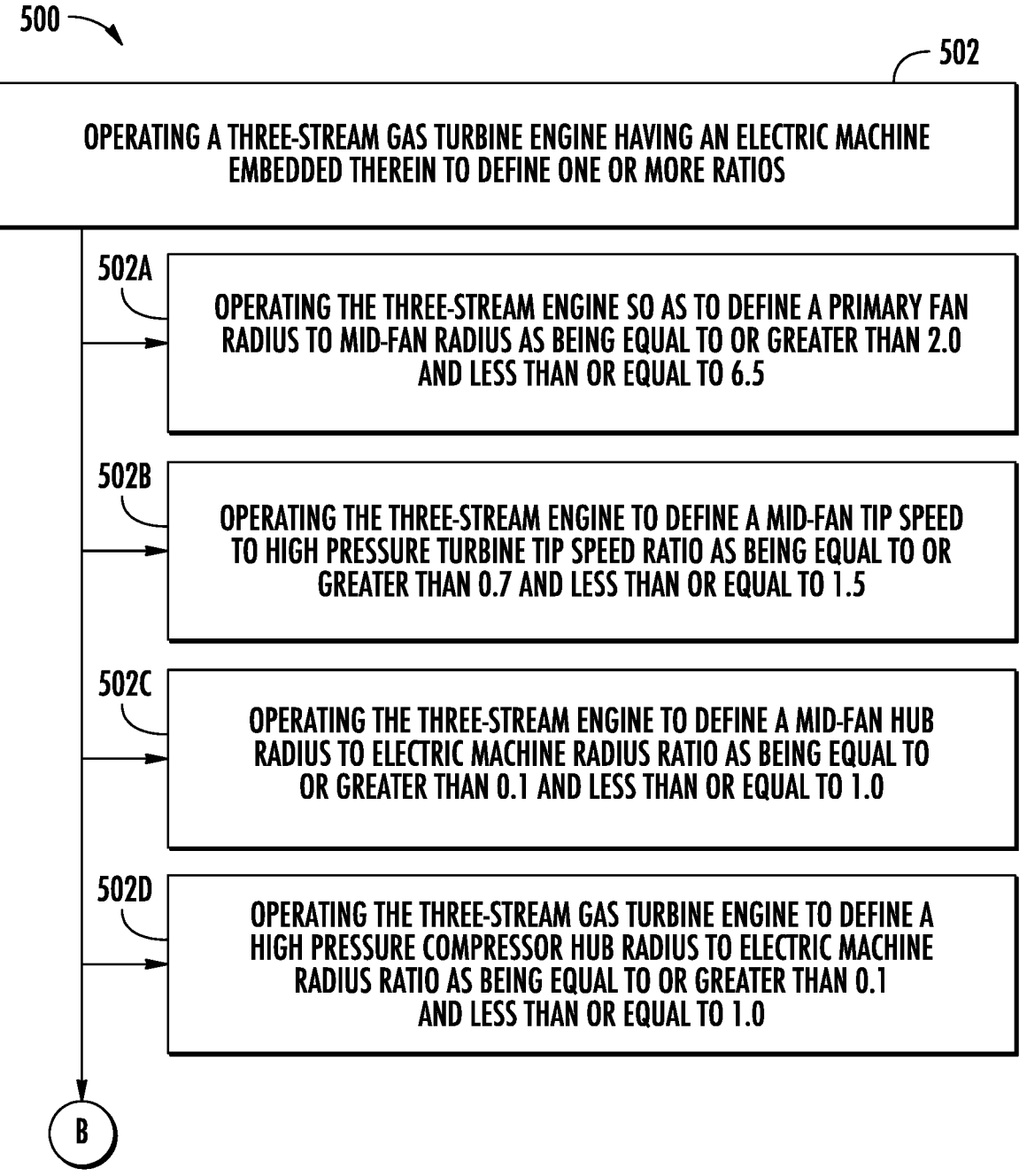

FIGS. 12A and 12B provide a flow diagram for a method (500) of operating a three-stream engine according to one example embodiment of the present disclosure. For instance, method (500) can be used to operate the three-stream gas turbine engine of FIGS. 7 and 8 or any other three-stream engine having an embedded electric machine operatively coupled with a shaft or spool of the engine, such as a high pressure shaft. It will be appreciated that method (500) is discussed herein to describe exemplary aspects of the present subject matter and is not intended to be limiting. Reference may be made to FIGS. 7 and 8 below to provide context to method (500).

At (502), the method (500) includes operating a three-stream gas turbine engine having an electric machine embedded therein to define one or more ratios, such as the ratios set forth in (502A) through (502H).

In some implementations, the three-stream engine defines a radial direction and has an inlet duct, a core duct in flow communication with the inlet duct, and a fan duct in flow communication with the inlet duct and positioned outward of the core duct along the radial direction. In such implementations, the mid-fan can be positioned within the inlet duct upstream of the core duct and the fan duct. Further, in some implementations, the three-stream engine has a fan positioned upstream of the mid-fan and operatively coupled with the second shaft (e.g., an LP shaft). In some implementations, the fan is unducted, e.g., as shown in FIG. 1. In other implementations, the fan is ducted, e.g., as shown in FIG. 5. In addition, in such implementations, the mid-fan is positioned between the fan and a low pressure compressor along an axial direction defined by the three-stream engine. Further, in such implementations, a root of a mid-fan blade is positioned inward of a root of a fan blade of the fan along the radial direction.

Furthermore, in some implementations, the three-stream engine has an engine core and the electric machine is positioned within the engine core. In this regard, the electric machine is embedded within the three-stream engine. For instance, in some implementations, the electric machine can be positioned inward of the core duct along the radial direction. Moreover, in some implementations, the electric machine is coupled to the first shaft (e.g., an HP shaft) aft of the mid-fan and forward of a high pressure compressor, e.g., as shown in FIG. 7. In yet other implementations, the electric machine is coupled to the first shaft forward of the mid-fan. Further, in some implementations, the electric machine is directly connected to the first shaft, e.g., as shown in FIGS. 7 and 8. In some alternative implementations, the electric machine is indirectly coupled with the first shaft, e.g., by way of a gearbox.

At (502A), the method (500) includes operating the three-stream gas turbine engine to define a primary fan radius to mid-fan radius as being equal to or greater than 2.0 and less than or equal to 6.5. In such implementations, the three-stream gas turbine engine has a primary fan having a plurality of fan blades. The primary fan radius to mid-fan radius ratio is defined by a radius spanning between a longitudinal axis defined by the three-stream gas turbine engine and a leading edge tip of one of the fan blades to a radius spanning between the longitudinal axis and a leading edge tip of one of the mid-fan blades. In some other implementations, the three-stream engine defines the primary fan radius to mid-fan radius ratio as being at least about 2.0. In other implementations, the three-stream engine defines the primary fan radius to mid-fan radius ratio as being at least about 2.5. In yet other implementations, the three-stream engine defines the primary fan radius to mid-fan radius ratio as being at least about 3.0. In some further implementations, the three-stream engine defines the primary fan radius to mid-fan radius ratio as being at least about 4.0. In yet other implementations, the three-stream engine defines the primary fan radius to mid-fan radius ratio as being at least about 6.0. In some other implementations, the three-stream engine defines the primary fan radius to mid-fan radius ratio as being about 6.5.

At (502B), in addition or alternatively to operating the three-stream gas turbine engine at (502A), the method (500) includes operating the three-stream engine so as to define a mid-fan tip speed to high pressure turbine tip speed ratio as being equal to or greater than 0.7 and less than or equal to 1.5. The mid-fan tip speed to high pressure turbine tip speed ratio being defined by a tip speed of a mid-fan blade of a mid-fan to a tip speed of a last stage turbine blade of a high pressure turbine.

At (502C), in addition or alternatively to operating the three-stream gas turbine engine at (502A) and/or at (502B), the method (500) includes operating the three-stream engine so as to define a mid-fan hub radius to electric machine radius ratio as being equal to or greater than 0.1 and less than or equal to 1.0. In such implementations, the mid-fan hub radius to electric machine radius ratio is defined by a radius spanning between a longitudinal axis defined by the three-stream gas turbine engine and an outermost point taken at a trailing edge of a hub of the mid-fan blade of the mid-fan to a radius spanning between the longitudinal axis and an outermost point of the rotor or a stator of the electric machine depending on which one is positioned outward of the other along a radial direction defined by the three-stream gas turbine engine.

At (502D), in addition or alternatively to operating the three-stream gas turbine engine at (502A) and/or at (502B) and/or at (502C), the method (500) includes operating the three-stream gas turbine engine to define a high pressure compressor hub radius to electric machine radius ratio as being equal to or greater than 0.1 and less than or equal to 1.0. In such implementations, the high pressure compressor hub radius to electric machine radius ratio is defined by a radius spanning between a longitudinal axis defined by the three-stream gas turbine engine and an outermost point taken at a leading edge of a hub of a first stage blade of a high pressure compressor operatively coupled with the first shaft to a radius spanning between the longitudinal axis and an outermost point of the rotor or a stator of the electric machine depending on which one is positioned outward of the other along a radial direction defined by the three-stream gas turbine engine.

At (502E), in addition or alternatively to operating the three-stream gas turbine engine at (502A) and/or at (502B) and/or at (502C) and/or at (502D), the method (500) includes operating the three-stream gas turbine engine so as to define a high pressure turbine tip speed to electric machine tip speed ratio as being equal to or greater than 0.1 and less than or equal to 1.0. The high pressure turbine tip speed to electric machine tip speed ratio is defined by a tip speed of a first stage turbine blade of the high pressure turbine to a tip speed of a rotor of the electric machine.

At (502F), in addition or alternatively to operating the three-stream gas turbine engine at (502A) and/or at (502B) and/or at (502C) and/or at (502D) and/or at (502E), the method (500) includes operating the three-stream gas turbine engine so as to define a high pressure turbine length to electric machine length ratio as being equal to or greater than 0.1 and less than or equal to 1.5. The high pressure turbine length to electric machine length ratio is defined by a length of the high pressure turbine operatively coupled with the first shaft to a length of the electric machine spanning between a leading edge and a trailing edge of the rotor of the electric machine along an axial direction defined by the three-stream gas turbine engine.

At (502G), in addition or alternatively to operating the three-stream gas turbine engine at (502A) and/or at (502B) and/or at (502C) and/or at (502D) and/or at (502E) and/or at (502F), the method (500) includes operating the three-stream gas turbine engine to define a power to voltage ratio of the electric machine as being equal to or greater than 0.3 and less than or equal to 2.0. In such implementations, the power to voltage ratio is defined by an electrical power output by the electric machine in kilowatts to a voltage level of the electric machine in volts of direct current. Further, in some implementations, the electrical power output of the electric machine ranges from 100 kilowatts to 1 megawatt. Further, in some implementations, the voltage level of the electric machine ranges between 270 volts of direct current and 3,000 volts of direct current. In some implementations, the electrical power output of the electric machine ranges from 100 kilowatts to 1 megawatt and the voltage level of the electric machine ranges between 270 volts of direct current and 3,000 volts of direct current.

At (502H), in addition or alternatively to operating the three-stream gas turbine engine at (502A) and/or at (502B) and/or at (502C) and/or at (502D) and/or at (502E), the method (500) includes operating the three-stream gas turbine engine so as to define a second electric machine power to first electric machine power ratio as being equal to or greater than 0.1 and less than or equal to 1.5. In such implementations, the electric machine is a first electric machine, and wherein the three stream engine further comprises a second electric machine operatively coupled with the second shaft. In some implementations, the first shaft is a high pressure shaft of the three-stream engine and the second shaft is a low pressure shaft of the three-stream engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

First Set of Clauses

1. A method, comprising: operating a three-stream gas turbine engine having an electric machine embedded therein to define a tip speed ratio as being equal to or greater than 0.2 and less than or equal to 1.0, the tip speed ratio being defined by a tip speed of a rotor of the electric machine to a tip speed of a mid-fan blade of a mid-fan, the electric machine and the mid-fan both being operatively coupled with a shaft of the three-stream gas turbine engine.

2. The method of any preceding clause, wherein the three-stream gas turbine engine has a primary fan having a plurality of fan blades, and wherein the three-stream gas turbine engine defines a primary fan radius to mid-fan radius as being equal to or greater than 2.0 and less than or equal to 6.5, the primary fan radius to mid-fan radius ratio being defined by a radius spanning between a longitudinal axis defined by the three-stream gas turbine engine and a leading edge tip of one of the fan blades to a radius spanning between the longitudinal axis and a leading edge tip of one of the mid-fan blades.

3. The method of any preceding clause, wherein the three-stream gas turbine engine and the electric machine define a mid-fan radius to electric machine radius ratio as being equal to or greater than 1.33 and less than or equal to 3.8, the mid-fan radius to electric machine radius ratio being defined by a radius spanning between a longitudinal axis defined by the three-stream gas turbine engine and a leading edge tip of one of the mid-fan blades of the mid-fan to a radius spanning between the longitudinal axis and an outermost point of the rotor of the electric machine.

4. The method of any preceding clause, wherein operating the three-stream gas turbine engine further comprises operating the three-stream gas turbine engine so as to define a power to voltage ratio of the electric machine as being equal to or greater than 0.3 and less than or equal to 2.0, the power to voltage ratio being defined by an electrical power output by the electric machine in kilowatts to a voltage level of the electric machine in volts of direct current.

4A. The method of any preceding clause, wherein operating the three-stream gas turbine engine further comprises operating the three-stream gas turbine engine so as to define a power to voltage ratio of the electric machine as being equal to or greater than 0.35 and less than or equal to 0.5, the power to voltage ratio being defined by an electrical power output by the electric machine in kilowatts to a voltage level of the electric machine in volts of direct current.

4B. The method of any preceding clause, wherein operating the three-stream gas turbine engine further comprises operating the three-stream gas turbine engine so as to define a power to voltage ratio of the electric machine as being equal to or greater than 0.4 and less than or equal to 0.5, the power to voltage ratio being defined by an electrical power output by the electric machine in kilowatts to a voltage level of the electric machine in volts of direct current.

5. The method of any preceding clause, wherein the electrical power output of the electric machine ranges from 100 kilowatts to 3 megawatts and the voltage level of the electric machine ranges from 270 volts of direct current to 3,000 volts of direct current.

6. The method of any preceding clause, wherein operating the three-stream gas turbine engine further comprises operating the three-stream gas turbine engine so as to define a power to voltage ratio of the electric machine as being equal to or greater than 0.35 and less than or equal to 0.5, the power to voltage ratio being defined by an electrical power output by the electric machine in kilowatts to a voltage level of the electric machine in volts of direct current.

7. The method of any preceding clause, wherein the electrical power output of the electric machine ranges from 100 kilowatts to 3 megawatts and the voltage level of the electric machine ranges from 270 volts of direct current to 3,000 volts of direct current.

8. The method of any preceding clause, wherein in operating the three-stream gas turbine engine, the rotor of the electric machine has a rotor tip speed being equal to or greater than 50 meters per second and less than or equal to 200 meters per second.

9. The method of any preceding clause, wherein in operating the three-stream gas turbine engine, the rotor of the electric machine has a rotor tip speed being equal to or greater than 140 meters per second and less than or equal to 190 meters per second.

10. The method of any preceding clause, wherein operating the three-stream gas turbine engine further comprises operating the three-stream gas turbine engine so as to define a power to AC rated current ratio of the electric machine as being equal to or greater than 0.2 and less than or equal to 2.5, the power to AC rated current ratio being defined by an electrical power output by the electric machine in kilowatts to an AC rated current of the electric machine in ampere root mean square.

10A. The method of any preceding clause, wherein operating the three-stream gas turbine engine further comprises operating the three-stream gas turbine engine so as to define a power to AC rated current ratio of the electric machine as being equal to or greater than 0.2 and less than or equal to 1.2, the power to AC rated current ratio being defined by an electrical power output by the electric machine in kilowatts to an AC rated current of the electric machine in ampere root mean square.

10B. The method of any preceding clause, wherein operating the three-stream gas turbine engine further comprises operating the three-stream gas turbine engine so as to define a power to AC rated current ratio of the electric machine as being equal to or greater than 1.8 and less than or equal to 2.5, the power to AC rated current ratio being defined by an electrical power output by the electric machine in kilowatts to an AC rated current of the electric machine in ampere root mean square.

10C. The method of any preceding clause, wherein operating the three-stream gas turbine engine further comprises operating the three-stream gas turbine engine so as to define a power to AC rated current ratio of the electric machine as being equal to or greater than 1.2 and less than or equal to 1.8, the power to AC rated current ratio being defined by an electrical power output by the electric machine in kilowatts to an AC rated current of the electric machine in ampere root mean square.

10D. The method of any preceding clause, wherein operating the three-stream gas turbine engine further comprises operating the three-stream gas turbine engine so as to define a power to AC rated current ratio of the electric machine as being equal to or greater than 0.6 and less than or equal to 2.0, the power to AC rated current ratio being defined by an electrical power output by the electric machine in kilowatts to an AC rated current of the electric machine in ampere root mean square.

11. The method of any preceding clause, wherein operating the three-stream gas turbine engine further comprises operating the three-stream gas turbine engine so as to define a torque at maximum speed to AC rated current ratio as being equal to or greater than as being equal to or greater than 0.1 and less than or equal to 6.0.

12. A three-stream gas turbine engine, comprising: a shaft; a primary fan operatively coupled with the shaft; a mid-fan positioned downstream of the primary fan and operatively coupled with the shaft, the mid-fan having mid-fan blades; an electric machine operatively coupled with the shaft, the electric machine having a stator and a rotor, the rotor rotatable with the shaft, and wherein, when operated, the three-stream gas turbine engine defines a tip speed ratio as being equal to or greater than 0.2 and less than or equal to 1.0, the tip speed ratio being defined by a tip speed of the rotor of the electric machine to a tip speed of one of the mid-fan blades.

13. The three-stream gas turbine engine of any preceding clause, wherein the three-stream gas turbine engine defines a mid-fan radius to electric machine radius ratio as being equal to or greater than 1.33 and less than or equal to 3.8, the mid-fan radius to electric machine radius ratio being defined by a radius spanning between a longitudinal axis defined by the three-stream gas turbine engine and a leading edge tip of one of the mid-fan blades of the mid-fan to a radius spanning between the longitudinal axis and an outermost point of the rotor of the electric machine.

14. The three-stream gas turbine engine of any preceding clause, wherein, when operated, the three-stream gas turbine engine defines a power to voltage ratio of the electric machine as being equal to or greater than 0.3 and less than or equal to 2.0, the power to voltage ratio being defined by an electrical power output by the electric machine in kilowatts to a voltage level of the electric machine in volts of direct current, and wherein the electrical power output of the electric machine ranges from 100 kilowatts to 3 megawatts and the voltage level of the electric machine ranges from 270 volts of direct current to 3,000 volts of direct current.

14A. The three-stream gas turbine engine of any preceding clause, wherein, when the three-stream gas turbine engine is operated, the rotor of the electric machine has a rotor tip speed being equal to or greater than 50 meters per second and less than or equal to 200 meters per second.

15. The three-stream gas turbine engine of any preceding clause, wherein the three-stream gas turbine engine further comprises: a primary fan positioned upstream of the mid-fan and operatively coupled with the shaft; an engine core; a core cowl surrounding the engine core; a core duct being defined between the engine core and the core cowl; a fan cowl surrounding the core cowl; a fan duct being defined between the core cowl and the fan cowl; an inlet duct in flow communication with the core duct and the fan duct, the inlet duct being defined between the engine core and the fan cowl, the mid-fan being positioned within the inlet duct.

16. A three-stream gas turbine engine, comprising: a shaft; a primary fan operatively coupled with the shaft; a mid-fan positioned downstream of the primary fan and operatively coupled with the shaft, the mid-fan having mid-fan blades; an electric machine operatively coupled with the shaft, the electric machine having a rotor rotatable with the shaft, and wherein the three-stream gas turbine engine defines a mid-fan radius to electric machine radius ratio as being equal to or greater than 1.33 and less than or equal to 3.8, the mid-fan radius to electric machine radius ratio being defined by a radius spanning between a longitudinal axis defined by the three-stream gas turbine engine and a leading edge tip of one of the mid-fan blades of the mid-fan to a radius spanning between the longitudinal axis and an outermost point of the rotor of the electric machine.

17. The three-stream gas turbine engine of any preceding clause, wherein the shaft is a low pressure shaft.

18. The three-stream gas turbine engine of any preceding clause, wherein the three-stream gas turbine engine defines the mid-fan radius to electric machine radius ratio as being equal to or greater than 2.5 and less than or equal to 3.3.

19. The three-stream gas turbine engine of any preceding clause, wherein the three-stream gas turbine engine defines the mid-fan radius to electric machine radius ratio as being equal to or greater than 2.9 and less than or equal to 3.2.

20. The three-stream gas turbine engine of any preceding clause, wherein the three-stream gas turbine engine defines an axial direction, and wherein the electric machine is positioned aft of the mid-fan and at least partially overlapping with or aft of a low pressure turbine of the three-stream gas turbine engine along the axial direction.

21. A three-stream gas turbine engine, comprising: a low pressure shaft; a high pressure shaft; a primary fan operatively coupled with the low pressure shaft, the primary fan having primary fan blades; a mid-fan positioned downstream of the primary fan and operatively coupled with the low pressure shaft, the mid-fan having mid-fan blades; an electric machine operatively coupled with the low pressure shaft or the high pressure shaft, and wherein the three-stream gas turbine engine defines a primary fan radius to mid-fan radius ratio as being equal to or greater than 2.0 and less than or equal to 6.5, the primary fan radius to mid-fan radius ratio being defined by a radius spanning between a longitudinal axis defined by the three-stream gas turbine engine and a leading edge tip of one of the blades of the primary fan to a radius spanning between the longitudinal axis and a leading edge tip of one of the mid-fan blades of the mid-fan.

22. The three-stream gas turbine engine of claim 21, wherein the electric machine is operatively coupled with the low pressure shaft.

23. The three-stream gas turbine engine of claim 21, wherein the electric machine is operatively coupled with the high pressure shaft.

24. The three-stream gas turbine engine of claim 21, wherein the primary fan is an unducted fan.

25. The three-stream gas turbine engine of claim 21, wherein the three-stream gas turbine engine defines the primary fan radius to mid-fan radius ratio as being equal to or greater than 3.0 and less than or equal to 6.5.

26. The three-stream gas turbine engine of claim 21, wherein the three-stream gas turbine engine and the electric machine define a mid-fan radius to electric machine radius ratio as being equal to or greater than 1.33 and less than or equal to 3.8, the mid-fan radius to electric machine radius ratio being defined by a radius spanning between the longitudinal axis and a leading edge tip of one of the mid-fan blades of the mid-fan to a radius spanning between the longitudinal axis and an outermost point of a rotor of the electric machine.

27. The three-stream gas turbine engine of claim 21, wherein the three-stream gas turbine engine and the electric machine define a mid-fan radius to electric machine radius ratio as being equal to or greater than 2.9 and less than or equal to 3.2, the mid-fan radius to electric machine radius ratio being defined by a radius spanning between the longitudinal axis and a leading edge tip of one of the mid-fan blades of the mid-fan to a radius spanning between the longitudinal axis and an outermost point of a rotor of the electric machine.

28. The three-stream gas turbine engine of claim 21, further comprising: a low pressure turbine operatively coupled with the low pressure shaft, and wherein the three-stream gas turbine engine defines an axial direction, and wherein the three-stream gas turbine engine defines an electric machine length to low pressure turbine length ratio as being equal to or greater than 0.01 and less than or equal to 3.0, the electric machine length to low pressure turbine length ratio being defined by a length of the low pressure turbine to a length of the electric machine, the length of the electric machine spanning between a leading edge and a trailing edge of a rotor of the electric machine along the axial direction, the length of the low pressure turbine spanning between a leading edge of a hub of a first stage turbine blade of the low pressure turbine to a trailing edge of a hub of a last stage turbine blade of the low pressure turbine.

29. The three-stream gas turbine engine of claim 21, further comprising: a low pressure turbine operatively coupled with the low pressure shaft, and wherein the three-stream gas turbine engine defines an axial direction, and wherein the three-stream gas turbine engine defines an electric machine tip radius to low pressure turbine last stage hub radius ratio as being equal to or greater than 0.1 and less than or equal to 1.0, the electric machine tip radius to low pressure turbine last stage hub radius ratio being defined by a radius spanning between a longitudinal axis defined by the three-stream gas turbine engine and an outermost point of a rotor of the electric machine to a radius spanning between the longitudinal axis and an outermost point of a hub of a last stage turbine blade of the low pressure turbine.

30. The three-stream gas turbine engine of claim 21, further comprising: an engine core; a core cowl surrounding the engine core; a core duct being defined between the engine core and the core cowl; a fan cowl surrounding the core cowl; a fan duct being defined between the core cowl and the fan cowl; an inlet duct in flow communication with the core duct and the fan duct, the inlet duct being defined between the engine core and the fan cowl, the mid-fan being positioned within the inlet duct, the electric machine being positioned within the engine core.

Second Set of Clauses

1. A three-stream gas turbine engine defining an axial direction, the three-stream gas turbine engine comprising: a shaft; a primary fan operatively coupled with the shaft; a mid-fan positioned downstream of the primary fan and operatively coupled with the shaft, the mid-fan having mid-fan blades; a low pressure turbine operatively coupled with the shaft; an electric machine operatively coupled with the shaft, the electric machine having a stator and a rotor, the rotor rotatable with the shaft, and wherein the three-stream gas turbine engine defines an electric machine length to low pressure turbine length ratio as being equal to or greater than 0.01 and less than or equal to 3.0, the electric machine length to low pressure turbine length ratio being defined by a length of the low pressure turbine to a length of the electric machine spanning between a leading edge and a trailing edge of the rotor of the electric machine along the axial direction, the length of the low pressure turbine spanning between a leading edge of a hub of a first stage turbine blade of the low pressure turbine to a trailing edge of a hub of a last stage turbine blade of the low pressure turbine.

2. The three-stream gas turbine engine of any preceding clause, wherein the three-stream gas turbine engine has a primary fan having a plurality of fan blades, and wherein the three-stream gas turbine engine defines a primary fan radius to mid-fan radius as being equal to or greater than 2.0 and less than or equal to 6.5, the primary fan radius to mid-fan radius ratio being defined by a radius spanning between a longitudinal axis defined by the three-stream gas turbine engine and a leading edge tip of one of the fan blades to a radius spanning between the longitudinal axis and a leading edge tip of one of the mid-fan blades.

3. The three-stream gas turbine engine of any preceding clause, wherein the three-stream gas turbine engine further defines an electric machine tip radius to low pressure turbine last stage hub radius ratio as being equal to or greater than 0.1 and less than or equal to 1.0, the electric machine tip radius to low pressure turbine last stage hub radius ratio being defined by a radius spanning between a longitudinal axis defined by the three-stream engine and an outermost point of the rotor of the electric machine to a radius spanning between the longitudinal axis and an outermost point of a hub of a last stage turbine blade of the low pressure turbine.

4. The three-stream gas turbine engine of any preceding clause, wherein, when operated, the three-stream gas turbine engine defines an electric machine power to low pressure turbine power ratio as being equal to or greater than 0.01 and less than or equal to 1.0 at flight idle.

4A. The three-stream gas turbine engine of any preceding clause, wherein, when operated, the three-stream gas turbine engine defines an electric machine power to low pressure turbine power ratio as being equal to or greater than 0.01 and less than or equal to 0.2 at flight idle.

4B. The three-stream gas turbine engine of any preceding clause, wherein, when operated, the three-stream gas turbine engine defines an electric machine power to low pressure turbine power ratio as being equal to or greater than 0.1 and less than or equal to 0.45 at flight idle.

4C. The three-stream gas turbine engine of any preceding clause, wherein, when operated, the three-stream gas turbine engine defines an electric machine power to low pressure turbine power ratio as being equal to or greater than 0.45 and less than or equal to 1.0 at flight idle.

5. The three-stream gas turbine engine of any preceding clause, wherein, when operated, the three-stream gas turbine engine defines a power to voltage ratio of the electric machine as being equal to or greater than 0.3 and less than or equal to 2.0, the power to voltage ratio being defined by an electrical power output by the electric machine in kilowatts to a voltage level of the electric machine in volts of direct current, and wherein the electrical power output of the electric machine ranges from 100 kilowatts to 3 megawatts and the voltage level of the electric machine ranges from 270 volts of direct current to 3,000 volts of direct current.

6. The three-stream gas turbine engine of any preceding clause, further comprising: a primary fan positioned upstream of the mid-fan and operatively coupled with the shaft; an engine core; a core cowl surrounding the engine core; a core duct being defined between the engine core and the core cowl; a fan cowl surrounding the core cowl; a fan duct being defined between the core cowl and the fan cowl; an inlet duct in flow communication with the core duct and the fan duct, the inlet duct being defined between the engine core and the fan cowl, the mid-fan being positioned within the inlet duct.

7. The three-stream gas turbine engine of any preceding clause, wherein the three-stream engine defines a radial direction, the three-stream engine further comprising: an engine core; a core cowl surrounding the engine core; a core duct being defined between the engine core and the core cowl; a fan cowl surrounding the core cowl; a fan duct being defined between the core cowl and the fan cowl; an inlet duct in flow communication with the core duct and the fan duct, the inlet duct being defined between the engine core and the fan cowl, the electric machine being directly mechanically coupled with the shaft and positioned inward of the core duct along the radial direction.

7A. The three-stream gas turbine engine of any preceding clause, wherein the three-stream gas turbine engine defines the electric machine length to low pressure turbine length ratio as being equal to or greater than 0.01 and less than or equal to 0.5.

7B. The three-stream gas turbine engine of any preceding clause, wherein the three-stream gas turbine engine defines the electric machine length to low pressure turbine length ratio as being equal to or greater than 0.3 and less than or equal to 1.0.

7C. The three-stream gas turbine engine of any preceding clause, wherein the three-stream gas turbine engine defines the electric machine length to low pressure turbine length ratio as being equal to or greater than 1.0 and less than or equal to 3.0.

7D. The three-stream gas turbine engine of any preceding clause, wherein the three-stream gas turbine engine defines the electric machine length to low pressure turbine length ratio as being equal to or greater than 2.0 and less than or equal to 3.0.

8. A three-stream gas turbine engine, comprising: a shaft; a primary fan operatively coupled with the shaft; a mid-fan positioned downstream of the primary fan and operatively coupled with the shaft, the mid-fan having mid-fan blades; a low pressure turbine; an electric machine operatively coupled with the shaft, the electric machine having a stator and a rotor, the rotor rotatable with the shaft, and wherein the three-stream gas turbine engine further defines an electric machine tip radius to low pressure turbine last stage hub radius ratio as being equal to or greater than 0.1 and less than or equal to 1.0.

8A. The three-stream gas turbine engine of any preceding clause, wherein the three-stream gas turbine engine defines the electric machine tip radius to low pressure turbine last stage hub radius ratio as being equal to or greater than 0.1 and less than or equal to 0.5.

8B. The three-stream gas turbine engine of any preceding clause, wherein the three-stream gas turbine engine defines the electric machine tip radius to low pressure turbine last stage hub radius ratio as being equal to or greater than 0.4 and less than or equal to 1.0.

8C. The three-stream gas turbine engine of any preceding clause, wherein the three-stream gas turbine engine defines the electric machine tip radius to low pressure turbine last stage hub radius ratio as being equal to or greater than 0.7 and less than or equal to 1.0.

9. The three-stream gas turbine engine of any preceding clause, wherein the three-stream gas turbine engine defines an axial direction, and wherein the three-stream gas turbine engine defines an electric machine length to low pressure turbine length ratio as being equal to or greater than 0.01 and less than or equal to 3.0, the electric machine length to low pressure turbine length ratio being defined by a length of the low pressure turbine to a length of the electric machine spanning between a leading edge and a trailing edge of the rotor of the electric machine along the axial direction, the length of the low pressure turbine spanning between a leading edge of a hub of a first stage turbine blade of the low pressure turbine to a trailing edge of a hub of a last stage turbine blade of the low pressure turbine.

10. The three-stream gas turbine engine of any preceding clause, wherein, when operated, the three-stream gas turbine engine defines an electric machine power to low pressure turbine power ratio as being equal to or greater than 0.01 and less than or equal to 1.0 at flight idle.

11. The three-stream gas turbine engine of any preceding clause, wherein the three-stream gas turbine engine defines an axial direction, and wherein the electric machine is positioned aft of the mid-fan and at least partially overlapping with or aft of the low pressure turbine along the axial direction.

12. The three-stream gas turbine engine of any preceding clause, wherein the primary fan is an unducted fan.

13. The three-stream gas turbine engine of any preceding clause, further comprising: an engine core; a core cowl surrounding the engine core; a core duct being defined between the engine core and the core cowl; a fan cowl surrounding the core cowl; a fan duct being defined between the core cowl and the fan cowl; an inlet duct in flow communication with the core duct and the fan duct, the inlet duct being defined between the engine core and the fan cowl, the electric machine being directly mechanically coupled with the shaft and embedded within the engine core.

14. The three-stream gas turbine engine of any preceding clause, wherein the three-stream gas turbine engine defines a mid-fan radius to electric machine radius ratio as being equal to or greater than 2.5 and less than or equal to 3.3, the mid-fan radius to electric machine radius ratio being defined by a radius spanning between a longitudinal axis defined by the three-stream gas turbine engine and a leading edge tip of one of the mid-fan blades of the mid-fan to a radius spanning between the longitudinal axis and an outermost point of the rotor of the electric machine.

15. The three-stream gas turbine engine of any preceding clause, wherein the primary fan has a plurality of fan blades, and wherein the three-stream gas turbine engine defines a primary fan radius to mid-fan radius as being equal to or greater than 2.0 and less than or equal to 6.5, the primary fan radius to mid-fan radius ratio being defined by a radius spanning between a longitudinal axis defined by the three-stream gas turbine engine and a leading edge tip of one of the fan blades to a radius spanning between the longitudinal axis and a leading edge tip of one of the mid-fan blades.

16. A method, comprising: operating a three-stream gas turbine engine having an electric machine embedded therein to define a mid-fan tip speed to low pressure turbine tip speed ratio as being equal to or greater than 0.7 and less than or equal to 1.5, the mid-fan tip speed to low pressure turbine tip speed ratio being defined by a tip speed of a mid-fan blade of a mid-fan to a tip speed of a last stage turbine blade of a low pressure turbine, the mid-fan being operatively coupled with a shaft of the three-stream gas turbine engine and the low pressure turbine being operatively coupled with the shaft.

17. The method of any preceding clause, wherein operating the three-stream gas turbine engine further comprises operating the three-stream gas turbine engine so as to define the mid-fan tip speed to low pressure turbine tip speed ratio as being equal to or greater than 0.8 and less than or equal to 1.2.

18. The method of any preceding clause, wherein operating the three-stream gas turbine engine further comprises operating the three-stream gas turbine engine so as to define a low pressure turbine tip speed to electric machine tip speed ratio as being equal to or greater than 0.1 and less than or equal to 1.0.

18A. The method of any preceding clause, wherein operating the three-stream gas turbine engine further comprises operating the three-stream gas turbine engine so as to define a low pressure turbine tip speed to electric machine tip speed ratio as being equal to or greater than 0.1 and less than or equal to 0.3.

18B. The method of any preceding clause, wherein operating the three-stream gas turbine engine further comprises operating the three-stream gas turbine engine so as to define a low pressure turbine tip speed to electric machine tip speed ratio as being equal to or greater than 0.5 and less than or equal to 0.9.

19. The method of any preceding clause, wherein operating the three-stream gas turbine engine further comprises operating the three-stream gas turbine engine so as to define a power to voltage ratio of the electric machine as being equal to or greater than 0.3 and less than or equal to 2.0, the power to voltage ratio being defined by an electrical power output by the electric machine in kilowatts to a voltage level of the electric machine in volts of direct current.

20. The method of any preceding clause, wherein operating the three-stream gas turbine engine further comprises operating the three-stream gas turbine engine so as to define a power to AC rated current ratio of the electric machine as being equal to or greater than 0.2 and less than or equal to 2.5, the power to AC rated current ratio being defined by an electrical power output by the electric machine in kilowatts to an AC rated current of the electric machine in ampere root mean square.

Third Set of Clauses

1. A method, comprising: operating a three-stream gas turbine engine having an electric machine embedded therein to define a mid-fan tip speed to high pressure turbine tip speed ratio as being equal to or greater than 0.7 and less than or equal to 1.5, the mid-fan tip speed to high pressure turbine tip speed ratio being defined by a tip speed of a mid-fan blade of a mid-fan to a tip speed of a last stage turbine blade of a high pressure turbine, the electric machine and the high pressure turbine being operatively coupled with a first shaft of the three-stream gas turbine engine and the mid-fan being operatively coupled with a second shaft of the three-stream gas turbine engine.

2. The method of any preceding clause, wherein operating the three-stream gas turbine engine further comprises operating the three-stream gas turbine engine so as to define the mid-fan tip speed to high pressure turbine tip speed ratio as being equal to or greater than 0.8 and less than or equal to 1.2.

3. The method of any preceding clause, wherein operating the three-stream gas turbine engine further comprises operating the three-stream gas turbine engine so as to define the mid-fan tip speed to high pressure turbine tip speed ratio as being equal to or greater than 0.9 and less than or equal to 1.1.

4. The method of any preceding clause, wherein the three-stream gas turbine engine has a primary fan having a plurality of fan blades, and wherein the three-stream gas turbine engine defines a primary fan radius to mid-fan radius as being equal to or greater than 2.0 and less than or equal to 6.5, the primary fan radius to mid-fan radius ratio being defined by a radius spanning between a longitudinal axis defined by the three-stream gas turbine engine and a leading edge tip of one of the fan blades to a radius spanning between the longitudinal axis and a leading edge tip of one of the mid-fan blades.

5. The method of any preceding clause, wherein the first shaft is a high pressure shaft and the second shaft is a low pressure shaft.

6. The method of any preceding clause, wherein operating the three-stream gas turbine engine further comprises operating the three-stream gas turbine engine so as to define a high pressure turbine tip speed to electric machine tip speed ratio as being equal to or greater than 0.1 and less than or equal to 1.0, the high pressure turbine tip speed to electric machine tip speed ratio being defined by a tip speed of a first stage turbine blade of the high pressure turbine to a tip speed of a rotor of the electric machine.

7. The method of any preceding clause, wherein operating the three-stream gas turbine engine further comprises operating the three-stream gas turbine engine so as to define a power to voltage ratio as being equal to or greater than 0.3 and less than or equal to 2.0, the power to voltage ratio being defined by an electrical power output by the electric machine in kilowatts to a voltage level of the electric machine in volts of direct current.

7A. The method of any preceding clause, wherein operating the three-stream gas turbine engine further comprises operating the three-stream gas turbine engine so as to define a power to voltage ratio as being equal to or greater than 0.3 and less than or equal to 1.1, the power to voltage ratio being defined by an electrical power output by the electric machine in kilowatts to a voltage level of the electric machine in volts of direct current.

7B. The method of any preceding clause, wherein operating the three-stream gas turbine engine further comprises operating the three-stream gas turbine engine so as to define a power to voltage ratio as being equal to or greater than 0.3 and less than or equal to 0.6, the power to voltage ratio being defined by an electrical power output by the electric machine in kilowatts to a voltage level of the electric machine in volts of direct current.

7C. The method of any preceding clause, wherein operating the three-stream gas turbine engine further comprises operating the three-stream gas turbine engine so as to define a power to voltage ratio as being equal to or greater than 0.6 and less than or equal to 1.1, the power to voltage ratio being defined by an electrical power output by the electric machine in kilowatts to a voltage level of the electric machine in volts of direct current.

7D. The method of any preceding clause, wherein operating the three-stream gas turbine engine further comprises operating the three-stream gas turbine engine so as to define a power to voltage ratio as being equal to or greater than 1.0 and less than or equal to 2.0, the power to voltage ratio being defined by an electrical power output by the electric machine in kilowatts to a voltage level of the electric machine in volts of direct current.

8. The method of any preceding clause, wherein the electrical power output by the electric machine ranges from 100 kilowatts to 1 megawatt and the voltage level of the electric machine ranges from 270 volts of direct current to 3,000 volts of direct current.

9. The method of any preceding clause, wherein the electric machine is a first electric machine, and wherein the three stream engine further comprises a second electric machine operatively coupled with the second shaft, and wherein operating the three-stream gas turbine engine further comprises operating the three-stream gas turbine engine so as to define a second electric machine power to first electric machine power ratio as being equal to or greater than 0.1 and less than or equal to 1.5.

9A. The method of any preceding clause, wherein the electric machine is a first electric machine, and wherein the three stream engine further comprises a second electric machine operatively coupled with the second shaft, and wherein operating the three-stream gas turbine engine further comprises operating the three-stream gas turbine engine so as to define a second electric machine power to first electric machine power ratio as being equal to or greater than 0.5 and less than or equal to 1.2.

9B. The method of any preceding clause, wherein the electric machine is a first electric machine, and wherein the three stream engine further comprises a second electric machine operatively coupled with the second shaft, and wherein operating the three-stream gas turbine engine further comprises operating the three-stream gas turbine engine so as to define a second electric machine power to first electric machine power ratio as being equal to or greater than 0.5 and less than or equal to 0.75.

9C. The method of any preceding clause, wherein the electric machine is a first electric machine, and wherein the three stream engine further comprises a second electric machine operatively coupled with the second shaft, and wherein operating the three-stream gas turbine engine further comprises operating the three-stream gas turbine engine so as to define a second electric machine power to first electric machine power ratio as being equal to or greater than 0.75 and less than or equal to 1.2.

9D. The method of any preceding clause, wherein the electric machine is a first electric machine, and wherein the three stream engine further comprises a second electric machine operatively coupled with the second shaft, and wherein operating the three-stream gas turbine engine further comprises operating the three-stream gas turbine engine so as to define a second electric machine power to first electric machine power ratio as being equal to or greater than 0.6 and less than or equal to 0.9.

10. The method of any preceding clause, wherein operating the three-stream gas turbine engine further comprises operating the three-stream gas turbine engine so as to define a mid-fan hub radius to electric machine radius ratio as being equal to or greater than 0.1 and less than or equal to 1.0, the mid-fan hub radius to electric machine radius ratio being defined by a radius spanning between a longitudinal axis defined by the three-stream gas turbine engine and an outermost point taken at a trailing edge of a hub of a mid-fan blade of the mid-fan to a radius spanning between the longitudinal axis and an outermost point of the rotor or a stator of the electric machine depending on which one is positioned outward of the other along a radial direction defined by the three-stream gas turbine engine.

11. The method of any preceding clause, wherein operating the three-stream gas turbine engine further comprises operating the three-stream gas turbine engine so as to define a high pressure compressor hub radius to electric machine radius ratio as being equal to or greater than 0.1 and less than or equal to 1.0, the high pressure compressor hub radius to electric machine radius ratio being defined by a radius spanning between a longitudinal axis defined by the three-stream gas turbine engine and an outermost point taken at a leading edge of a hub of a first stage blade of a high pressure compressor operatively coupled with the first shaft to a radius spanning between the longitudinal axis and an outermost point of a rotor or a stator of the electric machine depending on which one is positioned outward of the other along a radial direction defined by the three-stream gas turbine engine.

12. The method of any preceding clause, wherein operating the three-stream gas turbine engine further comprises operating the three-stream gas turbine engine so as to define a high pressure turbine length to electric machine length ratio as being equal to or greater than 0.1 and less than or equal to 1.5, the high pressure turbine length to electric machine length ratio being defined by a length of the high pressure turbine operatively coupled with the first shaft to a length of the electric machine spanning between a leading edge and a trailing edge of the rotor of the electric machine along an axial direction defined by the three-stream gas turbine engine.

12A. The method of any preceding clause, wherein operating the three-stream gas turbine engine further comprises operating the three-stream gas turbine engine so as to define a high pressure turbine length to electric machine length ratio as being equal to or greater than 0.1 and less than or equal to 0.5.

12B. The method of any preceding clause, wherein operating the three-stream gas turbine engine further comprises operating the three-stream gas turbine engine so as to define a high pressure turbine length to electric machine length ratio as being equal to or greater than 0.5 and less than or equal to 0.85.

12C. The method of any preceding clause, wherein operating the three-stream gas turbine engine further comprises operating the three-stream gas turbine engine so as to define a high pressure turbine length to electric machine length ratio as being equal to or greater than 0.85 and less than or equal to 1.5.

13. A three-stream gas turbine engine, comprising: a low pressure shaft; a primary fan operatively coupled with the low pressure shaft; a mid-fan positioned downstream of the primary fan and operatively coupled with the low pressure shaft, the mid-fan having mid-fan blades; a high pressure shaft; an electric machine operatively coupled with the high pressure shaft, the electric machine having a rotor rotatable with the high pressure shaft, and wherein the three-stream engine defines a mid-fan hub radius to electric machine radius ratio as being equal to or greater than 0.1 and less than or equal to 1.0, the mid-fan hub radius to electric machine radius ratio being defined by a radius spanning between a longitudinal axis defined by the three-stream gas turbine engine and an outermost point taken at a trailing edge of a hub of the mid-fan blade of the mid-fan to a radius spanning between the longitudinal axis and an outermost point of the rotor or a stator of the electric machine depending on which one is positioned outward of the other along a radial direction defined by the three-stream gas turbine engine.

13A. The three-stream gas turbine engine of any preceding clause, wherein the three-stream engine defines a mid-fan hub radius to electric machine radius ratio as being equal to or greater than 0.1 and less than or equal to 0.4.

13B. The three-stream gas turbine engine of any preceding clause, wherein the three-stream engine defines a mid-fan hub radius to electric machine radius ratio as being equal to or greater than 0.4 and less than or equal to 0.8.

13C. The three-stream gas turbine engine of any preceding clause, wherein the three-stream engine defines a mid-fan hub radius to electric machine radius ratio as being equal to or greater than 0.6 and less than or equal to 1.0.

14. The three-stream gas turbine engine of any preceding clause, further comprising: a high pressure turbine having last stage turbine blades, and wherein, when operated, the three-stream gas turbine engine defines a mid-fan tip speed to high pressure turbine tip speed ratio as being equal to or greater than 0.7 and less than or equal to 1.5, the mid-fan tip speed to high pressure turbine tip speed ratio being defined by a tip speed of one of the mid-fan blades to a tip speed of one of the last stage turbine blades.

15. The three-stream gas turbine engine of any preceding clause, further comprising: a high pressure turbine operatively coupled with the first shaft and having first stage turbine blades, and wherein the three-stream gas turbine engine defines a longitudinal axis and a radial direction, and wherein the three-stream gas turbine engine defines a high pressure compressor hub radius to electric machine radius ratio as being equal to or greater than 0.1 and less than or equal to 1.0, the high pressure compressor hub radius to electric machine radius ratio being defined by a radius spanning between the longitudinal axis and an outermost point taken at a leading edge of a hub of one of the first stage blades to a radius spanning between the longitudinal axis and an outermost point of a rotor or a stator of the electric machine depending on which one is positioned outward of the other along the radial direction.

15A. The three-stream gas turbine engine of any preceding clause, wherein the three-stream gas turbine engine defines the high pressure compressor hub radius to electric machine radius ratio as being equal to or greater than 0.1 and less than or equal to 0.25.

15B. The three-stream gas turbine engine of any preceding clause, wherein the three-stream gas turbine engine defines the high pressure compressor hub radius to electric machine radius ratio as being equal to or greater than 0.25 and less than or equal to 0.5.

15C. The three-stream gas turbine engine of any preceding clause, wherein the three-stream gas turbine engine defines the high pressure compressor hub radius to electric machine radius ratio as being equal to or greater than 0.5 and less than or equal to 1.0.

16. The three-stream gas turbine engine of any preceding clause, further comprising: a high pressure turbine operatively coupled with the first shaft and having first stage turbine blades, and wherein the three-stream gas turbine engine defines an axial direction, and wherein the three-stream gas turbine defines a high pressure turbine length to electric machine length ratio as being equal to or greater than 0.1 and less than or equal to 1.5, the high pressure turbine length to electric machine length ratio being defined by a length of the high pressure turbine to a length of the electric machine spanning between a leading edge and a trailing edge of a rotor of the electric machine along the axial direction.

17. The three-stream gas turbine engine of any preceding clause, wherein the three-stream gas turbine engine has a primary fan having a plurality of fan blades, and wherein the three-stream gas turbine engine defines a primary fan radius to mid-fan radius as being equal to or greater than 2.0 and less than or equal to 6.5, the primary fan radius to mid-fan radius ratio being defined by a radius spanning between a longitudinal axis defined by the three-stream gas turbine engine and a leading edge tip of one of the fan blades to a radius spanning between the longitudinal axis and a leading edge tip of one of the mid-fan blades.

18. A method, comprising: operating a three-stream gas turbine engine having a primary fan, a mid-fan positioned downstream of the primary fan, and an electric machine embedded therein to define a high pressure turbine tip speed to electric machine tip speed ratio as being equal to or greater than 0.1 and less than or equal to 1.0, the high pressure turbine tip speed to electric machine tip speed ratio being defined by a tip speed of a first stage turbine blade of a high pressure turbine to a tip speed of a rotor of the electric machine, the electric machine and the high pressure turbine being operatively coupled with a first shaft of the three-stream gas turbine engine and the mid-fan and the primary fan being operatively coupled with a second shaft of the three-stream gas turbine engine.

18A. The method of any preceding clause, wherein operating the three-stream gas turbine engine further comprises operating the three-stream gas turbine engine so as to define the high pressure turbine tip speed to electric machine tip speed ratio as being equal to or greater than 0.1 and less than or equal to 0.3.

18B. The method of any preceding clause, wherein operating the three-stream gas turbine engine further comprises operating the three-stream gas turbine engine so as to define the high pressure turbine tip speed to electric machine tip speed ratio as being equal to or greater than 0.3 and less than or equal to 0.6.

18C. The method of any preceding clause, wherein operating the three-stream gas turbine engine further comprises operating the three-stream gas turbine engine so as to define the high pressure turbine tip speed to electric machine tip speed ratio as being equal to or greater than 0.4 and less than or equal to 1.0.

19. The method of any preceding clause, wherein operating the three-stream gas turbine engine further comprises operating the three-stream gas turbine engine so as to define a power to voltage ratio as being equal to or greater than 0.3 and less than or equal to 2.0, the power to voltage ratio being defined by an electrical power output by the electric machine in kilowatts to a voltage level of the electric machine in volts of direct current.

20. The method of any preceding clause, wherein operating the three-stream gas turbine engine further comprises operating the three-stream gas turbine engine so as to define a mid-fan tip speed to high pressure turbine tip speed ratio as being equal to or greater than 0.7 and less than or equal to 1.5, the mid-fan tip speed to high pressure turbine tip speed ratio being defined by a tip speed of a mid-fan blade of the mid-fan to a tip speed of a last stage turbine blade of the high pressure turbine.

Fourth Set of Clauses

1. A three-stream gas turbine engine, comprising: a low pressure shaft; a high pressure shaft; a primary fan operatively coupled with the low pressure shaft, the primary fan having primary fan blades; a mid-fan positioned downstream of the primary fan and operatively coupled with the low pressure shaft, the mid-fan having mid-fan blades; an electric machine operatively coupled with the low pressure shaft or the high pressure shaft, and wherein the three-stream gas turbine engine defines a primary fan radius to mid-fan radius ratio as being equal to or greater than 2.0 and less than or equal to 6.5, the primary fan radius to mid-fan radius ratio being defined by a radius spanning between a longitudinal axis defined by the three-stream gas turbine engine and a leading edge tip of one of the blades of the primary fan to a radius spanning between the longitudinal axis and a leading edge tip of one of the mid-fan blades of the mid-fan.

2. A method, comprising: operating a three-stream gas turbine engine having an electric machine embedded therein to define a tip speed ratio as being equal to or greater than 0.2 and less than or equal to 1.0, the tip speed ratio being defined by a tip speed of a rotor of the electric machine to a tip speed of a mid-fan blade of a mid-fan, the electric machine and the mid-fan both being operatively coupled with a shaft of the three-stream gas turbine engine.

3. A three-stream gas turbine engine, comprising: a shaft; a primary fan operatively coupled with the shaft; a mid-fan positioned downstream of the primary fan and operatively coupled with the shaft, the mid-fan having mid-fan blades; an electric machine operatively coupled with the shaft, the electric machine having a rotor rotatable with the shaft, and wherein the three-stream gas turbine engine defines a mid-fan radius to electric machine radius ratio as being equal to or greater than 1.33 and less than or equal to 3.8, the mid-fan radius to electric machine radius ratio being defined by a radius spanning between a longitudinal axis defined by the three-stream gas turbine engine and a leading edge tip of one of the mid-fan blades of the mid-fan to a radius spanning between the longitudinal axis and an outermost point of the rotor of the electric machine.

4. A three-stream gas turbine engine defining an axial direction, the three-stream gas turbine engine comprising: a shaft; a primary fan operatively coupled with the shaft; a mid-fan positioned downstream of the primary fan and operatively coupled with the shaft, the mid-fan having mid-fan blades; a low pressure turbine operatively coupled with the shaft; an electric machine operatively coupled with the shaft, the electric machine having a stator and a rotor, the rotor rotatable with the shaft, and wherein the three-stream gas turbine engine defines an electric machine length to low pressure turbine length ratio as being equal to or greater than 0.01 and less than or equal to 3.0, the electric machine length to low pressure turbine length ratio being defined by a length of the low pressure turbine to a length of the electric machine spanning between a leading edge and a trailing edge of the rotor of the electric machine along the axial direction, the length of the low pressure turbine spanning between a leading edge of a hub of a first stage turbine blade of the low pressure turbine to a trailing edge of a hub of a last stage turbine blade of the low pressure turbine.

5. A three-stream gas turbine engine, comprising: a shaft; a primary fan operatively coupled with the shaft; a mid-fan positioned downstream of the primary fan and operatively coupled with the shaft, the mid-fan having mid-fan blades; a low pressure turbine; an electric machine operatively coupled with the shaft, the electric machine having a stator and a rotor, the rotor rotatable with the shaft, and wherein the three-stream gas turbine engine further defines an electric machine tip radius to low pressure turbine last stage hub radius ratio as being equal to or greater than 0.1 and less than or equal to 1.0.

6. A method, comprising: operating a three-stream gas turbine engine having an electric machine embedded therein to define a mid-fan tip speed to low pressure turbine tip speed ratio as being equal to or greater than 0.7 and less than or equal to 1.5, the mid-fan tip speed to low pressure turbine tip speed ratio being defined by a tip speed of a mid-fan blade of a mid-fan to a tip speed of a last stage turbine blade of a low pressure turbine, the mid-fan being operatively coupled with a shaft of the three-stream gas turbine engine and the low pressure turbine being operatively coupled with the shaft.

7. A method, comprising: operating a three-stream gas turbine engine so as to define a low pressure turbine tip speed to electric machine tip speed ratio as being equal to or greater than 0.1 and less than or equal to 1.0.

8. A method, comprising: operating a three-stream gas turbine engine so as to define an electric machine power to low pressure turbine power ratio as being equal to or greater than 0.01 and less than or equal to 1.0 at flight idle.

9. A method, comprising: operating a three-stream gas turbine engine so as to define a power to voltage ratio as being equal to or greater than 0.3 and less than or equal to 2.0, the power to voltage ratio being defined by an electrical power output by an electric machine in kilowatts to a voltage level of the electric machine in volts of direct current, a mid-fan of the three-stream gas turbine engine and the electric machine being operatively coupled with a same shaft of the three-stream gas turbine engine.

10. A method, comprising: operating a three-stream gas turbine engine so as to define a power to AC rated current ratio of an electric machine of the three-stream gas turbine engine as being equal to or greater than 0.2 and less than or equal to 2.5, the power to AC rated current ratio being defined by an electrical power output by the electric machine in kilowatts to an AC rated current of the electric machine in ampere root mean square.

11. A method, comprising: operating a three-stream gas turbine engine so as to define a torque at maximum speed to AC rated current ratio as being equal to or greater than as being equal to or greater than 0.1 and less than or equal to 6.0.

12. A method, comprising: operating a three-stream gas turbine engine having an electric machine embedded therein to define a mid-fan tip speed to high pressure turbine tip speed ratio as being equal to or greater than 0.7 and less than or equal to 1.5, the mid-fan tip speed to high pressure turbine tip speed ratio being defined by a tip speed of a mid-fan blade of a mid-fan to a tip speed of a last stage turbine blade of a high pressure turbine, the electric machine and the high pressure turbine being operatively coupled with a first shaft of the three-stream gas turbine engine and the mid-fan being operatively coupled with a second shaft of the three-stream gas turbine engine.

13. A three-stream gas turbine engine, comprising: a low pressure shaft; a primary fan operatively coupled with the low pressure shaft; a mid-fan positioned downstream of the primary fan and operatively coupled with the low pressure shaft, the mid-fan having mid-fan blades; a high pressure shaft; an electric machine operatively coupled with the high pressure shaft, the electric machine having a rotor rotatable with the high pressure shaft, and wherein the three-stream engine defines a mid-fan hub radius to electric machine radius ratio as being equal to or greater than 0.1 and less than or equal to 1.0, the mid-fan hub radius to electric machine radius ratio being defined by a radius spanning between a longitudinal axis defined by the three-stream gas turbine engine and an outermost point taken at a trailing edge of a hub of the mid-fan blade of the mid-fan to a radius spanning between the longitudinal axis and an outermost point of the rotor or a stator of the electric machine depending on which one is positioned outward of the other along a radial direction defined by the three-stream gas turbine engine.

14. A three-stream gas turbine engine, comprising: a low pressure shaft; a primary fan operatively coupled with the low pressure shaft; a mid-fan positioned downstream of the primary fan and operatively coupled with the low pressure shaft, the mid-fan having mid-fan blades; a high pressure shaft; a high pressure turbine operatively coupled with the high pressure shaft and having first stage turbine blades; and an electric machine operatively coupled with the high pressure shaft, the electric machine having a rotor rotatable with the high pressure shaft, and wherein the three-stream gas turbine engine defines a longitudinal axis and a radial direction, and wherein the three-stream gas turbine engine defines a high pressure compressor hub radius to electric machine radius ratio as being equal to or greater than 0.1 and less than or equal to 1.0, the high pressure compressor hub radius to electric machine radius ratio being defined by a radius spanning between the longitudinal axis and an outermost point taken at a leading edge of a hub of one of the first stage blades to a radius spanning between the longitudinal axis and an outermost point of a rotor or a stator of the electric machine depending on which one is positioned outward of the other along the radial direction.

15. A method, comprising: operating a three-stream gas turbine engine having a primary fan, a mid-fan positioned downstream of the primary fan, and an electric machine embedded therein to define a high pressure turbine tip speed to electric machine tip speed ratio as being equal to or greater than 0.1 and less than or equal to 1.0, the high pressure turbine tip speed to electric machine tip speed ratio being defined by a tip speed of a first stage turbine blade of a high pressure turbine to a tip speed of a rotor of the electric machine, the electric machine and the high pressure turbine being operatively coupled with a first shaft of the three-stream gas turbine engine and the mid-fan and the primary fan being operatively coupled with a second shaft of the three-stream gas turbine engine.

16. A three-stream gas turbine engine, comprising: a low pressure shaft; a primary fan operatively coupled with the low pressure shaft; a mid-fan positioned downstream of the primary fan and operatively coupled with the low pressure shaft, the mid-fan having mid-fan blades; a high pressure shaft; an electric machine operatively coupled with the high pressure shaft, the electric machine having a rotor rotatable with the high pressure shaft; and a high pressure turbine operatively coupled with the high pressure shaft and having first stage turbine blades, and wherein the three-stream gas turbine engine defines an axial direction, and wherein the three-stream gas turbine defines a high pressure turbine length to electric machine length ratio as being equal to or greater than 0.1 and less than or equal to 1.5, the high pressure turbine length to electric machine length ratio being defined by a length of the high pressure turbine to a length of the electric machine spanning between a leading edge and a trailing edge of a rotor of the electric machine along the axial direction.

17. A method, comprising: operating a three-stream gas turbine engine so as to define a power to voltage ratio as being equal to or greater than 0.3 and less than or equal to 2.0, the power to voltage ratio being defined by an electrical power output by an electric machine in kilowatts to a voltage level of the electric machine in volts of direct current, the three-stream gas turbine engine having a mid-fan operatively coupled with a low pressure shaft thereof and the electric machine being operatively coupled with a high pressure shaft of the three-stream gas turbine engine.

18. A method, comprising: operating a three-stream gas turbine engine having a first electric machine operatively coupled with a first shaft of the three-stream gas turbine engine and a second electric machine operatively coupled with a second shaft of the three-stream gas turbine engine so as to define a second electric machine power to first electric machine power ratio as being equal to or greater than 0.1 and less than or equal to 1.5.

What is claimed is:

1. A method, comprising:
   operating a three-stream gas turbine engine having an electric machine embedded therein to define a tip speed ratio as being equal to or greater than 0.2 and less than or equal to 1.0, the tip speed ratio being defined by a tip speed of a rotor of the electric machine to a tip speed of a mid-fan blade of a mid-fan, the electric machine, the mid-fan, a primary fan positioned upstream of the mid-fan, a compressor positioned downstream of the mid-fan, and a turbine all being operatively coupled with a shaft of the three-stream gas turbine engine.

2. The method of claim 1, wherein the primary fan has a plurality of fan blades, and wherein the three-stream gas turbine engine defines a primary fan radius to mid-fan radius ratio as being equal to or greater than 2.0 and less than or equal to 6.5, the primary fan radius to mid-fan radius ratio being defined by a radius spanning between a longitudinal axis defined by the three-stream gas turbine engine and a leading edge tip of one of the fan blades to a radius spanning between the longitudinal axis and a leading edge tip of one of the mid-fan blades.

3. The method of claim 1, wherein the three-stream gas turbine engine and the electric machine define a mid-fan radius to electric machine radius ratio as being equal to or greater than 1.33 and less than or equal to 3.8, the mid-fan radius to electric machine radius ratio being defined by a radius spanning between a longitudinal axis defined by the three-stream gas turbine engine and a leading edge tip of one of the mid-fan blades of the mid-fan to a radius spanning between the longitudinal axis and an outermost point of the rotor of the electric machine.

4. The method of claim 1, wherein operating the three-stream gas turbine engine further comprises operating the three-stream gas turbine engine so as to define a power to voltage ratio of the electric machine as being equal to or greater than 0.3 and less than or equal to 2.0, the power to voltage ratio being defined by an electrical power output by the electric machine in kilowatts to a voltage level of the electric machine in volts of direct current.

5. The method of claim 4, wherein the electrical power output of the electric machine ranges from 100 kilowatts to 3 megawatts and the voltage level of the electric machine ranges from 270 volts of direct current to 3,000 volts of direct current.

6. The method of claim 1, wherein operating the three-stream gas turbine engine further comprises operating the three-stream gas turbine engine so as to define a power to voltage ratio of the electric machine as being equal to or greater than 0.35 and less than or equal to 0.5, the power to voltage ratio being defined by an electrical power output by the electric machine in kilowatts to a voltage level of the electric machine in volts of direct current.

7. The method of claim 6, wherein the electrical power output of the electric machine ranges from 100 kilowatts to 3 megawatts and the voltage level of the electric machine ranges from 270 volts of direct current to 3,000 volts of direct current.

8. The method of claim 1, wherein in operating the three-stream gas turbine engine, the rotor of the electric machine has a rotor tip speed being equal to or greater than 50 meters per second and less than or equal to 200 meters per second.

9. The method of claim 1, wherein in operating the three-stream gas turbine engine, the rotor of the electric machine has a rotor tip speed being equal to or greater than 140 meters per second and less than or equal to 190 meters per second.

10. The method of claim 1, wherein operating the three-stream gas turbine engine further comprises operating the three-stream gas turbine engine so as to define a power to AC rated current ratio of the electric machine as being equal to or greater than 0.2 and less than or equal to 2.5, the power to AC rated current ratio being defined by an electrical power output by the electric machine in kilowatts to an AC rated current of the electric machine in ampere root mean square.

11. The method of claim 1, wherein operating the three-stream gas turbine engine further comprises operating the three-stream gas turbine engine so as to define a torque at maximum speed to AC rated current ratio as being equal to or greater than 0.1 and less than or equal to 6.0.

12. The method of claim 1, wherein the electric machine, the mid-fan, the compressor, and the turbine all rotate in unison with one another.

13. A three-stream gas turbine engine, comprising:
a shaft;
a primary fan operatively coupled with the shaft;
a mid-fan positioned downstream of the primary fan and operatively coupled with the shaft, the mid-fan having mid-fan blades;
a compressor operatively coupled with the shaft downstream of the mid-fan;
a turbine operatively coupled with the shaft downstream of the compressor; and
an electric machine operatively coupled with the shaft, the electric machine having a stator and a rotor, the rotor rotatable with the shaft, and
wherein, when operated, the three-stream gas turbine engine defines a tip speed ratio as being equal to or greater than 0.2 and less than or equal to 1.0, the tip speed ratio being defined by a tip speed of the rotor of the electric machine to a tip speed of one of the mid-fan blades.

14. The three-stream gas turbine engine of claim 13, wherein the three-stream gas turbine engine defines a mid-fan radius to electric machine radius ratio as being equal to or greater than 1.33 and less than or equal to 3.8, the mid-fan radius to electric machine radius ratio being defined by a radius spanning between a longitudinal axis defined by the three-stream gas turbine engine and a leading edge tip of one of the mid-fan blades of the mid-fan to a radius spanning between the longitudinal axis and an outermost point of the rotor of the electric machine.

15. The three-stream gas turbine engine of claim 13, wherein, when operated, the three-stream gas turbine engine defines a power to voltage ratio of the electric machine as being equal to or greater than 0.3 and less than or equal to 2.0, the power to voltage ratio being defined by an electrical power output by the electric machine in kilowatts to a voltage level of the electric machine in volts of direct current, and wherein the electrical power output of the electric machine ranges from 100 kilowatts to 3 megawatts and the voltage level of the electric machine ranges from 270 volts of direct current to 3,000 volts of direct current.

16. The three-stream gas turbine engine of claim 13, wherein the primary fan is positioned upstream of the mid-fan, and wherein the three-stream gas turbine engine further comprises:
an engine core;
a core cowl surrounding the engine core;
a core duct being defined between the engine core and the core cowl;
a fan cowl surrounding the core cowl;
a fan duct being defined between the core cowl and the fan cowl; and
an inlet duct in flow communication with the core duct and the fan duct, the inlet duct being defined between the engine core and the fan cowl, the mid-fan being positioned within the inlet duct.

17. A three-stream gas turbine engine, comprising:
a shaft;
a primary fan operatively coupled with the shaft;
a mid-fan positioned downstream of the primary fan and operatively coupled with the shaft, the mid-fan having mid-fan blades;

a compressor operatively coupled with the shaft downstream of the mid-fan;

a turbine operatively coupled with the shaft downstream of the compressor; and an electric machine operatively coupled with the shaft, the electric machine having a rotor rotatable with the shaft, and wherein the three-stream gas turbine engine defines a mid-fan radius to electric machine radius ratio as being equal to or greater than 1.33 and less than or equal to 3.8, the mid-fan radius to electric machine radius ratio being defined by a radius spanning between a longitudinal axis defined by the three-stream gas turbine engine and a leading edge tip of one of the mid-fan blades of the mid-fan to a radius spanning between the longitudinal axis and an outermost point of the rotor of the electric machine.

18. The three-stream gas turbine engine of claim 17, wherein the shaft is a low pressure shaft.

19. The three-stream gas turbine engine of claim 17, wherein the three-stream gas turbine engine defines the mid-fan radius to electric machine radius ratio as being equal to or greater than 2.5 and less than or equal to 3.3.

20. The three-stream gas turbine engine of claim 17, wherein the three-stream gas turbine engine defines the mid-fan radius to electric machine radius ratio as being equal to or greater than 2.9 and less than or equal to 3.2.

21. The three-stream gas turbine engine of claim 17, wherein the three-stream gas turbine engine defines an axial direction, and wherein the electric machine is positioned aft of the mid-fan and at least partially overlapping with or aft of a low pressure turbine of the three-stream gas turbine engine along the axial direction.

22. A three-stream gas turbine engine, comprising:

a low pressure shaft;

a high pressure shaft;

a primary fan operatively coupled with the low pressure shaft, the primary fan having primary fan blades;

a mid-fan positioned downstream of the primary fan and operatively coupled with the low pressure shaft, the mid-fan having mid-fan blades; and an electric machine operatively coupled with the low pressure shaft or the high pressure shaft, and wherein the three-stream gas turbine engine defines a primary fan radius to mid-fan radius ratio as being equal to or greater than 3.0 and less than or equal to 6.5, the primary fan radius to mid-fan radius ratio being defined by a radius spanning between a longitudinal axis defined by the three-stream gas turbine engine and a leading edge tip of one of the primary fan blades of the primary fan to a radius spanning between the longitudinal axis and a leading edge tip of one of the mid-fan blades of the mid-fan, and wherein the three-stream gas turbine engine and the electric machine define a mid-fan radius to electric machine radius ratio as being equal to or greater than 1.33 and less than or equal to 3.8, the mid-fan radius to electric machine radius ratio being defined by a radius spanning between the longitudinal axis and a leading edge tip of one of the mid-fan blades of the mid-fan to a radius spanning between the longitudinal axis and an outermost point of a rotor of the electric machine.

23. The three-stream gas turbine engine of claim 22, wherein the electric machine is operatively coupled with the low pressure shaft.

24. The three-stream gas turbine engine of claim 22, wherein the primary fan is an unducted fan.

25. The three-stream gas turbine engine of claim 22, further comprising:

an engine core;

a core cowl surrounding the engine core;

a core duct being defined between the engine core and the core cowl;

a fan cowl surrounding the core cowl; and a fan duct being defined between the core cowl and the fan cowl, a fan exhaust nozzle defining an exit of the fan duct, wherein, at the fan exhaust nozzle, the core cowl is positioned outward of the mid-fan along a radial direction defined by the three-stream gas turbine engine.

26. The three-stream gas turbine engine of claim 22, further comprising:

an engine core;

a core cowl surrounding the engine core;

a core duct being defined between the engine core and the core cowl;

a fan cowl surrounding the core cowl; and fan guide vanes mounted to the fan cowl downstream of the primary fan, the fan guide vanes each being unshrouded.

27. The three-stream gas turbine engine of claim 22, wherein the three-stream gas turbine engine and the electric machine define a mid-fan radius to ele ctric machine radius ratio as being equal to or greater than 2.9 and less than or equal to 3.2, the mid-fan radius to electric machine radius ratio being defined by a radius spanning between the longitudinal axis and a leading edge tip of one of the mid-fan blades of the mid-fan to a radius spanning between the longitudinal axis and an outermost point of a rotor of the electric machine.

28. The three-stream gas turbine engine of claim 22, further comprising:

a low pressure turbine operatively coupled with the low pressure shaft, and wherein the three-stream gas turbine engine defines an axial direction, and wherein the three-stream gas turbine engine defines an electric machine length to low pressure turbine length ratio as being equal to or greater than 0.01 and less than or equal to 3.0, the electric machine length to low pressure turbine length ratio being defined by a length of the low pressure turbine to a length of the electric machine, the length of the electric machine spanning between a leading edge and a trailing edge of a rotor of the electric machine along the axial direction, the length of the low pressure turbine spanning between a leading edge of a hub of a first stage turbine blade of the low pressure turbine to a trailing edge of a hub of a last stage turbine blade of the low pressure turbine.

29. The three-stream gas turbine engine of claim 22, further comprising:

a low pressure turbine operatively coupled with the low pressure shaft, and wherein the three-stream gas turbine engine defines an axial direction, and wherein the three-stream gas turbine engine defines an electric machine tip radius to low pressure turbine last stage hub radius ratio as being equal to or greater than 0.1 and less than or equal to 1.0, the electric machine tip radius to low pressure turbine last stage hub radius ratio being defined by a radius spanning between a longitudinal axis defined by the three-stream gas turbine engine and an outermost point of a rotor of the electric machine to a radius spanning between the longitudinal axis and an outermost point of a hub of a last stage turbine blade of the low pressure turbine.

30. The three-stream gas turbine engine of claim 22, further comprising:

an engine core;

a core cowl surrounding the engine core;

a core duct being defined between the engine core and the core cowl;

a fan cowl surrounding the core cowl;

a fan duct being defined between the core cowl and the fan cowl; and an inlet duct in flow communication with the core duct and the fan duct, the inlet duct being defined between the engine core and the fan cowl, the mid-fan being positioned within the inlet duct, the electric machine being positioned within the engine core.

* * * * *